United States Patent
Katayama et al.

(10) Patent No.: US 6,774,898 B1
(45) Date of Patent: Aug. 10, 2004

(54) IMAGE STORAGE METHOD, IMAGE RENDERING METHOD, IMAGE STORAGE APPARATUS, IMAGE PROCESSING APPARATUS, IMAGE DOWNLOAD METHOD, AND COMPUTER AND STORAGE MEDIUM

(75) Inventors: Akihiro Katayama, Yokosuka (JP); Yukio Sakagawa, Tokyo (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 09/653,271

(22) Filed: Aug. 31, 2000

(30) Foreign Application Priority Data

Sep. 2, 1999 (JP) .......................... 11-249293
Dec. 17, 1999 (JP) .......................... 11-359086

(51) Int. Cl.⁷ .............................. G06T 17/00
(52) U.S. Cl. .............................. 345/428
(58) Field of Search ................ 345/419, 420, 345/421, 422, 423, 424, 426, 427, 428

(56) References Cited

U.S. PATENT DOCUMENTS

| | | | | |
|---|---|---|---|---|
| 4,742,558 A | * | 5/1988 | Ishibashi et al. | 382/240 |
| 5,615,324 A | * | 3/1997 | Kuboyama | 345/441 |
| 5,764,235 A | * | 6/1998 | Hunt et al. | 345/428 |
| 5,841,439 A | * | 11/1998 | Pose et al. | 345/418 |
| 5,900,849 A | * | 5/1999 | Gallery | 345/8 |
| 6,009,190 A | * | 12/1999 | Szeliski et al. | 382/154 |
| 6,040,836 A | * | 3/2000 | Shiitani et al. | 345/427 |
| 6,052,123 A | * | 4/2000 | Lection et al. | 345/419 |
| 6,064,393 A | * | 5/2000 | Lengyel et al. | 345/427 |
| 6,111,566 A | | 8/2000 | Chiba et al. | |
| 6,266,064 B1 | * | 7/2001 | Snyder | 345/421 |
| 6,268,862 B1 | * | 7/2001 | Uchiyama et al. | 345/427 |
| 6,396,507 B1 | * | 5/2002 | Kaizuka et al. | 345/661 |
| 6,455,807 B1 | * | 9/2002 | Scott | 219/121.72 |
| 6,466,210 B1 | * | 10/2002 | Carlsen et al. | 345/629 |

FOREIGN PATENT DOCUMENTS

| | | |
|---|---|---|
| EP | 0 473 310 A2 | 3/1992 |
| JP | 07-021350 | 1/1995 |
| JP | 10-97642 | 4/1998 |
| JP | 10-111951 | 4/1998 |
| JP | 10-222699 | 8/1998 |

OTHER PUBLICATIONS

"On 3–D Real–Time Perspective Generation From a Multiresolution Photo–Mosaic Data Base," John T. Hooks, et al., Graphical Models and Image Processing, vol. 55, No. 5, Sep. 1993, pp. 333–345.

(List continued on next page.)

Primary Examiner—Mark Zimmerman
Assistant Examiner—Enrique Santiago
(74) Attorney, Agent, or Firm—Fitzpatrick, Cella, Harper & Scinto

(57) ABSTRACT

There is disclosed a progressive display method upon rendering and displaying a virtual object expressed by RS data. When RS data is generated and recorded on the basis of real image data, map data that represents correspondence between a real image space and ray space is divided into a plurality of layers, and the resolutions of the individual layers are hierarchically changed, thus storing hierarchical map data. Upon rendering a virtual image from an arbitrary viewpoint position, rendering is done by looking up the hierarchical map data in turn in ascending order of resolution. Also, there are disclosed a downloading method of selectively downloading RS data and VRML data, and a rendering method of downloaded data. RS data with high resolution is stored in an external memory, and VRML data having a required memory size is stored in an internal memory. In principle, a virtual image is generated by rendering RS data to allow the user to experience the virtual space. When downloading of RS data is not in time, an image rendered based on VRML data is displayed.

68 Claims, 60 Drawing Sheets

OTHER PUBLICATIONS

"Efficient Projection of Ray Space for a Ray Based Description of 3–D Real World", Takeshi Naemura, et al., Institute of Image Information and Television Engineers, vol. 20, pp. 49–56, Feb. 1, 1996 (with English Abstract).

"Interactive Operation on 3–D Real Images Using Ray Description", Akio Ishikawa, et al., IEICE Journal D–II, vol. J81–D–II, No. 5, pp. 850–860, May 1998 (with English translation of the Summary).

"A Cyber–Space Creation by Mixing Ray Space Data with Geometric Models", A. Katayama, et al., IEICE Journal D–11, vol. J80–D–11 No. 11, pp. 3048–3057, Nov. 1997.

Transformation of Hologram and Ray Space for Integrated 3D Visual Communication, T. Fujii, et al., 3D Image Conference '95.

* cited by examiner

FIG. 15

BLOCK SEGMENTATION OF CORRESPONDENCE MAP (1 BLOCK = 8 × 8 PIXELS)

FIG. 16
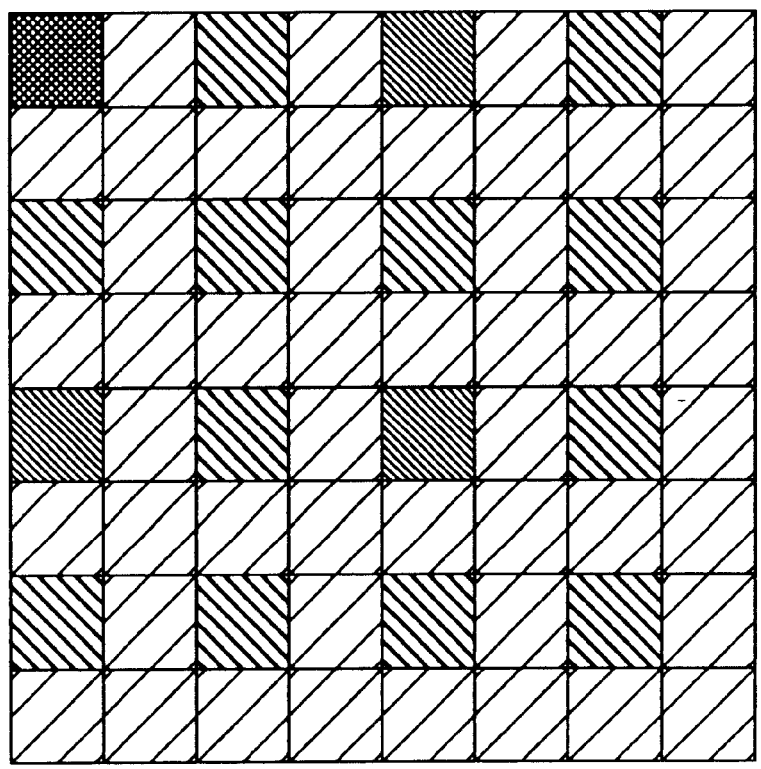
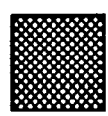 DISCRETE LEVEL VALUE = 1
 DISCRETE LEVEL VALUE = 3
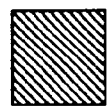 DISCRETE LEVEL VALUE = 2
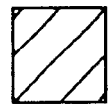 DISCRETE LEVEL VALUE = 4

FIRST-LAYER MAP

DDb(1)

SECOND-LAYER MAP

DDb(2)

THIRD-LAYER MAP

DDb(3)

FOURTH-LAYER MAP

DDb(4)

MERGED FIRST-LAYER MAP

SDb(1)

MERGED SECOND-LAYER MAP

SDb(2)

MERGED THIRD-LAYER MAP

SDb(3)

MERGED FOURTH-LAYER MAP

SDb(4)

OVERALL WALK-THROUGH CONTROL SEQUENCE

FIG. 27
MANAGEMENT TABLE

| OBJECT NUMBER b | RENDERING TARGET FLAG $F_{bD}$ | DATA FLAG $F_{bP}$ | LAYER ib WHICH IS BEING DOWNLOADED |
|---|---|---|---|
| 1 | 1 | 1 | 3 |
| 2 | 1 | 1 | 1 |
| 3 | 1 | 1 | 2 |
| 4 | 0 | 1 | 4 |
| 5 | .... | .... | .... |
| X | 1 | 0 | 0 |

FIG. 36

| ZONE | ON MAIN MEMORY ||
| | RAY SPACE DATA | BILLBOARD IMAGE DATA |
| --- | --- | --- |
| A | PRESENT / ABSENT | PRESENT / ABSENT |
| B | PRESENT / ABSENT | PRESENT / ABSENT |
| C | PRESENT / ABSENT | PRESENT / ABSENT |
| D | PRESENT / ABSENT | PRESENT / ABSENT |

FIG. 41
ZONE INFORMATION TABLE

| ZONE | ZONE ATTRIBUTE | VALUE | REQUIRED IMAGE ID (RQD-ID) | EXTERNAL DEMAND IMAGE ID (EXIT-DMND-ID) | INTERNAL DEMAND IMAGE ID (INT-DMND-ID) |
|---|---|---|---|---|---|
| A | DISPLAY TARGET ZONE | 0 | A | nul | nul |
| B | DISPLAY TARGET ZONE | 0 | B | nul | nul |
| C | DISPLAY TARGET ZONE | 0 | C | nul | nul |
| D | DISPLAY TARGET ZONE | 0 | D | nul | nul |
| $T_{BA}$ | TRANSITION ZONE | 1 | nul | A | B |
| $T_{AB}$ | TRANSITION ZONE | 1 | nul | B | A |
| $T_{AC}$ | TRANSITION ZONE | 1 | nul | C | A |
| $T_{BD}$ | TRANSITION ZONE | 1 | nul | D | B |
| $T_{BC}$ | TRANSITION ZONE | 1 | nul | C | B |
| $T_{AD}$ | TRANSITION ZONE | 1 | nul | D | A |
| $T_{AE}$ | TRANSITION ZONE | 1 | nul | E | A |
| X | INTERMEDIATE ZONE | 2 | nul | nul | nul |

FIG. 47

| | REGISTER | VALUE | MEANING |
|---|---|---|---|
| STATE OF BANK | $F_{B1}$ | 0 | DATA IN BANK 1 IS INVALID |
| | | 1 | DATA IN BANK 1 IS VALID |
| | | 2 | DATA IN BANK 1 IS GRAY |
| | | 3 | DOWNLOADING OF BANK 1 IS UNDERWAY |
| | $F_{B2}$ | 0 | DATA IN BANK 2 IS INVALID |
| | | 1 | DATA IN BANK 2 IS VALID |
| | | 2 | DATA IN BANK 2 IS GRAY |
| | | 3 | DOWNLOADING OF BANK 2 IS UNDERWAY |
| STORED IMAGE | $ID_{B1}$ | A | IMAGE DATA ID IN BANK 1 IS A |
| | | B | IMAGE DATA ID IN BANK 1 IS B |
| | | C | IMAGE DATA ID IN BANK 1 IS C |
| | | D | IMAGE DATA ID IN BANK 1 IS D |
| | $ID_{B2}$ | 0 | IMAGE DATA ID IN BANK 2 IS A |
| | | 1 | IMAGE DATA ID IN BANK 2 IS B |
| | | 2 | IMAGE DATA ID IN BANK 2 IS C |
| | | 3 | IMAGE DATA ID IN BANK 2 IS D |

FIG. 48

| | REGISTER | VALUE | MEANING |
|---|---|---|---|
| STORAGE LOCATION OF IMAGE | B_A | 0 | NOT STORED |
| | | 1 | IMAGE A OF DISPLAY TARGET ZONE A IS STORED IN BANK 1 |
| | | 2 | IMAGE A OF DISPLAY TARGET ZONE A IS STORED IN BANK 2 |
| | B_B | 0 | NOT STORED |
| | | 1 | IMAGE B OF DISPLAY TARGET ZONE B IS STORED IN BANK 1 |
| | | 2 | IMAGE B OF DISPLAY TARGET ZONE B IS STORED IN BANK 2 |
| | B_C | 0 | NOT STORED |
| | | 1 | IMAGE C OF DISPLAY TARGET ZONE C IS STORED IN BANK 1 |
| | | 2 | IMAGE C OF DISPLAY TARGET ZONE C IS STORED IN BANK 2 |
| | B_D | 0 | NOT STORED |
| | | 1 | IMAGE D OF DISPLAY TARGET ZONE D IS STORED IN BANK 1 |
| | | 2 | IMAGE D OF DISPLAY TARGET ZONE D IS STORED IN BANK 2 |
| | B_E | 0 | NOT STORED |
| | | 1 | IMAGE E OF DISPLAY TARGET ZONE A IS STORED IN BANK 1 |
| | | 2 | IMAGE E OF DISPLAY TARGET ZONE A IS STORED IN BANK 2 |

F I G. 49

| | REGISTER | VALUE | MEANING |
|---|---|---|---|
| LOCATION OF VIEWPOINT POSITION | PR-Z | A | DISPLAY TARGET ZONE USER STAYED PREVIOUSLY IS A |
| | | B | DISPLAY TARGET ZONE USER STAYED PREVIOUSLY IS B |
| | | C | DISPLAY TARGET ZONE USER STAYED PREVIOUSLY IS C |
| | | D | DISPLAY TARGET ZONE USER STAYED PREVIOUSLY IS D |
| | CR-Z | A | DISPLAY TARGET ZONE USER STAYS CURRENTLY IS A |
| | | B | DISPLAY TARGET ZONE USER STAYS CURRENTLY IS B |
| | | C | DISPLAY TARGET ZONE USER STAYS CURRENTLY IS C |
| | | D | DISPLAY TARGET ZONE USER STAYS CURRENTLY IS D |

FIG. 50

| REGISTER | VALUE | MEANING |
|---|---|---|
| COM | 0 | IDLE STATE |
|  | 1 | DOWNLOADING IN PROGRESS |
| TMR | A | ZONE TRANSITION MONITOR TIMER |

F I G. 60
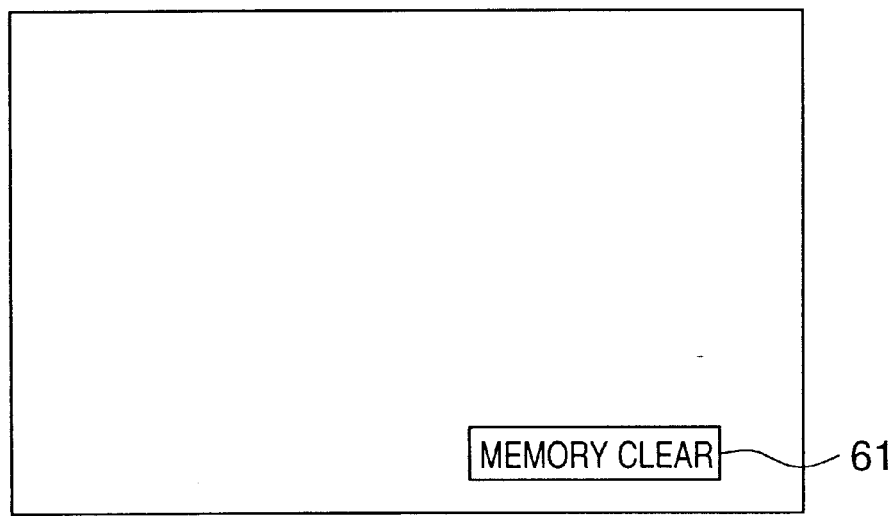

IMAGE STORAGE METHOD, IMAGE RENDERING METHOD, IMAGE STORAGE APPARATUS, IMAGE PROCESSING APPARATUS, IMAGE DOWNLOAD METHOD, AND COMPUTER AND STORAGE MEDIUM

FIELD OF THE INVENTION

The present invention relates to a method of storing a virtual image from space data generated based on actually captured data, a method of rendering a virtual space on the basis of stored space data, and apparatuses therefor and, more particularly, to progressive storage and rendering of the space data.

The present invention also relates to a virtual image rendering method that downloads large-size image data such as ray space data (to be abbreviated as RS data hereinafter), and presents the downloaded data to the user, and a rendering apparatus.

BACKGROUND OF THE INVENTION

Many schemes that describe and express a virtual space on the basis of actually captured images in place of a description based on three-dimensional geometric models have been proposed. Such schemes are called Image Based Rendering (to be abbreviated as IBR hereinafter), and are characterized in that they can express a virtual space with high reality, which cannot be obtained by a scheme based on three-dimensional geometric models, since these schemes are based on actually captured images.

Attempts to describe a virtual space on the basis of a ray space theory as one of IBR schemes have been proposed. See, for example, "Implementation of Virtual Environment by Mixing CG model and Ray Space Data", IEICE Journal D-11, Vol. J80-D-11 No. 11, pp. 3048–3057, November 1997, or "Mutual Conversion between Hologram and Ray Space Aiming at 3D Integrated Image Communication", 3D Image Conference, and the like.

The ray space theory will be explained below.

As shown in FIG. 1, a coordinate system 0-X-Y-Z is defined in a real space. A light ray that passes through a reference plane P (Z=z) perpendicular to the Z-axis is defined by a position (x, y) where the light ray crosses P, and variables θ and φ that indicate the direction of the light ray. More specifically, a single light ray is uniquely defined by five variables (x, y, z, θ, φ). If a function that represents the light intensity of this light ray is defined as f, light ray group data in this space can be expressed by f(x, y, z, θ, φ). This five-dimensional space is called a "ray space". Generally, a time variation t is also used in some cases, but is omitted here.

If the reference plane P is set at z=0, and disparity information of a light ray in the vertical direction, i.e., the degree of freedom in the φ direction is omitted, the degree of freedom of the light ray can be regenerated to two dimensions (x, θ). This x-θ two-dimensional space is a partial space of the ray space. As shown in FIG. 3, if u=tan θ, a light ray (FIG. 2) which passes through a point (X, Z) in the real space is mapped onto a line in the x-u space, which line is given by:

$$X = x + u \cdot Z \quad (1)$$

Image sensing by a camera reduces to receiving light rays that pass through the lens focal point of the camera by an image sensing surface, and converting their brightness levels and colors into an image. In other words, a light ray group which passes through one point, i.e., the focal point position, in the real space is captured as an image in correspondence with the number of pixels. In this way, since the degree of freedom in the φ direction is omitted, and the behavior of a light ray is examined in only the X-Z plane, only pixels on a line segment that intersects a plane perpendicular to the Y-axis need only be considered. In this manner, by sensing an image, light rays that pass through one point can be collected, and data on a single line segment in the x-u space can be captured by single image sensing.

When this image sensing is done a large number of times by changing the viewpoint position (in this specification, the viewpoint position includes both the position of the viewpoint and the line-of-sight direction unless otherwise specified), light ray groups which pass through a large number of points can be captured. When the real space is captured using N cameras, as shown in FIG. 4, data on a line given by:

$$x + Z_n u = X_n \quad (2)$$

can be input in correspondence with a focal point position $(X_n, Z_n)$ of the n-th camera (n=1, 2, . . . , N), as shown in FIG. 5. In this way, when an image is captured from a sufficiently large number of viewpoints, the x-u space can be densely filled with data.

Conversely, an observation image from a new arbitrary viewpoint position can be generated (FIG. 7) from the data of the x-u space (FIG. 6). As shown in FIG. 7, an observation image from a new viewpoint position E(X, Z) indicated by an eye mark can be generated by reading out data on a line given by equation (1) from the x-u space.

However, the above prior art makes arithmetic operations for converting all pixels of an actually captured image into ray space groups. That is, if there are E actually captured images each having m×n pixels, the pixels are converted into light ray groups via E×m×n computations, resulting in a very large computation volume. Especially, when a ray space group is mapped in the ray space to maintain the resolution of an input image and the RS data is quantized, the quantized data size also becomes huge.

It is an object of the present invention to provide a RS data storage method and apparatus, which allow progressive display of RS data of a target object.

It is another object of the present invention to provide a method and apparatus for displaying progressively stored space data.

Actually captured image data like the aforementioned RS data is compressed and stored in an external storage device or the like for each unit (e.g., for each object). Therefore, in order to render such space data in a virtual space, the data must be downloaded onto a main storage device, decoded, and rendered on the main storage device. On the other hand, the user can recognize a given virtual space only after virtual images of all virtual objects to be rendered in that virtual space are displayed. Therefore, when there are a plurality of objects to be rendered, the user cannot recognize such virtual objects until space data of all these objects are downloaded, decoded, and rendered. That is, when the user wants to walk through such virtual space, a rendering apparatus with poor response is provided.

This is the second problem of the prior art upon handling space data such as RS data.

The third problem of the prior art results from the fact that actually captured image data such as RS data or the like contain a large volume of data. It is a common practice to store such data at a location separated from an image processing apparatus in the form of a database. For this reason, when the image processing apparatus maps a virtual image in a virtual space, a large volume of space data must be downloaded into the image processing apparatus in advance. Owing to the huge size of actually captured image data, the turn around time from when space data is requested until that space data is ready to be rendered in the image processing time is not so short, although the communication speed is improving recently. Under these circumstances, the user must be prevented from being bored during the wait time until actually captured image data is ready for use in such system that presents a virtual space to him or her. That is, during this wait time, a billboard image (a single image) with a short download time is displayed instead, although a scene from an arbitrary viewpoint position cannot be obtained.

The fourth problem of the prior art occurs when a walk-through system which allows the user to freely walk through a virtual space using actually captured image data such as RS data has a limited memory size. That is, in order to combat the aforementioned second problem, a technique for segmenting a virtual space into a plurality of subspaces (e.g., in case of a virtual art museum, each exhibition room forms one subspace) can be proposed.

More specifically, when it is detected that the user is about to approach a given exhibition room, space data of that exhibition room is prefetched to shorten the time required for transfer prior to rendering. Furthermore, when the user is about to leave that exhibition room (subspace A), space data for the next subspace (e.g., exhibition room B) must be overwritten and stored on the memory area that stored space data of exhibition room A so far. In this manner, virtual subspaces of exhibition rooms can be reproduced in turn in nearly real time even by a relatively small memory size.

This prefetch start timing is determined depending on whether or not the viewpoint position of the user approaches a target subspace. However, since the user's viewpoint position moves using a mouse or the like without any high-precision route guide, the user may often be guided to a wrong route. That is, when it is erroneously detected that the user's viewpoint position which does not reach a prefetch start zone has reached that zone, the system starts prefetch. Especially, when the user's viewpoint position moves near the prefetch start zone, such operation error readily occurs. For example, as shown in FIG. 32, when the viewpoint position moves from the exhibition room space into the prefetch start zone and returns to the exhibition room space again, if the aforementioned wrong prefetch starts, large-size space data for the exhibition room space is purged (deleted), and the system must re-transfer the data of the exhibition room space to "return" to the exhibition room space (since this situation takes place due to a detection error of the viewpoint position, the user has no actual sense of returning), resulting in time-consuming operation.

The present invention is directed to solving the third problem.

It is still another object of the present invention to provide an image rendering method and apparatus, which can render space data stored in an internal memory, as needed, under the condition that space data in an external memory is rendered using at least two space data, one of which is stored in the external memory, and the other of which is stored in the internal memory.

SUMMARY OF THE INVENTION

In order to achieve the above objects, an image storage method for storing space data which includes real image data of an actually captured image in association with a predetermined space different from a real image space, comprises:

the first layer dividing step of hierarchically dividing the real image data into layers in accordance with resolutions;

the second layer dividing step of hierarchically dividing a map that represents correspondence between the real image space and the predetermined space into layers in accordance with resolutions, the resolutions of the divided layers corresponding to resolutions of the layers divided in the first layer dividing step; and the step of storing obtained hierarchical image data from the first layer dividing step and hierarchical map data from the second layer dividing step in a storage device as the space data.

According to claim 2 as a preferred aspect of the present invention, the space data is RS data.

According to claim 3 as a preferred aspect of the present invention, the layers and resolutions are set in ascending or descending order.

According to claim 4 as a preferred aspect of the present invention, each of the first and second layer dividing steps includes the step of performing a data decimation process.

According to claim 5 as a preferred aspect of the present invention, the second layer dividing step includes the block segmentation step of segmenting the map data into a plurality of blocks in correspondence with a block having a size set in correspondence with the number of divided layers.

The map of space data includes address information. In the process of dividing map data into layers, this address information must also be appropriately converted. Hence, according to claim 6 as a preferred aspect of the present invention, the second layer dividing step uses converted address $n_i$ given by:

$$n_i = [n_j - 1/2^{p-i}]$$

where p is the number of divided layers, i is a layer to be processed, and $n_j$ is the storage address of map data of the i-th layer.

According to a preferred aspect of the present invention, if the block size is N×N, the block segmentation step sets:

$$N = 2^{p-1}$$

where p is the number of divided layers. By satisfying this condition, hierarchization is simplified.

Hierarchical space data stored by the method of the present invention are effective in terms of progressive display at the time of rendering. Hence, according to a preferred aspect of the present invention, an image rendering method for rendering hierarchical in a virtual space, comprises:

the step of reading hierarchical space data of respective layers in ascending order of resolution; and the rendering step of rendering a virtual image in the order the hierarchical space data is read.

According to a preferred aspect of the present invention, the method further comprises the detection step of detecting a user's viewpoint position, and the rendering step includes the step of rendering a virtual image on the basis of the detected viewpoint position.

In order to render a virtual image still faster, objects to be rendered can be limited. Hence, according to another method of the present invention, the reading step includes the step of reading hierarchical space data of a space near the detected viewpoint position.

The above objects are also achieved by providing a storage medium that stores a program for implementing the aforementioned storage or rendering method on a computer.

According to a preferred aspect of the present invention, the present invention is a computer that mounts a storage medium.

Furthermore, the above objects are achieved by an image storage apparatus or image processing apparatus.

The above objects are also achieved by a image downloading method for downloading space data which is formed based on image data of an actually captured image in association with a predetermined space different from a real image space. That is, this method comprises:

the first layer dividing step of hierarchically dividing real image data in the space data into layers in accordance with resolutions; and the downloading step of downloading obtained hierarchical image data, and a map that represents correspondence between the real image space and the predetermined space to an external apparatus.

According to a preferred aspect of the present invention, the method further comprises the second layer dividing step of hierarchically dividing the map into layers in accordance with resolutions, and the downloading step includes the step of downloading the obtained hierarchical image data and hierarchical map data.

According to a preferred aspect of the present invention, the resolutions of the respective layers of the map are set in correspondence with resolutions of the respective layers divided in the first layer dividing step.

According to a preferred aspect of the present invention, the resolutions increase in an order the data are downloaded.

According to a preferred aspect of the present invention, the first layer dividing step includes the step of dividing the image data to make hierarchical image data of a first layer include real image data at a pixel position common to the respective layers, and hierarchical data of a second layer as a layer higher than the first layer not include the real image data at the common pixel position.

According to a preferred aspect of the present invention, the external apparatus merges the hierarchical image data of the first and second layers.

According to a preferred aspect of the present invention, the actually captured image data and space data are stored in an image database, which executes the first layer dividing step in response to a downloading request from the external apparatus.

The above objects are also achieved by the following image processing method. That is, this method comprises:

the step of converting input image data into space data that pertains to a predetermined space coordinate system different from an image space coordinate system of the input image data;

the first layer dividing step of hierarchically dividing the space data into layers in accordance with resolutions;

the step of generating a map that represents correspondence between image data in the image space coordinate system and space data in the predetermined space;

the second layer dividing step of hierarchically dividing the map into layers in accordance with resolutions;

the step of storing obtained hierarchical space data and hierarchical map data in a storage device; and the image generation step of generating an image on the basis of the hierarchical space data and hierarchical map data.

According to a preferred aspect of the present invention, the resolutions of the respective layers divided by the second layer dividing step are set to correspond to the resolutions of the respective layers divided in the first layer dividing step.

According to a preferred aspect of the present invention, the layers and resolutions are set in ascending or descending order.

According to a preferred aspect of the present invention, each of the first and second layer dividing steps includes the step of performing a data decimation process.

According to a preferred aspect of the present invention, the second layer dividing step includes the block segmentation step of segmenting the map data into a plurality of blocks in correspondence with a block having a size set in correspondence with the number of divided layers.

The map of space data includes address information. In the process of dividing map data into layers, this address information must also be appropriately converted. Hence, the second layer dividing step uses converted address $n_i$ given by:

$$n_i = [n_f - 1/2^{p-i}]$$

where p is the number of divided layers, i is a layer to be processed, and $n_f$ is the storage address of map data of the i-th layer.

According to a preferred aspect of the present invention, if the block size is N×N, the block segmentation step sets:

$$N = 2^{p-1}$$

where p is the number of divided layers. By satisfying this condition, hierarchization is simplified.

According to a preferred aspect of the present invention, the method further comprises:

the step of reading hierarchical space data of respective layers in ascending order of resolution; and the rendering step of rendering a virtual image in the order the hierarchical space data is read.

According to a preferred aspect of the present invention, the method further comprises the detection step of detecting a user's viewpoint position, and the rendering step includes the step of rendering a virtual image on the basis of the detected viewpoint position.

In order to render a virtual image still faster, objects to be rendered can be limited. Hence, according to another method of the present invention, the reading step includes the step of reading hierarchical space data of a space near the detected viewpoint position.

The above objects are also achieved by providing a storage medium that stores a program for implementing the aforementioned processing method on a computer.

Furthermore, the above objects are also achieved by the following image processing apparatus. That is, this apparatus comprises:

means for converting input image data into space data that pertains to a predetermined space coordinate system different from an image space coordinate system of the input image data;

first layer dividing means for hierarchically dividing the space data into layers in accordance with resolutions;

means for generating a map that represents correspondence between image data in the image space coordinate system and space data in the predetermined space;

second layer dividing means for hierarchically dividing the map into layers in accordance with resolutions;

means for storing obtained hierarchical space data and hierarchical map data in a storage device; and image generation means for generating an image on the basis of the hierarchical space data and hierarchical map data.

According to a preferred aspect of the present invention, the resolutions of the respective layers divided by the second layer dividing means are set to correspond to the resolutions of the respective layers divided by the first layer dividing means.

According to a preferred aspect of the present invention, the layers and resolutions are set in ascending or descending order.

According to a preferred aspect of the present invention, each of the first and second layer dividing means performs a data decimation process.

According to a preferred aspect of the present invention, the second layer dividing means includes block segmentation means for segmenting the map data into a plurality of blocks in correspondence with a block having a size set in correspondence with the number of divided layers.

The map of space data includes address information. In the process of dividing map data into layers, this address information must also be appropriately converted. Hence, according to a preferred aspect of the present invention, the second layer dividing means uses converted address $n_i$ given by:

$$n_i = [n_j \cdot 1/2^{p-i}]$$

where p is the number of divided layers, i is a layer to be processed, and $n_j$ is the storage address of map data of the i-th layer.

According to a preferred aspect of the present invention, if the block size is N×N, the block segmentation means sets:

$$N = 2^{p-1}$$

where p is the number of divided layers. By satisfying this condition, hierarchization is simplified.

According to a preferred aspect of the present invention, the apparatus further comprises:

means for reading hierarchical space data of respective layers in ascending order of resolution; and rendering means for rendering a virtual image in the order the hierarchical space data is read.

According to a preferred aspect of the present invention, the apparatus further comprises detection means for detecting a user's viewpoint position, and the rendering means renders a virtual image on the basis of the detected viewpoint position.

In order to render a virtual image still faster, objects to be rendered can be limited. Hence, according to the apparatus of the present invention, the reading means reads hierarchical space data of a space near the detected viewpoint position.

According to the present invention, an rendering method for rendering a virtual image viewed from an arbitrary viewpoint position in a virtual space, comprises the steps of:

storing first space data in a first format at a first viewpoint position in an internal memory;

storing second space data in a second format at the first viewpoint position in an external memory;

downloading the second space data from the external memory to generate a virtual image at an arbitrary viewpoint position; and rendering the virtual image at the arbitrary viewpoint position on the basis of the first space data in the internal memory before downloading is completed, and on the basis of the second space data downloaded into the internal memory after downloading is completed.

The second space data that must be downloaded is huge space data and may often be difficult to reside on the internal memory. Before such second space data is downloaded, a virtual image is rendered on the basis of the first space data in the internal memory, thus preventing the user from being disturbed by an image non-display period, and efficiently using an expensive internal memory.

Note that the first space data is space data which is optimal to form a billboard image.

On the other hand, the first space data is VRML space data which has a small size but is inferior to the second space data in terms of precision and resolution, and the second space data is RS data which requires a large size but is superior to the first space data in terms of precision and resolution.

According to a preferred aspect of the present invention, this rendering method provides a virtual walk-through environment to a user in the virtual space.

The first space data also requires a relatively large size. It is preferable to store such first space data in the external memory. Hence, according to a preferred aspect of the present invention, the first space data is stored in the external memory, and downloading of the first space data to the internal memory is completed before downloading of the second space data.

For example, in the walk-through environment, a virtual space is made up of a plurality of subspaces. That is, the second space data is comprised of a plurality of units of space data.

Hence, according to a preferred embodiment of the present invention, the method further comprises steps of:

storing space data of a plurality of images captured in advance from a plurality of different viewpoint positions in the external memory as the second space data;

detecting a user's viewpoint position which moves; and executing a rendering process of an image at a viewpoint position after movement, and a download process of the second space data as parallel processes. In this specification, this method is implemented by the first example of the second embodiment.

On the other hand, in another embodiment, the method further comprises the steps of:

storing space data of a plurality of images captured in advance from a plurality of different viewpoint positions in the external memory as the second space data;

detecting a user's viewpoint position which moves;

downloading space data corresponding to a viewpoint position after movement from the external memory; and rendering a virtual image on the basis of the first space data in the internal memory before downloading is completed, and on the basis of the second space data which has been downloaded into the internal memory and corresponds to the viewpoint position after movement after downloading is completed. In this specification, this method is implemented by the second example of the second embodiment.

According to a preferred aspect of the present invention, the internal memory has a capacity for storing at least the first and second space data.

Note that the objects of the present invention can also be achieved by a rendering apparatus described in claim 60 and the like.

Furthermore, the objects of the present invention can also be achieved by a rendering method for rendering a virtual image at an arbitrary viewpoint position in a virtual space, according to the present invention, comprising the steps of:

rendering first space data in a first data format and second space data in a second data format at an arbitrary viewpoint position as virtual images; and mapping the virtual image based on the first space data in the virtual space when rendering of the virtual image based on the second space data does not end in time before mapping in the virtual space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a view for explaining a process for segmenting a map into 8×8 blocks;

FIG. 16 is a view for explaining the distribution of discrete level values in one block;

FIG. 27 shows the format of a download management table;

FIG. 36 is a view for explaining the configuration of a table for managing the downloading states of RS data and billboard image data in the system of the second embodiment;

FIG. 41 is a table showing attribute information assigned to each zone in the virtual space in the third embodiment;

FIG. 47 is a table for explaining various registers used in the control sequence of the third embodiment and, especially, a register for managing the memory bank states, and a register for storing the IDs of images stored in the banks;

FIG. 48 is a table for explaining various registers used in the control sequence of the third embodiment and, especially, a register for managing the relationship between RS data to be rendered in each display target zone and the storage location of that data;

FIG. 49 is a table for explaining various registers used in the control sequence of the third embodiment and, especially, register PR-Z for storing the ID of a display target zone corresponding to the immediately preceding location of the user, and register CR-Z for storing the ID of the current display target zone;

FIG. 50 is a table for explaining register COM and timer TMR used in the control sequence of the third embodiment;

FIG. 60 is a view for explaining the shape of an icon according to a modification of the third embodiment.

DETAILED DESCRIPTION OF THE PREFERRED EMBODIMENTS

Preferred embodiments of the present invention will now be described in detail in accordance with the accompanying drawings.

First Embodiment

Figure 8:
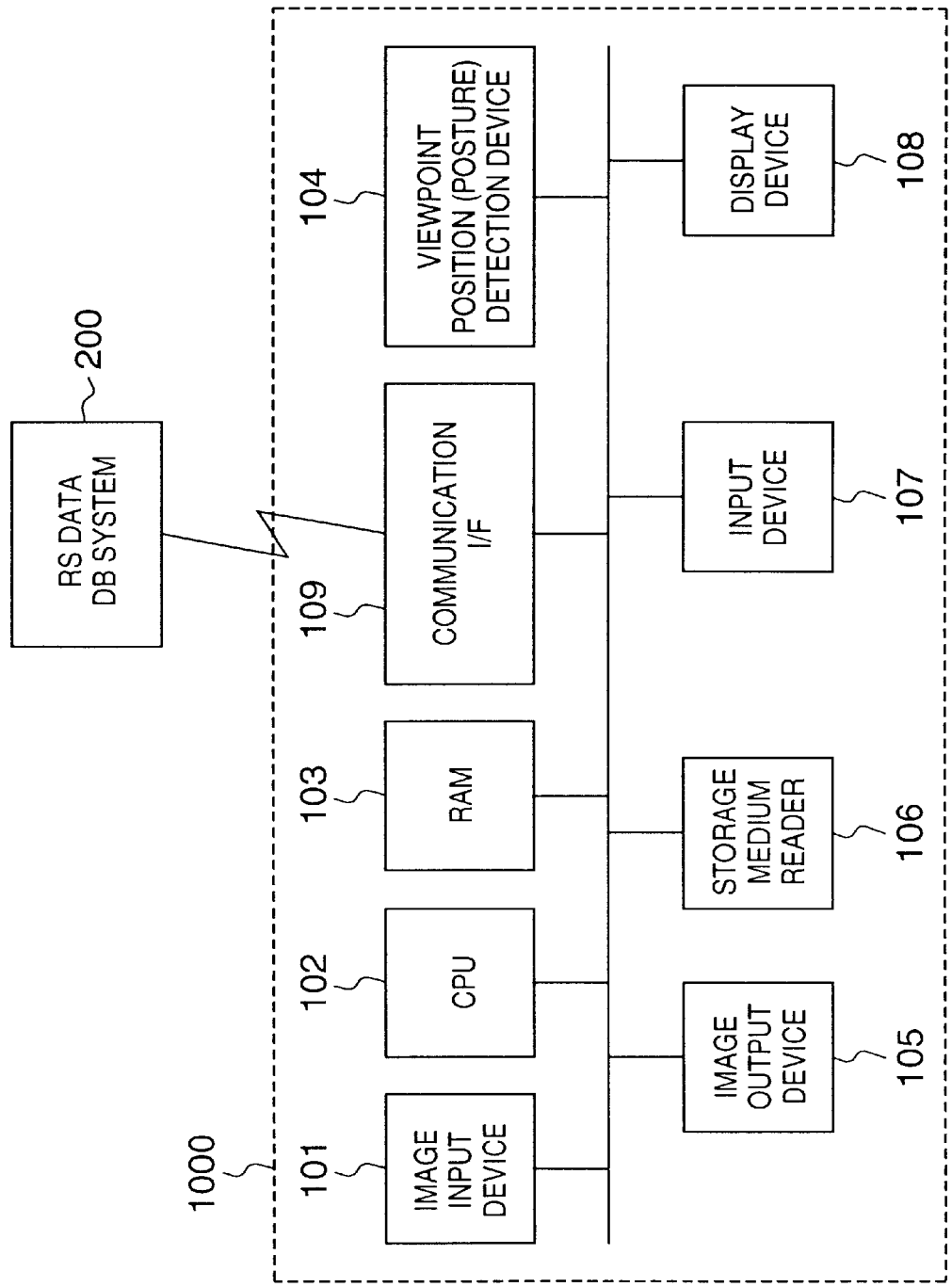
FIG. 8 is a block diagram showing the arrangement of an image processing apparatus according to the first embodiment of the present invention.

In this embodiment, the present invention is applied to an application that provides a walk-through environment to the user using actually captured image group data captured at a plurality of viewpoint positions. FIG. 8 is a schematic diagram of an embodiment of an apparatus that generates and displays an image at an arbitrary viewpoint position from a group of actually captured images captured at a plurality of viewpoint positions.

Referring to FIG. 8, reference numeral 101 denotes an image input device for sensing a group of actually captured images. The image input device may capture a large number of images by shifting the position of a single camera or by setting a plurality of cameras. In place of the image input device 101, a database that stores a large number of images captured in advance may be used. Reference numeral 102 denotes a CPU that executes processes in accordance with programs stored in a high-speed memory 103 such as a RAM or the like. Reference numeral 103 denotes a storage device which stores image data of the group of actually captured images, RS data generated based on multi-viewpoint images, a walk-through application program that instructs the processing sequence of the CPU, and the like, and is partially used as a work memory. Reference numeral 104 denotes a viewpoint/line-of-sight detection device for detecting the viewpoint position/line-of-sight direction of the viewer. The viewpoint/line-of-sight detection device can use an input device such as a keyboard, mouse, and the like, or a device with sensors such as an HMD (head-mounted display) or the like. Reference numeral 105 denotes an image output device for displaying an image generated in accordance with the viewpoint position/line-of-sight direction of the viewer. The image output device can use a conventional two-dimensional display such as a CRT, liquid crystal display, or the like, or a three-dimensional display such as a lenticular display, HMD, or the like. Note that the program may be recorded on a storage medium such as an FD (floppy disk), CD-ROM, magnetic tape, or the like, and may be stored in the storage device 103 after it is read out via a storage medium reader 106.

Reference numeral 200 denotes a database system of RS data. The database system 200 serves as a file server for a host 1000 constructed by the CPU 102.

Figure 9:
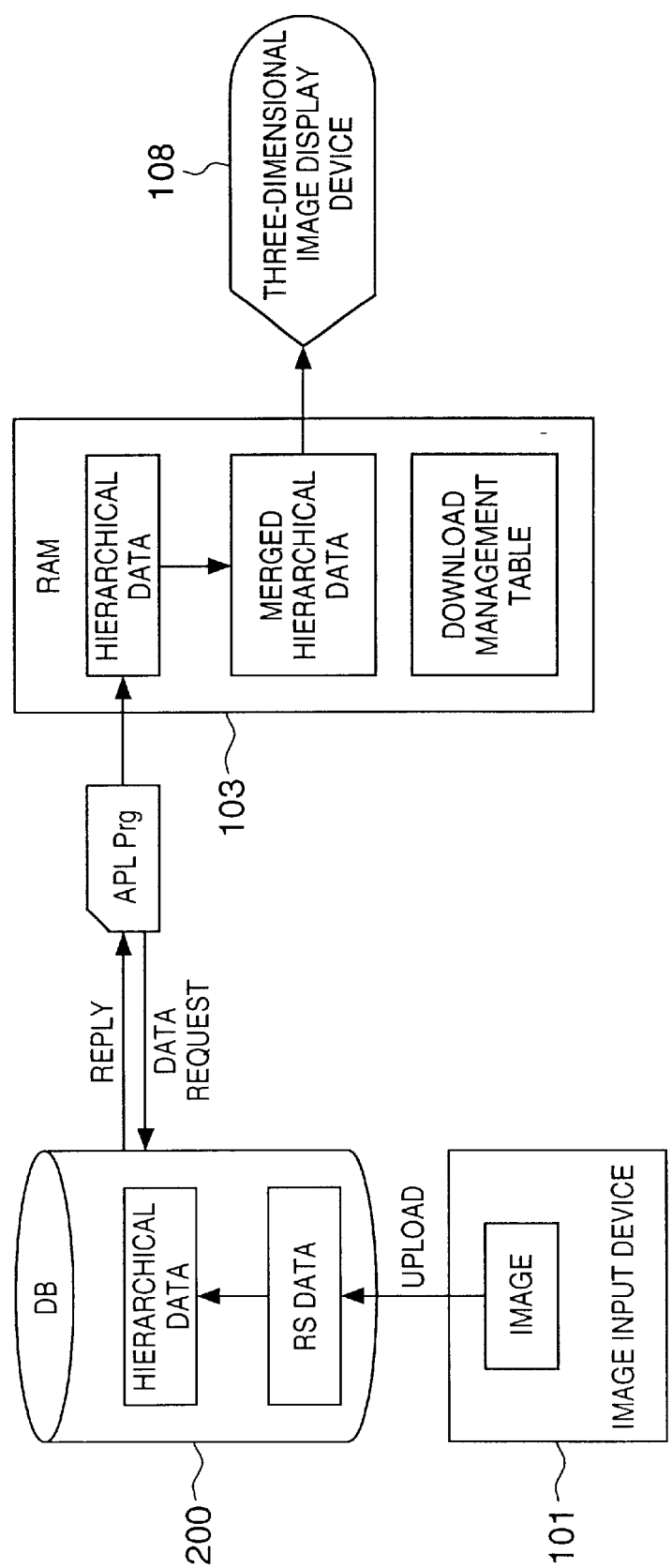
FIG. 9 is a block diagram showing the flow of data in the embodiment shown in FIG. 8.

A characteristic feature of this embodiment lies in that when the application program that provides a walk-through environment requires RS data used to render a virtual space, RS data is hierarchized (into four layers in this embodiment, for the sake of simplicity), and hierarchical RS data is downloaded layer by layer in place of directly downloading RS data from the database 200 to the RAM 103, as shown in FIG. 9. The application program merges and restores the downloaded hierarchical RS data, renders a virtual image based on the restored data, and displays the virtual image on a display device 108.

The RAM 103 has allocated therein a management table that manages the progress of downloading, and its details will be explained later with reference to FIG. 27.

As will be described later, RS data is comprised of a pair of image data and map data (a map that indicates correspondence between the x-u space and x-y space). Therefore, the way the RS data comprised of image data and map data are hierarchized in the database 200, and the way the hierarchical ray space are restored are important.

Figure 10:
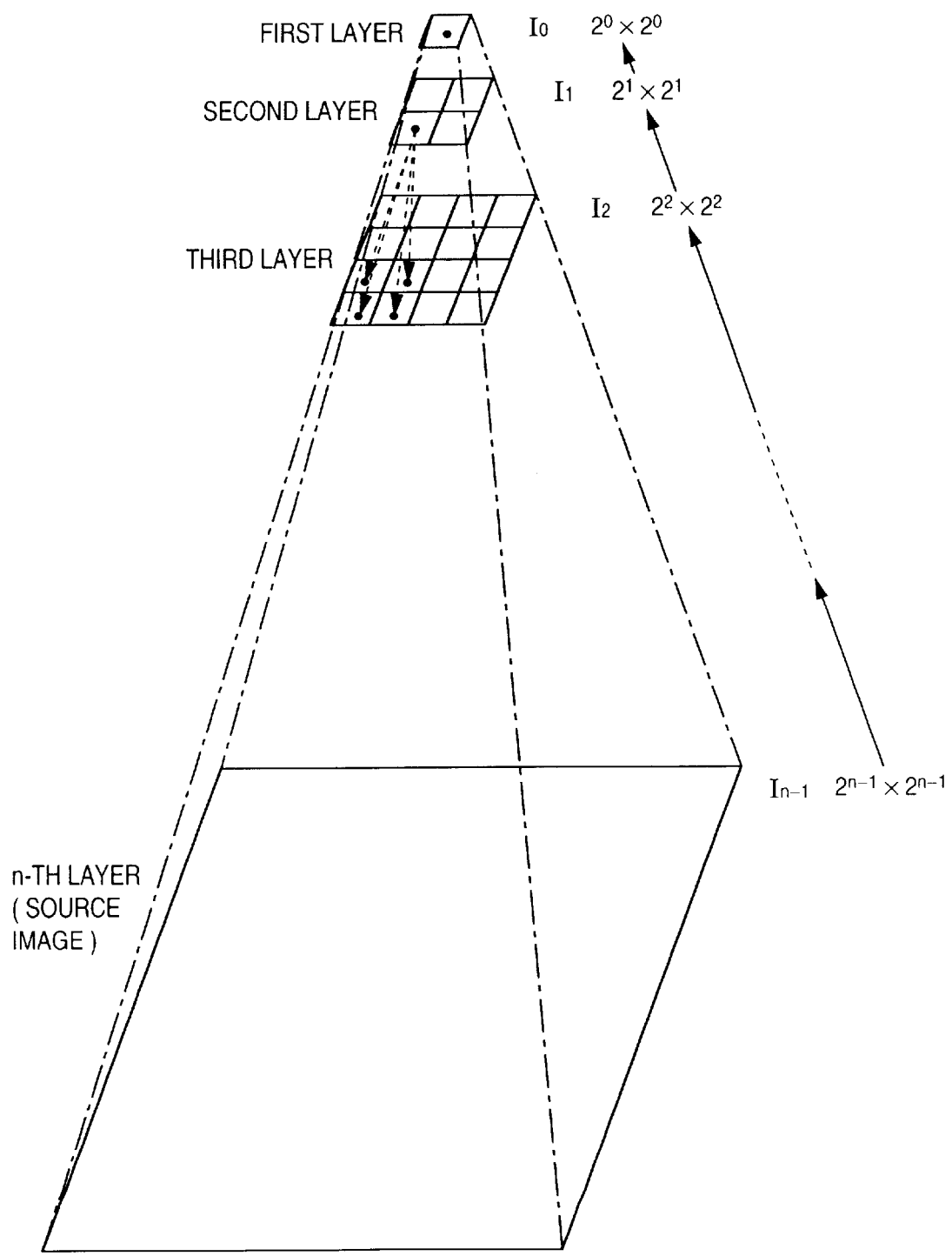
FIG. 10 is a view for explaining the principle of hierarchizing image data used in the image processing apparatus of the first embodiment.

FIG. 10 shows the concept of hierarchization applied to this embodiment, and exemplifies hierarchization for image data of RS data. Hierarchization of map data will be explained later with reference to FIGS. 17 to 20. In the example shown in FIG. 10, n layers of images $I_{n-1}, I_{n-2}, \ldots, I_0$ respectively having $2^{n-1} \times 2^{n-1}, 2^{n-2} \times 2^{n-2}, \ldots, 2^0 \times 2^0$ pixels are generated based on a source image $I_{n-1}$ (an image of the lowermost layer in FIG. 10) having $2^{n-1} \times 2^{n-1}$ pixels. In the example shown in FIG. 10, image data of certain layer i is given by, e.g., the average value of pixel values within the corresponding 2×2 pixel range of an image of layer i+1.

The control sequence for generating map data indicating correspondence between the captured multi-viewpoint images and RS data will be explained below using the flow chart shown in FIG. 11. This control sequence corresponds to uploading of an image from the image input device 101 to the database 200. Note that control sequence in FIG. 11 may be done while the DB system 200 controls the image input device 101, or image data temporarily read from the image input device 101 may be stored in a memory (not shown) and that image data may undergo a map data generation process. In any case, the control sequence of FIG. 11 is suitable for an offline process (batch process) in terms of its nature.

Figure 11:
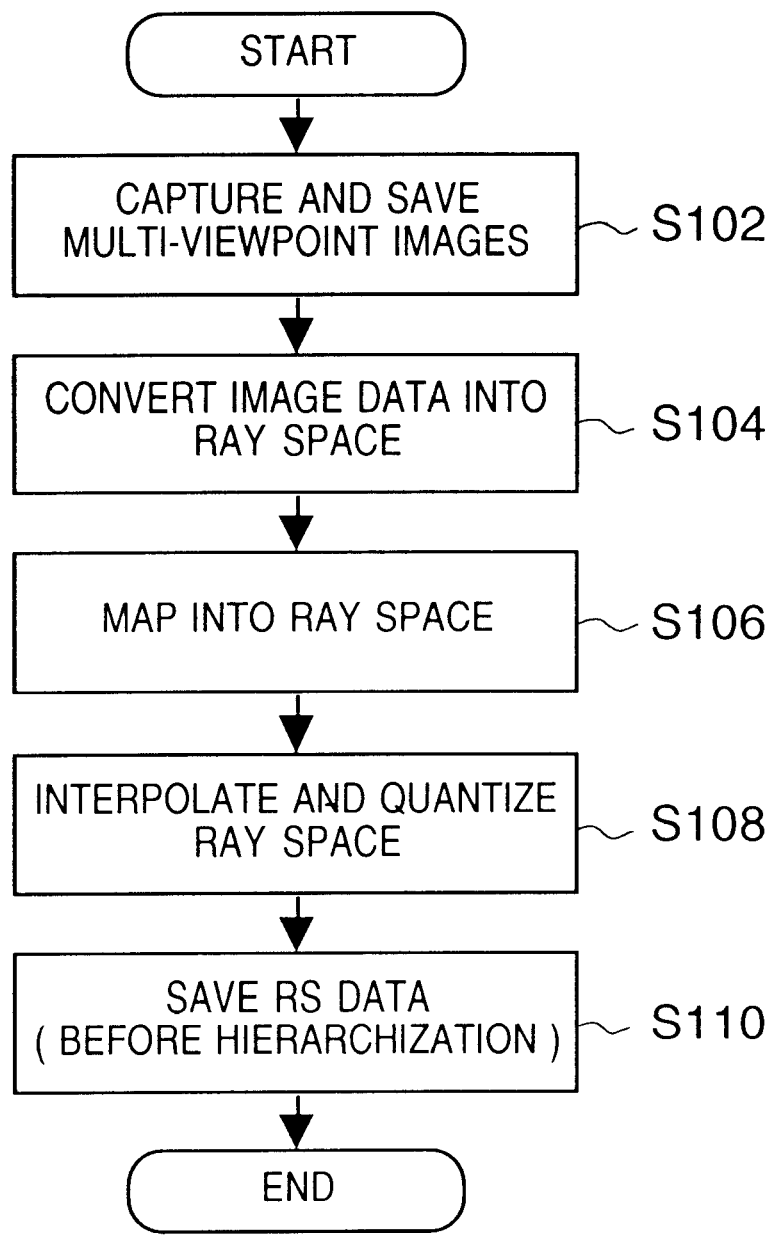
FIG. 11 is a flow chart for explaining a process for converting image data captured at multi-viewpoints into RS data, and storing the converted data in the first embodiment.

In step S102 in FIG. 11, E images are captured from a plurality of viewpoint positions using the image input device 101, and are saved in the storage device 103. In step S104, data for the first line in each image data saved in the storage device 103 is decomposed into ray space groups, which are mapped in a ray space (x, u) in accordance with equation (1) or (2) above. This mapping will be explained below using FIG. 12.

Figure 12:
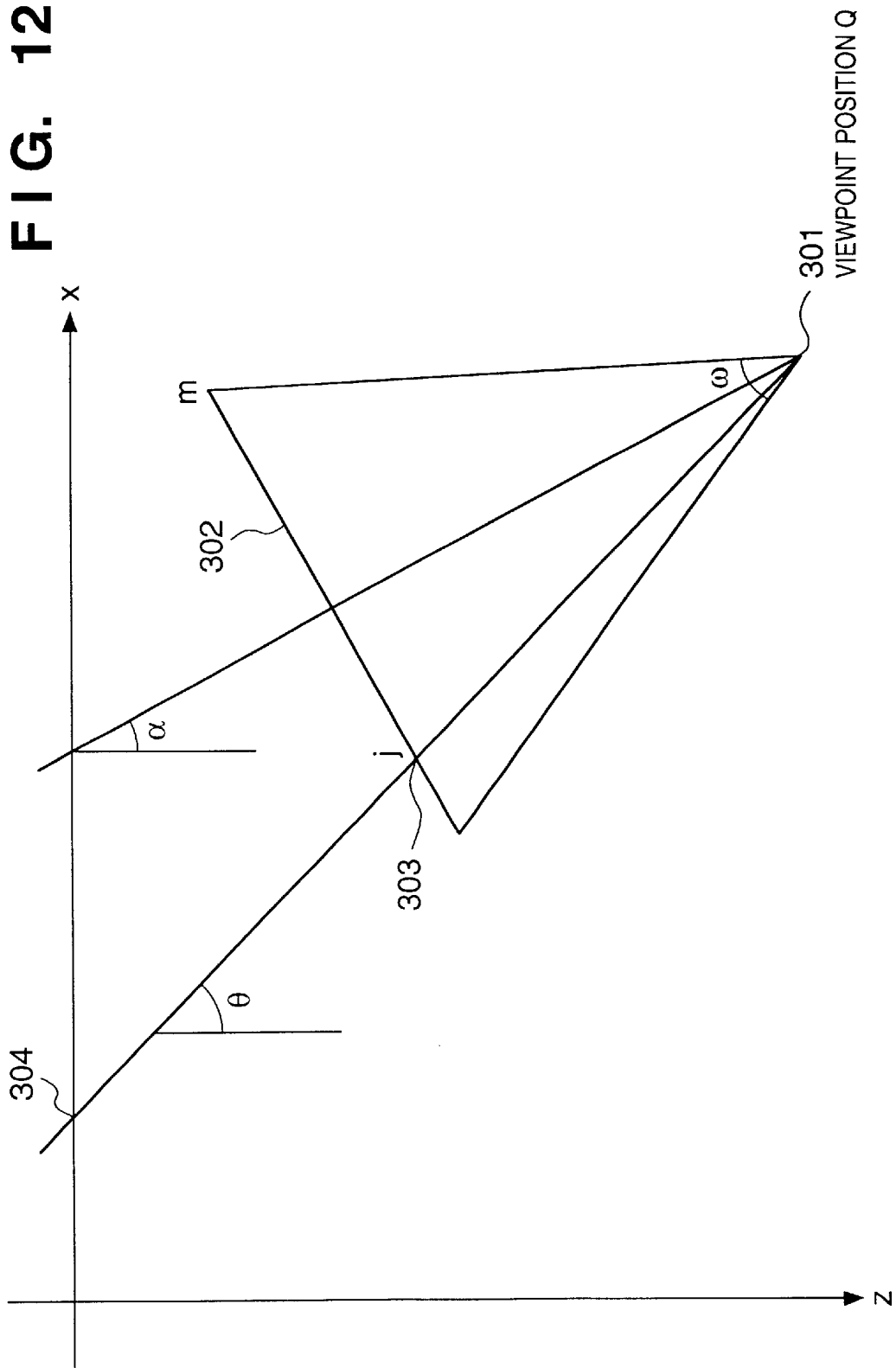
FIG. 12 is a view for explaining a process for decomposing an input image into light ray groups.

In a situation shown in FIG. 12, a represents the deviation angle of the optical axis with respect to the Z-axis, and a camera is set at a position $Q(x_0, z_0)$ of the lens center (this position is assumed to be a viewpoint position) to sense an image. Referring to FIG. 12, reference numeral 301 denotes a viewpoint position $Q(x_0, z_0)$; 302, an image sensing plane; 303, the j-th pixel of an arbitrary line in the image sensing plane; α, an angle the camera optical axis from the user viewpoint (i.e., a virtual camera viewpoint) makes with the Z-axis; θ, an angle a light ray which passes through the viewpoint position 301 and the j-th pixel 303 makes with the Z-axis; ω, a field angle of the camera; and 304, a point where a light ray that passes through the j-th pixel intersects with the Z-axis. If m represents the number of pixels of each line in the image sensing plane, the angle data θ indicating the light ray direction can be obtained by solving:

$$m/2 \cdot \tan(\theta \cdot \alpha) = (j - m/2)\tan(\omega/2) \quad (3)$$

The process for converting image data into the ray space in step S104 is to obtain E×m light ray directions $\theta_i$ (i=1 to E×m) by applying equation (3) to data (i.e., data for E×m pixels) for the first line in E image data. In step S106, E×m light ray groups having E×m light ray directions $\theta_i$ (i=1 to E×m) are mapped in a ray space in accordance with equations (1) and (2). If a light ray generated from the h-th pixel in the k-th image (an image captured at the k-th viewpoint position) in the main scan direction is mapped at a position $(x_l, u_l)$ in the ray space, the data recorded in the ray space is data expressed by recording a value:

(k, h) (where k: image number, h: main scan pixel position)

at the position $(x_l, u_l)$ in the ray space.

As the reason why only data for the first line in each image data are mapped in the ray space, equations (1) and (2) do not include any term in the height (y) direction of an image, as can be seen from these equations. For this reason, data in the second and subsequent lines of each image data are mapped at the same position (in the ray space) as that of data of the first line. Therefore, when only the data of the first line in each image are computed, the mapping position of other data in the ray space can be automatically obtained. Also, by computing data for only the first lines, a high-speed process can be attained.

Furthermore, in step S108 the x- and u-axes are quantized so that the mapped RS data maintain a resolution equivalent to that of the input image. Such quantization can suppress generation of insignificant data.

Figure 13:
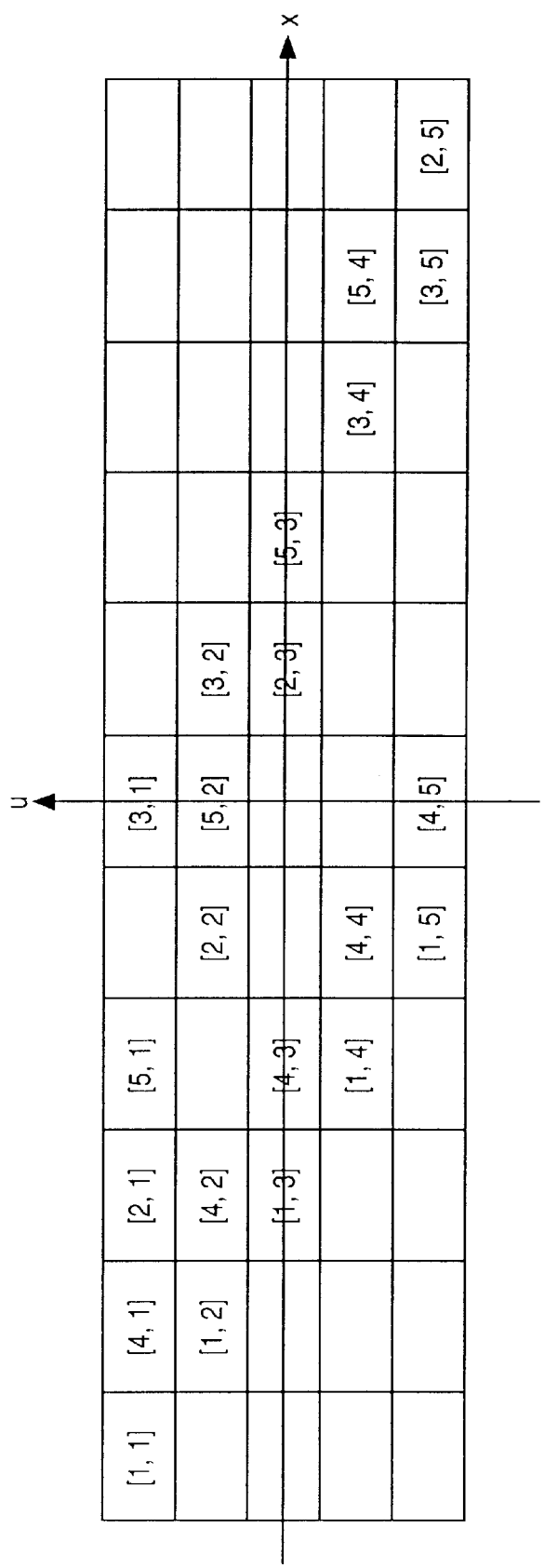
FIG. 13 is a view for explaining an example of quantized RS data upon completion of interpolation of a ray space.

FIG. 13 shows an example of the quantized RS data upon completion of the process up to step S108. For the sake of simplicity, this example has 11×5 elements since the x- and u-axes are quantized. Each element records a set of:

[image number, pixel number]=[k, h]

corresponding to each light ray. In the example shown in FIG. 13, since (x, u) coordinates (1, 0) have a value [2, 3], it indicates that ray space (1, 0) corresponds to image data of a pixel of pixel number 3 in an image of number 2.

Although set elements in a real image space have one-to-one correspondence with those in the ray space, the values of some elements are not determined (blanks in FIG. 13) due to quantization. For this reason, in step S108 interpolation process, i.e., a process for estimating the values of elements whose values are not determined yet is done together with quantization. In this case, the estimation method uses the nearest neighbor method. However, the present invention is not limited to such specific method, and any other methods may be used in estimation. The estimated value is recorded in the corresponding element as a set of [image number, pixel number]. When the RS data are held in such format, since arbitrary viewpoint image generation to be described later can be done by looking up a table (correspondence table), a high-speed process can be achieved.

Figure 14:
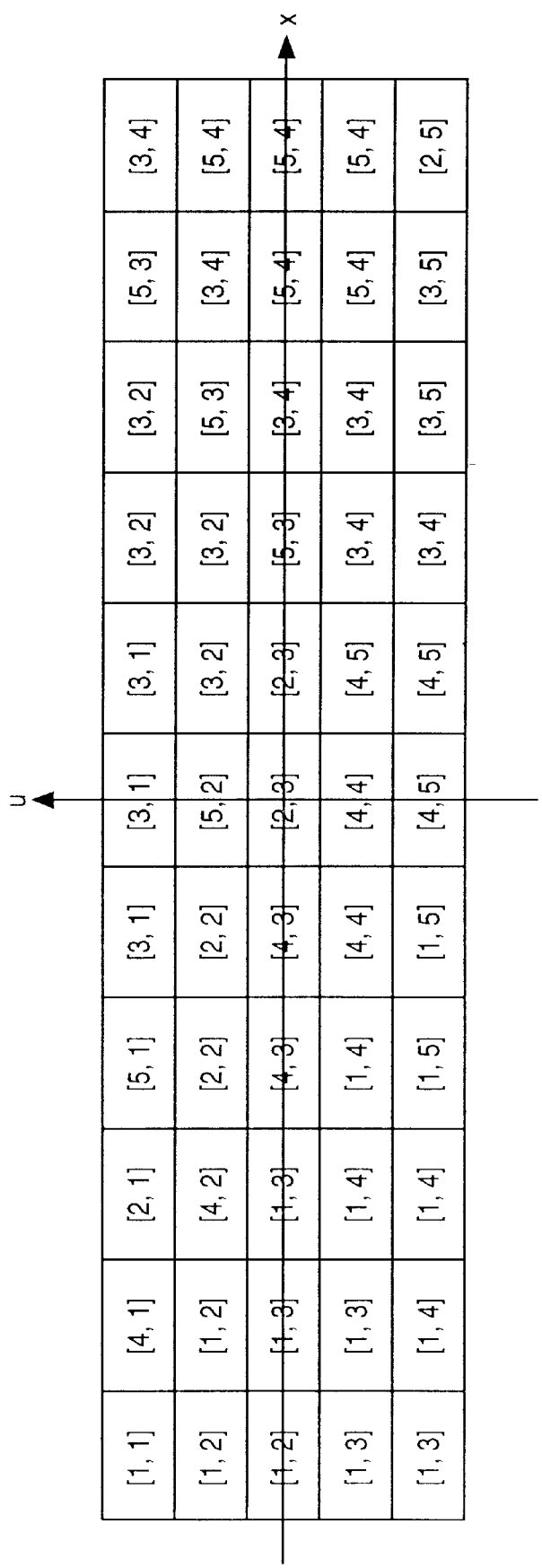
FIG. 14 is a view showing the interpolation result of the RS data shown in FIG. 13.

FIG. 14 shows an example of the correspondence map obtained as a result of the processes in steps S102 to S108. Note that the example of FIG. 14 is obtained by interpolating the example shown in FIG. 13 by the nearest neighbor method.

In step S110, the obtained correspondence map and source image data (a set of image number k, pixel position h, and pixel value P) are stored in a predetermined large-size memory in the DB system 200 as RS data (to be referred to as "non-hierarchical RS data" hereinafter).

As has been explained using FIG. 9, in this embodiment, hierarchical RS data is downloaded in place of raw RS data. Since RS data consists of map data and image data, hierarchizing RS data amounts to hierarchizing both image and map data. Since hierarchization of image data uses known hierarchical encoding in this embodiment, that of map data will be mainly explained.

Figure 17:
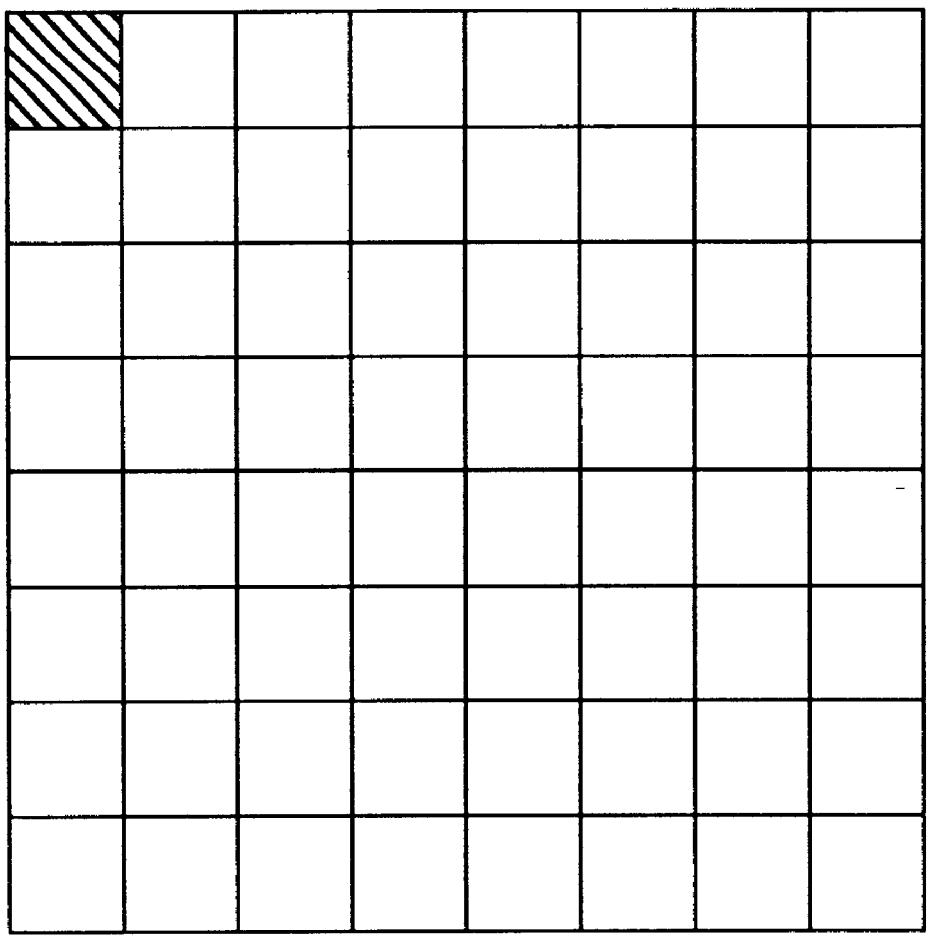
FIG. 17 shows the configuration of first-layer map data.

As described above, the map data of this embodiment is generated to have a two-dimensional structure, as shown in FIG. 13. Upon hierarchizing the map data, the map data is segmented into blocks each having an 8×8 size. In each block, a discrete level value ranging from "1" to "4" is assigned to 64 cells (=8×8) in each block, as shown in, e.g., FIG. 14. Intra-block positions corresponding to the respective discrete level values are as shown in FIG. 15. That is, in each block:

A discrete level value="1" is assigned to only an element at the upper left corner and, as a consequence, only one element has a discrete level value="1". Hierarchical data consisting of an element with a discrete level value="1" is called a first-layer map $DD_b(1)$ (FIG. 17). The first-layer map $DD_b(1)$ is obtained by extracting an element with a discrete level value="1" (i.e., the element at the upper left corner of each block) from each block. Hence, the data size of the first-layer map data is compressed to:

1/64 compared to the original map data. That is, the first-layer map data is map data obtained by decimating the original map data to 1/8 in both the vertical and horizontal directions.

Figure 18:
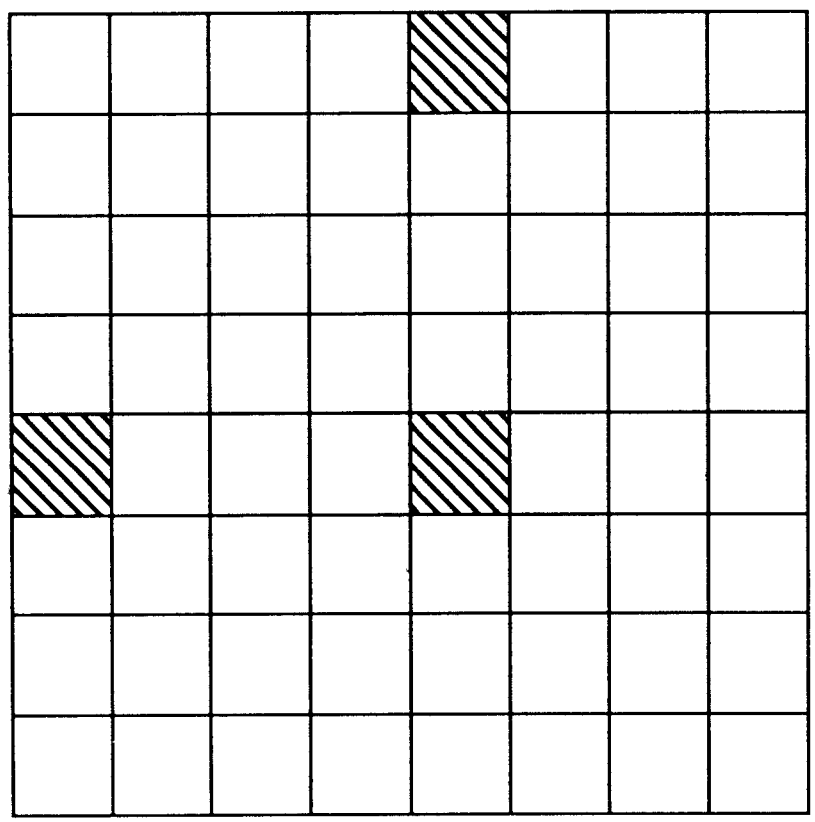
FIG. 18 shows the configuration of second-layer map data.

A discrete level value="2" is assigned to elements at positions separated four pixels in both the vertical and horizontal directions and, as a consequence, only three pixels have a discrete level value="1" in one block. Hierarchical data consisting of elements with a discrete level value="2" for object b is called second-layer map data $DD_b(2)$ (FIG. 18). The second-layer map data $DD_b(2)$ is obtained by extracting only elements with a discrete level value "2" from each block.

Figure 19:
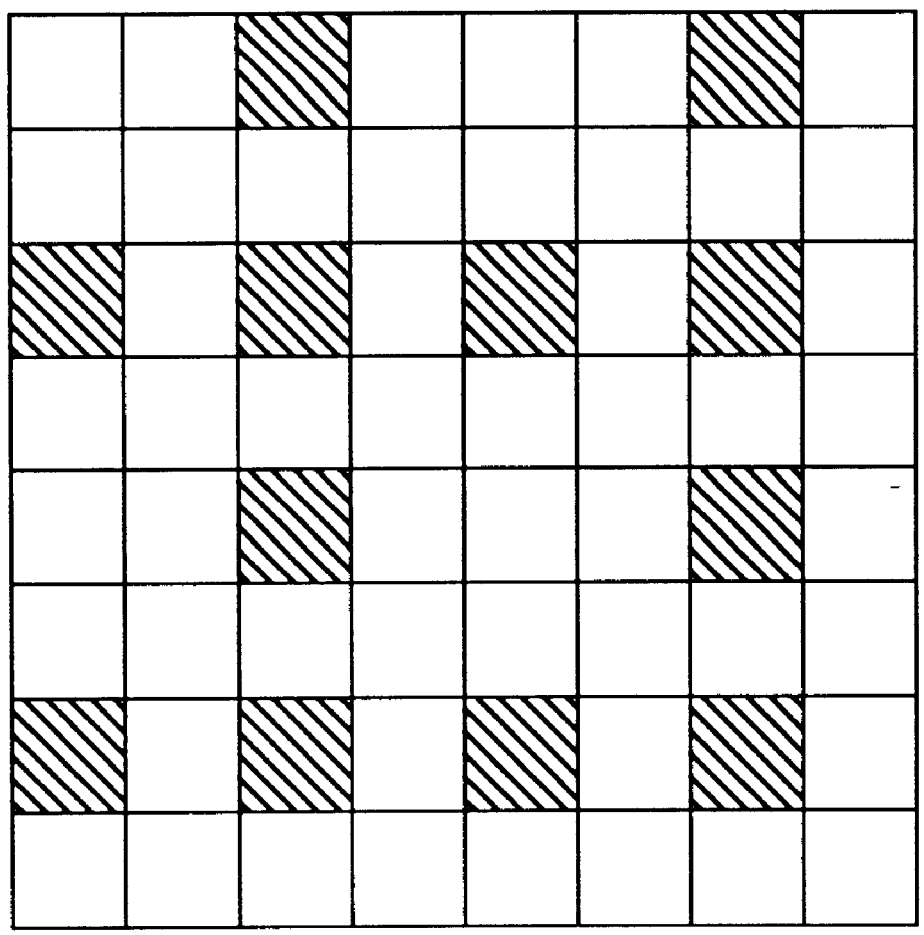
FIG. 19 shows the configuration of third-layer map data.

Elements with a discrete level value="3" are set so that only 12 elements are discretely distributed in one block. Hierarchical data consisting of elements with a hierarchical value="3" is called third-layer map data $DD_b(3)$ (FIG. 19).

Figure 20:
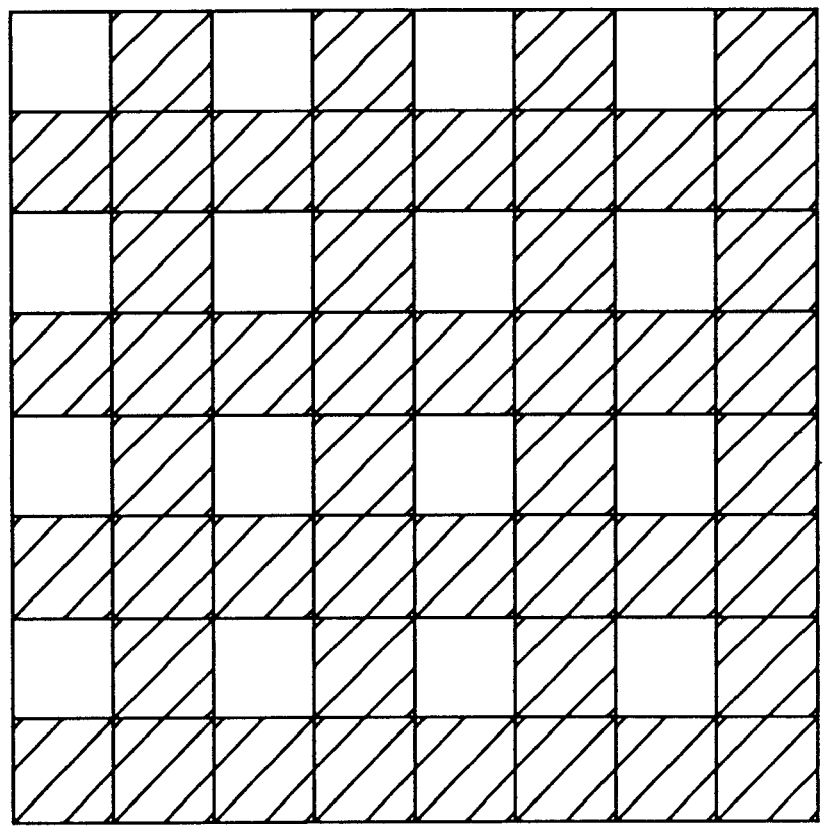
FIG. 20 shows the configuration of fourth-layer map data.

Elements with a discrete level value="4" are set so that only 48 elements are discretely distributed in one block. Hierarchical data consisting of elements with a hierarchical value="4" is called fourth-layer map data $DD_b(4)$ (FIG. 20).

Note that the distribution (positions and numbers) of discrete level values is not limited to the above example, and various modifications are freely made as long as the total number of pixels matches. One block size is set to be 8×8 since the number of divided layers is four, and the reason for this will be explained later.

As will be apparent from the control sequence to be described later, since RS data of the respective discrete levels, the data sizes of which are reduced, are downloaded from the DB 200 to the host 1000, the time required for downloading is short. Hence, the application program on the host 1000 side can render a virtual image at higher speed than a case wherein raw RS data is downloaded.

In this embodiment, a virtual image is rendered based on RS data obtained by merging hierarchical map data downloaded at the rendering timing with merged hierarchical map data which have been downloaded and saved so far, in place of directly using the hierarchical map data. That is, merged hierarchical map data $D_b(i)$ of layer count i of given object b is computed by:

$$D_b(i) = SD_b(i-1) + DD_b(i) \tag{4}$$

(where "+" is ORing)
on the basis of merged hierarchical map data $SD_b(i-1)$ of layer count i−1 so far, and hierarchical map data $DD_b(i)$ of discrete level $d_b(i)$ FIGS. 21 to 24 respectively show merged first-layer map data $SD_b(1)$, merged second-layer map data $SD_b(2)$, merged third-layer map data $SD_b(3)$, and merged fourth-layer map data $SD_b(4)$.

Figure 21:
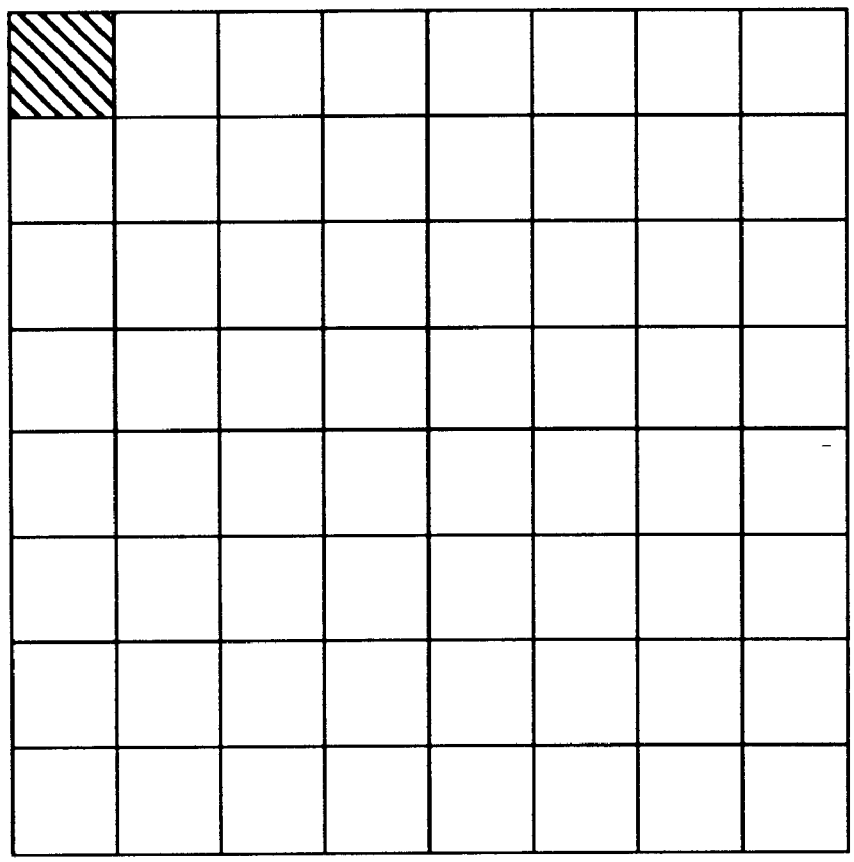
FIG. 21 shows the configuration of merged first-layer map data.

That is, as shown in FIG. 21, the merged first-layer map data $SD_b(1)$ is equal to the first-layer map data $DD_b(1)$ (FIG. 17). The merged first-layer map data $SD_b(1)$ is obtained by extracting an element with a discrete level value "1" (i.e., an element at the upper left corner position of each block) from each block. Only one such element is included in each block. Therefore, the merged first-layer map data $SD_b(1)$ is reduced to:

$\frac{1}{64}$ compared to the original map data. That is, this map data is obtained by decimating the original map data to ⅛ in both the vertical and horizontal directions.

Figure 22:
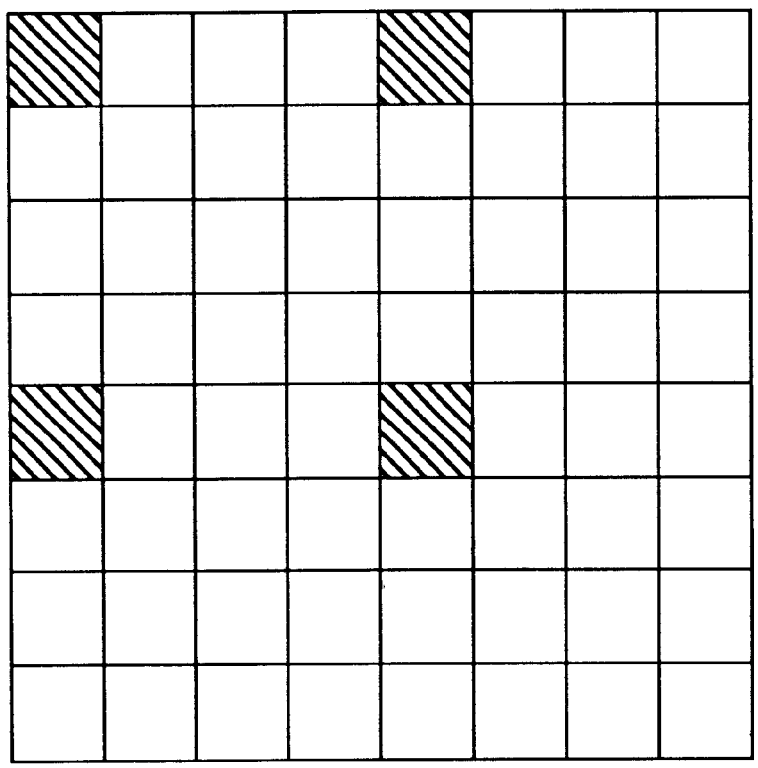
FIG. 22 shows the configuration of merged second-layer map data.

The merged second-layer map data $SD_b(2)$ is as shown in FIG. 22, since it is the sum of the merged first-layer map data $SD_b(1)$ and second-layer map data $DD_b(2)$ (FIG. 18). That is, the merged second-layer map data $SD_b(2)$ is obtained by extracting only elements with discrete level values="1" and "2" from each block. Each block includes only one element with a discrete level value="1", and only three elements with a discrete level value="2". The number of elements of the merged second-layer map data $SD_b(2)$ is 4 and, hence, its data size is compressed to:

$\frac{1}{16}$ with respect to the original map data. That is, the merged second-layer map data $SD_b(2)$ is map data obtained by decimating the original map data to ¼ in both the vertical and horizontal directions.

Figure 23:
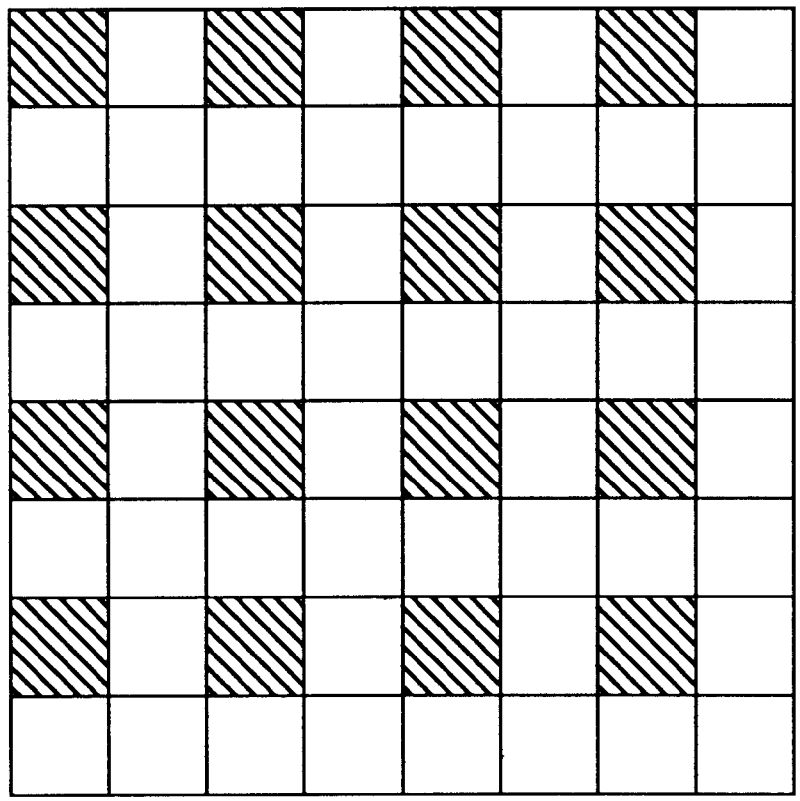
FIG. 23 shows the configuration of merged third-layer map data.

The merged third-layer map data $SD_b(3)$ is as shown in FIG. 23, since it is the sum of the merged second-layer map data $SD_b(2)$ and third-layer map data $DD_b(3)$ (FIG. 19). That is, the merged third-layer map data $SD_b(3)$ is obtained by extracting only elements with discrete level values="1", "2", and "3" from each block. Each block includes only one element with a discrete level value="1", only three elements with a discrete level value="2", and only 12 elements with a discrete level value="3". The number of elements of the merged third-layer map data $SD_b(3)$ is 16 and, hence, its data size is compressed to:

$\frac{1}{4}$ with respect to the original map data. That is, the merged third-layer map data $SD_b(3)$ is map data obtained by decimating the original map data to ½ in both the vertical and horizontal directions.

Figure 24:
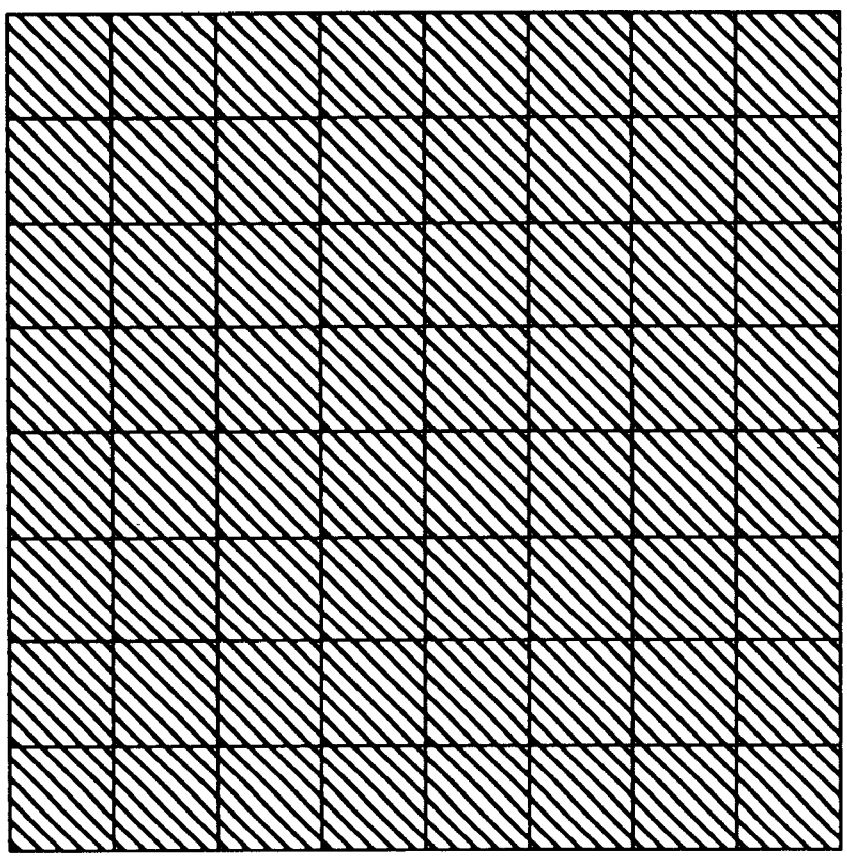
FIG. 24 shows the configuration of merged fourth-layer map data.

The merged fourth-layer map data $SD_b(4)$ is as shown in FIG. 24, since it is the sum of the merged third-layer map data $SD_b(3)$ and fourth-layer map data $DD_b(4)$ (FIG. 20). That is, the merged fourth-layer map data $SD_b(4)$ is obtained by extracting only elements with discrete level values="1", "2", "3", and "4" from each block. Each block includes only one element with a discrete level value="1", only three elements with a discrete level value="2", only 12 elements with a discrete level value="3", and only 48 elements with a discrete level value="4". The number of elements of the fourth-layer map data generated by a process in step S314 is 64 and, hence, the merged fourth-layer map data $SD_b(4)$ is nothing but the original map data.

In this way, the correspondence map is hierarchized. The hierarchized image data and map data will be referred to as "hierarchical RS data" hereinafter, and these hierarchized data will be referred to as "hierarchical RS space data" hereinafter.

The relationship between the number p of divided layers (four in this embodiment) and block size N (8×8 in this embodiment) will be explained below.

In this embodiment, the resolution of the uppermost layer preferably matches that of source RS data. Hence, $N = 2^{p-1}$ However, the number of layers and block size cannot often be set in such relationship. Especially, hierarchical map data includes the address of image data before hierarchization, i.e., an address which is not present in image data of the first layer. For example, assume that the merged map data of the first layer includes address (5, 23), the 23rd column indicates a pixel of image data before hierarchization, but must be degenerated to the 2nd column when image data is divided into four layers. Note that "2" of the 2nd column is obtained by:

$$\left[\frac{23-1}{8}\right] \tag{5}$$

where [ ] is the Gauss' notation. Hence, the aforementioned conversion must be taken into consideration in an actual process. In general, this conversion is given by:

$n_i = [n_j - 1/2^{p-i}]$ where p is the number of divided layers, i is the layer of interest, $n_i$ is the converted address, and $n_j$ is the address indicating the column position of merged map data of the i-th layer.

Figure 25:
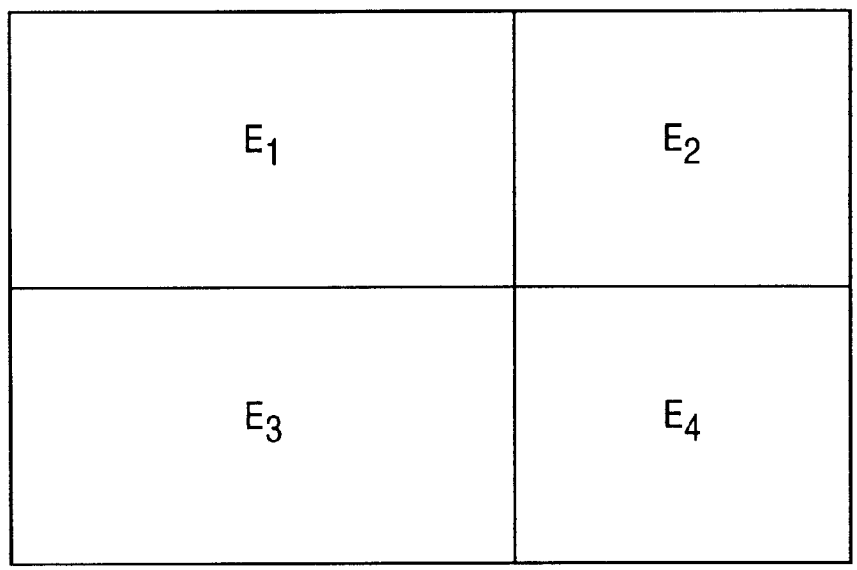
FIG. 25 is a view for explaining a virtual space which is segmented into a plurality of subspaces or includes a plurality of objects.

The hierarchical RS data generated in this manner are obtained for multi-viewpoint images obtained in correspondence with individual objects. That is, if a certain virtual space includes L virtual objects (or real objects), L sets of hierarchical RS data are obtained. FIG. 25 shows the presence of four virtual objects (or real objects) in a given space, i.e., shows the four sets of hierarchical RS data obtained for the four objects assuming that $E_1$, $E_2$, $E_3$, and $E_4$ images are respectively obtained for objects 1 to 4.

A method of generating an image at a desired viewpoint position using hierarchical RS data will be described below with reference to the flow chart in FIG. 26. A virtual image from an arbitrary viewpoint position (including the line-of-sight direction) is rendered on the basis of the hierarchized image data and map data. This process is preferably done in real time. However, since this embodiment uses hierarchical RS data, and a virtual image is rendered based on at least RS data of the first layer which has a low resolution but can be seen through entirely, the user can recognize a virtual space in real time.

In this embodiment, the number of divided layers is not limited to 4, but an arbitrary number of divided layers can be set as long as the predetermined conditions (e.g., formulas (5), (6), and the like) are satisfied. Hence, the number of divided layers=i in the following description.

Figure 26:
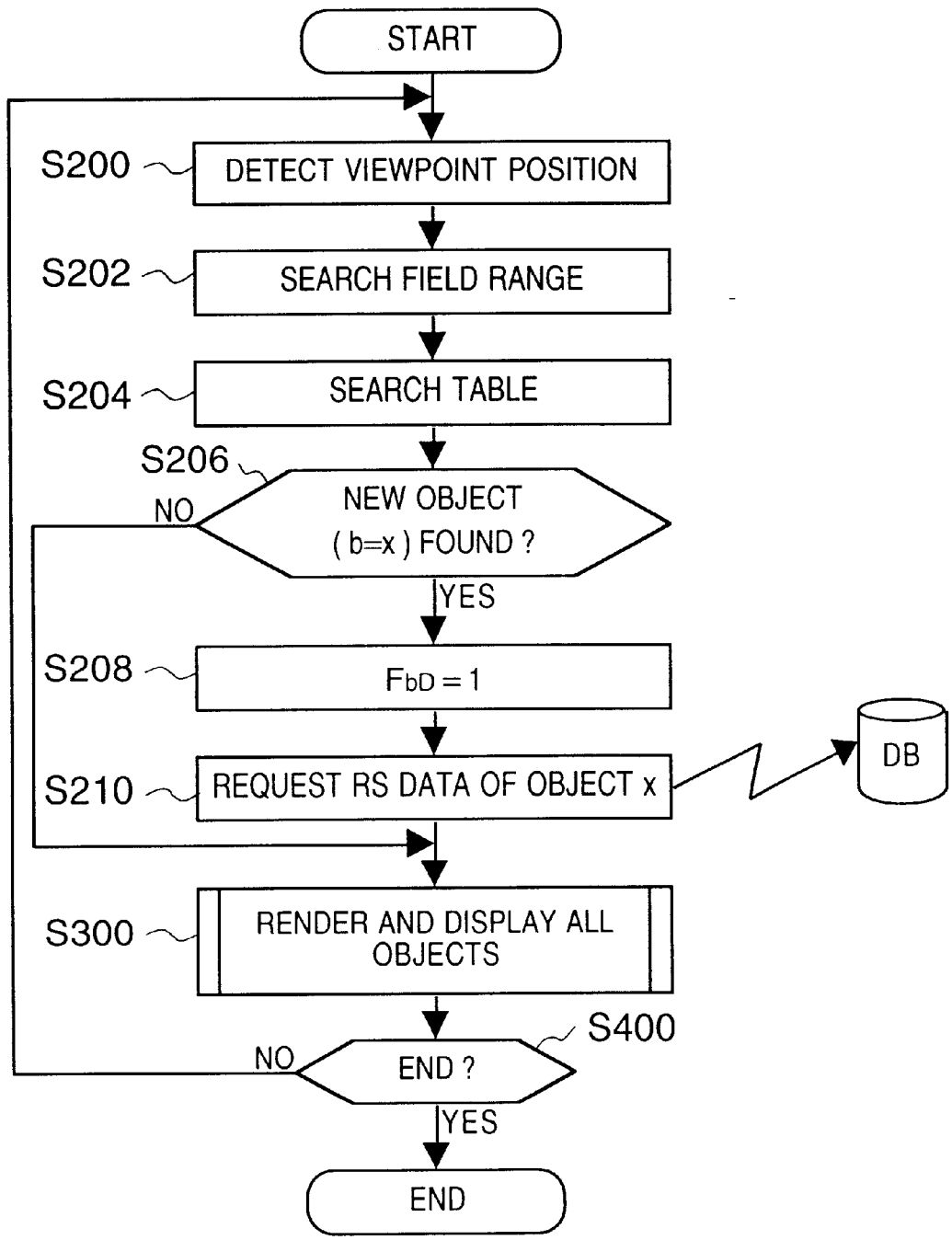
FIG. 26 is a flow chart showing the control sequence of an application program, e.g., a walk-though program for rendering and displaying a virtual space from an arbitrary viewpoint position.

FIG. 26 shows the processing sequence of the application program of this embodiment. In this walk-through application, assume that object numbers b are assigned to objects in a virtual space, and RS data of the individual objects are stored in the DB 200. In other words, a plurality of objects is laid out in a space that is to undergo the walk-through process.

In step S200, the viewpoint position (e.g., the position, line-of-sight direction, and the like of the viewer) of the user is detected. As a means for inputting the position/line-of-sight direction of the user, a joystick, keyboard, magnetic sensor, line-of-sight detector, and the like may be used, but any of these means may be used as long as the viewpoint position can be detected. In step S202, objects falling within the field range that the user can see from this viewpoint position are searched. As described above, since the layout positions of the virtual objects (virtual objects generated based on actually captured images of real objects) placed in the space are known, if the user's viewpoint position can be determined in step S200, object numbers b of all virtual objects that can be seen from that position can be specified.

In step S204, the management table is searched to determine if the data of virtual objects found by search in step S202 are being downloaded from the DB 200. With this search, the object number of a virtual object which appears first when the user has moved to the viewpoint position detected in step S200 can be detected.

FIG. 27 shows the format of the management table used in step S204. In FIG. 27, one record of the management table is made up of four fields. Each record is formed for each object number b, and has a flag $F_{bP}$ and layer number $i_b$. The management table has records, the number of which is equal to that of objects defined in the virtual space to be processed by the walk-through application program of this embodiment. A rendering target flag $F_{bD}$ indicates that object b is to be rendered.

The data flag $F_{bP}$ and layer number $i_b$ indicate that hierarchical data of the layer number $i_b$ of RS data of that object b is present on the RAM 103 of the host. The data flag $F_{bP}$ and layer number $i_b$ are updated every time the application program of the host receives RS data.

The layer number $i_b$ assumes a value ranging from "0" to "4". The reason why the layer number $i_b$ has a maximum value="4" is that the number of divided layers in this embodiment is set at 4 for the sake of simplicity. FIG. 27 that shows an example when downloading has progressed to some extent indicates that RS data with layer number $i_b$="3" for an object with object number b="1", RS data with layer number $i_b$=1 for an object with object number b=2, RS data with layer number $i_b$="2" for an object with object number b=3, and RS data with layer number $i_b$="4" for an object with object number b=4 are being downloaded to the host 1000 side.

The layer number $i_b$ corresponds to resolution. In this embodiment, if RS data with layer number $i_b$ of any one of 1 to 4 is present (has been downloaded) on the host 1000 side, since that data is displayed on the display device 108 of the host 1000 side, display data is present for an object with $i_b \neq 0$. Hence, the value of the corresponding flag $F_{bD}$ is set at "1". In the example of FIG. 27, since display data of any resolution are present for objects 1 to 4, the values of the corresponding flags $F_{bD}$ are set at "1", but the value of the flag $F_{bD}$ corresponding to an object with object number b=5 is set at "0".

Therefore, it is determined in step S204 that an object with flag $F_{bD}$=0 is an object that appears "newly". It is checked in step S206 if such object b (=x) is present.

If such object x is found, the flow advances to step S208 to set flag $F_{bD}$=1 to indicate that the object x is to be rendered. In step S210, a download request of RS data of that object x is sent to the DB 200. The flow advances to step S300.

On the other hand, if it is determined in step S206 that no new object is found, the flow advances to step S300.

Step S300 is a routine for rendering and displaying RS data of objects with $F_{bP}$="1" in the management table (FIG. 27).

In this manner, when the viewpoint position detected in step S200 has moved from the previous viewpoint position to forcibly change a space (or object) to be rendered, data indicating the new object to be rendered is stored in step S208, a download request of space data of that virtual object is sent to the database 200 in step S210, and a virtual image of the new object at the viewpoint position detected in step S200 is rendered in accordance with the downloaded new space data (hierarchical space data) in step S300. If a new object is found, the process in step S300 renders virtual images of the existing objects using space data with the highest resolutions among those which have been downloaded so far, as will be described later.

Figure 29:
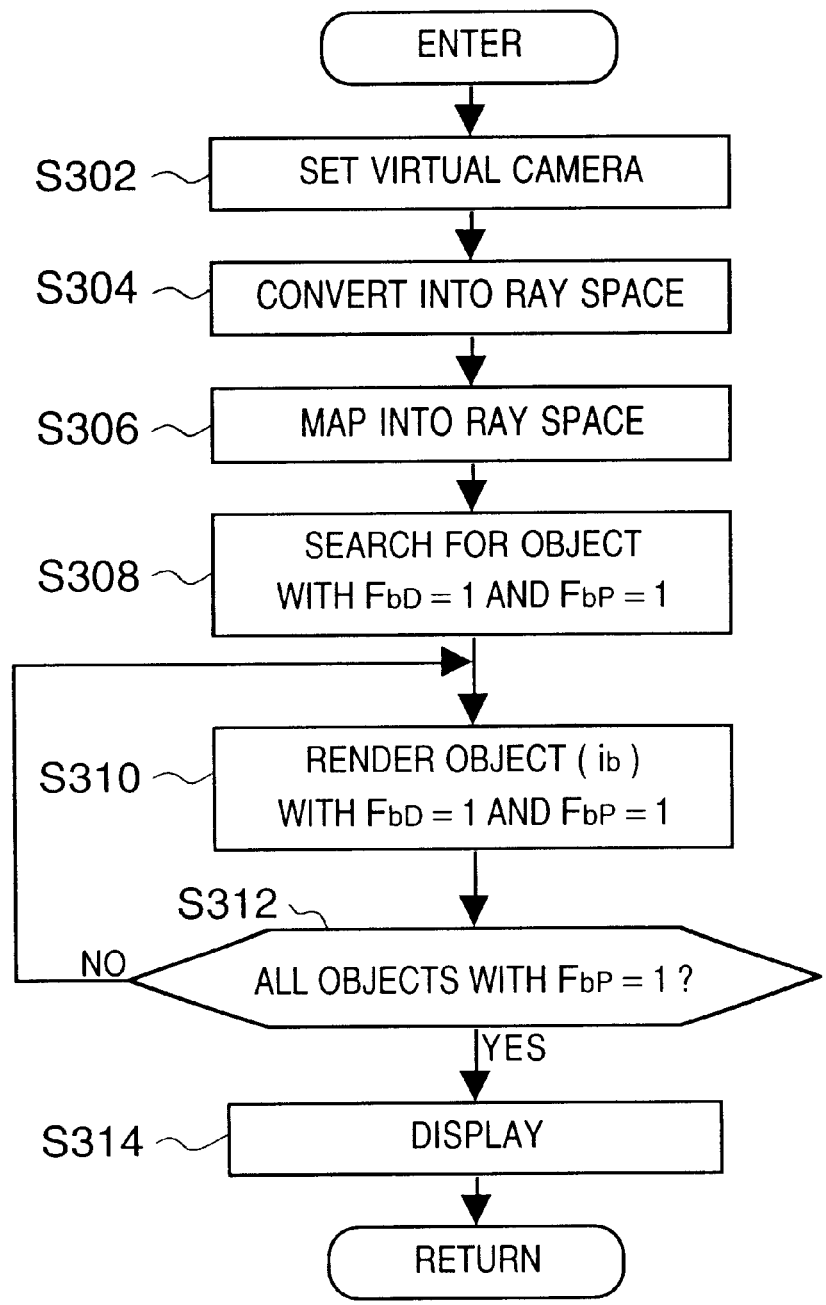
FIG. 29 is a flow chart for explaining details of the rendering/display routine in step S300.
Figure 30:
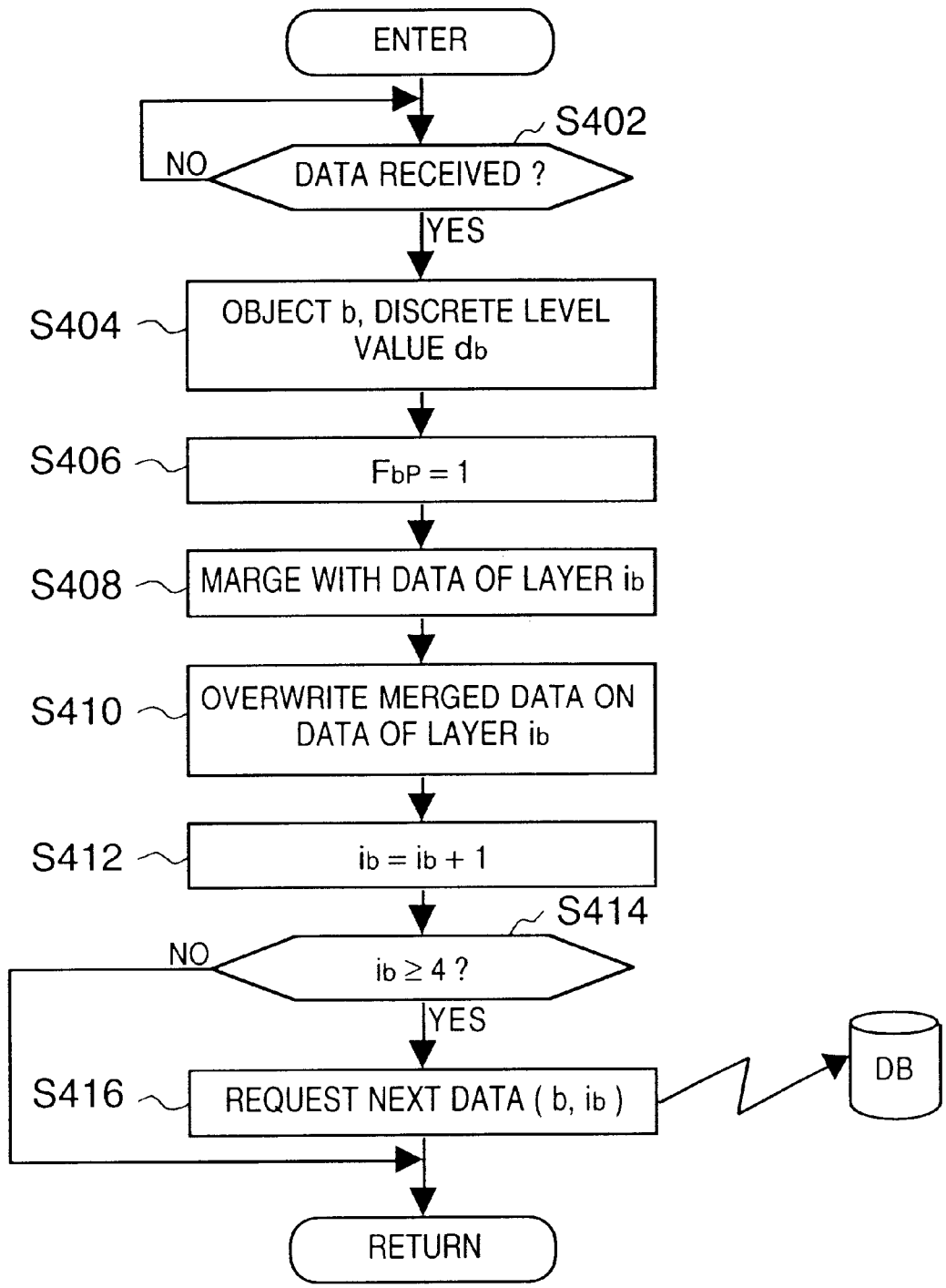
FIG. 30 is a flow chart for explaining the reception routine of RS data on the host side.
Figure 31:
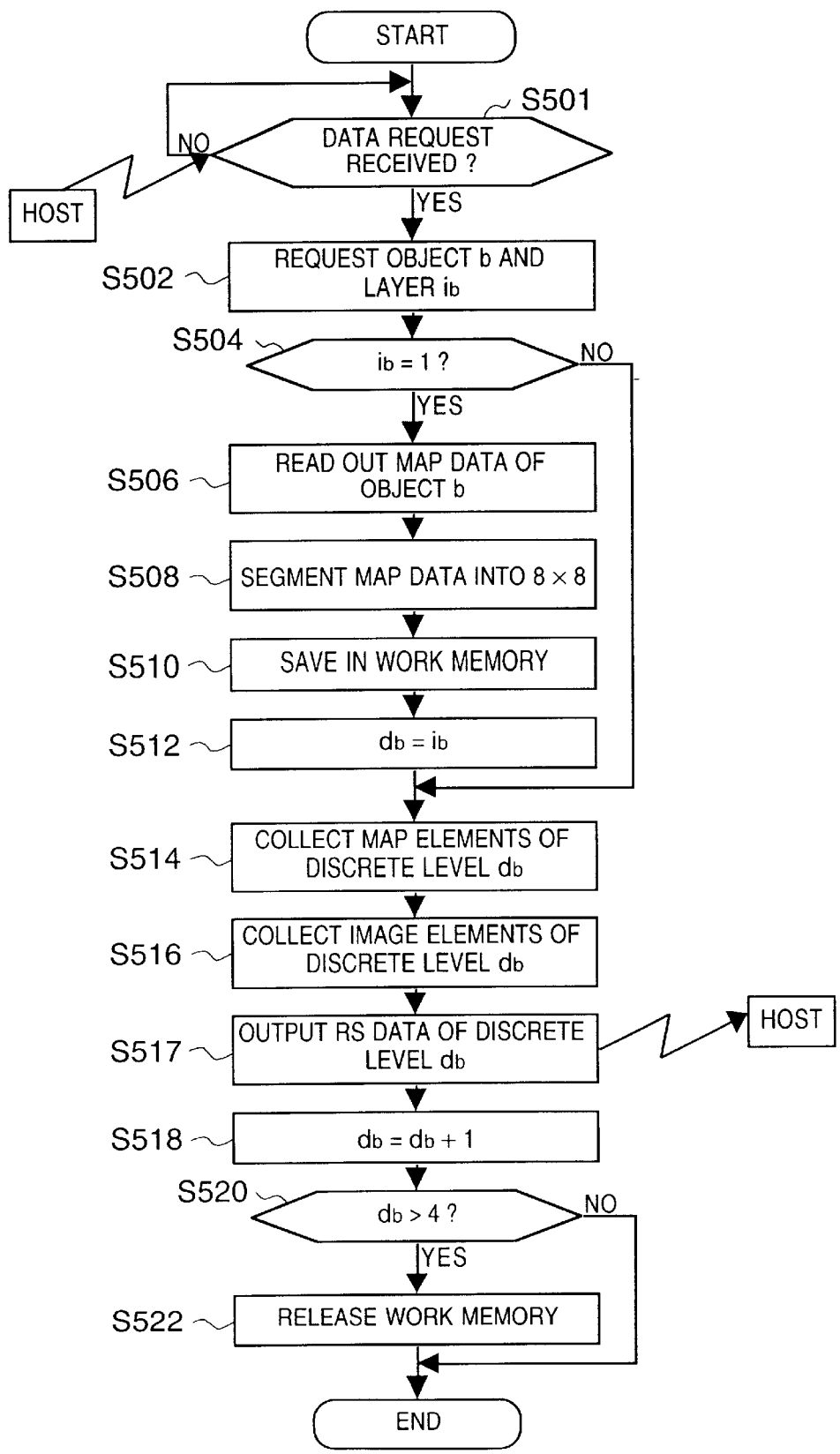
FIG. 31 is a flow chart showing details of the download request command processing routine on the database 200 side.

FIG. 29 shows details of the rendering routine in step S300, FIG. 30 shows the reception routine of hierarchical data on the host 1000 side, and FIG. 31 shows the output routine of RS data on the database.

Figure 28:
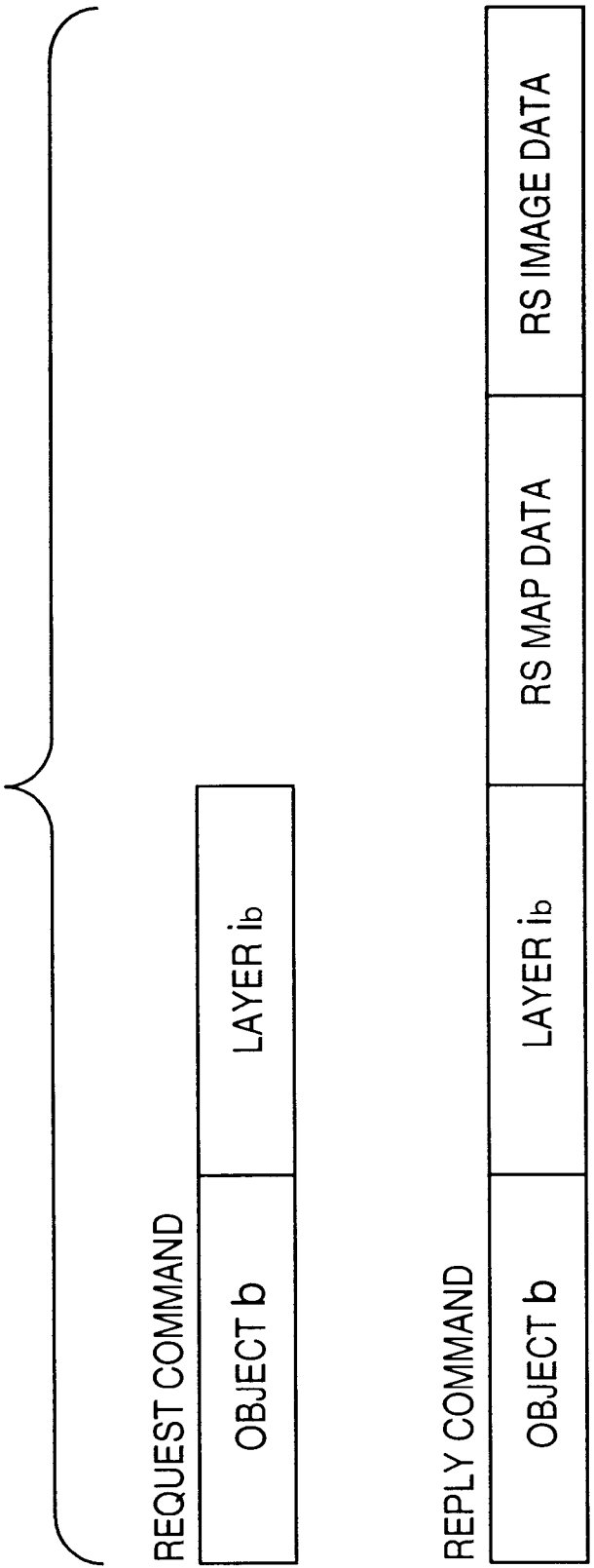
FIG. 28 shows the formats of a download request command and reply command.

When the host 1000 requests RS data of a new object, it sends a request command shown in FIG. 28 to the database 200 in step S210. This command includes designation of object b (object number b), RS data of which is requested, and designation of the requested resolution (layer number $i_b$). Since the command sent in step S210 requests hierarchical RS data of the lowest resolution (layer number=1), the layer number is set at:

$i_b=1$

Note that hierarchical RS data with higher resolutions (layer number=2 to 4) are requested in step S416 in FIG. 30.

After the host issued the request command to the database 200 in step S210, it executes the rendering/display routine in step S300. On the other hand, the request command issued in step S210 will be received by the database 200. FIG. 29 shows details of step S300.

More specifically, in step S302 in FIG. 29 a virtual camera is set at the input viewpoint position/line-of-sight direction. In step S304, pixels in the first line at an image coordinate position of the virtual camera are decomposed into a light ray group. In step S306, the mapping positions of light rays in the light ray group obtained in step S304 are determined using equations (1) and (2). At this time, quantization is done in the same manner as in the process in step S108 (FIG. 11). In step S308, objects which are to be rendered, and RS data of which have already been downloaded are searched by looking up flags $F_{bD}$ and $F_{bP}$ in the management table (FIG. 27). In the example shown FIG. 27, objects 1, 2, 3, 4, and x are to be rendered (visible from the viewpoint position), but RS data of object x is not downloaded yet. Hence, in steps S310 and S312 one of objects (1, 2, 3, and 4) with flag $F_{bP}$="1" is rendered. In step S314, the virtual image of that object is displayed.

Downloading of RS data of object x will be explained.

The database 200 waits for a RS data request of layer number $i_b$ of object b from the host in step S501 (FIG. 31). Hence, the data request of new object x is accepted by the database 200 in step S501 (FIG. 31). In step S502, the data request is interpreted that it requests hierarchical data for layer number $i_b$ (=$i_x$) of object b (=x). It is checked in step S504 if the data request is that for the first layer. This checking step is executed since all blocks of RS data of object b must be segmented into 8×8 blocks to obtain hierarchical data. The segmentation process is done in steps S506 to S510. In step S512, layer number $i_b$ is saved in work register $d_b$.

In step S514, map elements with discrete level $d_b$ are collected. In the example shown in FIG. 27, since $d_b$=1 for object x, $DD_b(1)$ in FIG. 17 is obtained. In step S516, elements (see FIG. 10) of image data with discrete level $d_b$ are collected. In step S517, hierarchical map data and image data with discrete level $d_b$ are sent to the host 1000 side as hierarchical RS data. That is, the hierarchical RS data is downloaded toward the host 1000.

In step S518, counter $d_b$ is incremented by 1. It is checked in steps S520 and S522 if RS data up to the fourth layer have been downloaded. If YES in step S522, work data saved in step S510 is released from the work memory.

In step S402 (FIG. 30), the host 1000 receives hierarchical data (object b, layer number $i_b$) sent from the database 200 in step S517. In step S404, it is confirmed if hierarchical data is that for object b and layer number $i_b$. In step S406, data flag $F_{bP}$ is set at "1" to indicate that hierarchical data of object b for at least the first layer is present.

In step S408, the ($i_b$)-th layer data received in step S402 is merged with merged hierarchical map data $SD_b(i-1)$ of layer count $i_b-1$, which has been accumulated so far, in accordance with equation (4). When the first-layer data is received, that data is used as merged first-layer data (see FIG. 21). In step S410, the merged i-th layer data is overwritten on the (i−1)-th layer data used so far. The layer number is incremented by 1 in step S412, and it is confirmed in step S414 if the layer number exceeds 4. In step S416, RS data of the next layer number is requested.

In this manner, the merged space data of the first layer of object x is formed on the memory 103. Since this state is reflected in flag $F_{bP}$=1, a virtual image of object x is rendered and displayed based on merged first-layer space data $SD_b(1)$ in step S312.

The download request of space data of the second layer of object b issued to the database 200 in step S416 is received in step S501 in FIG. 31, and the second-layer RS data (FIG. 18) is sent via step S501→step S502→step S504→step S514→ . . . step S517. The second-layer RS data is received by the host 1000. The received second-layer RS data is used to form merged second-layer RS data in steps S408 and S410, and this merged data is rendered in step S310.

The aforementioned downloading process is repeated until it is determined in step S414 that the fourth layer has been reached. With such repetitive processes, virtual images of respective resolutions are displayed in turn in ascending order of resolution (layer number), i.e., are progressively displayed.

Upon progressive downloading, since RS data divided into layers are sent to the host, the time required for downloading can be shortened. For this reason, rendering/display efficiency can be improved. Especially, since data are downloaded in turn from that of the first layer with the smallest data size (lowest resolution) in ascending order of resolution, in other words, since the resolution of a virtual image of an object to be displayed is controlled to increase gradually (especially, the walk-through application can display an image with low resolution earlier), the user can determine early if the object of that image is a target object.

In this embodiment, since RS data of low resolution is discarded upon receiving RS data of resolution higher than that data (overwritten in step S410), the need for a large-size memory can be obviated.

Note that a scheme of Japanese Patent-Laid Open No. 10-97642 filed by the present applicant is applied when vertical disparity is taken into consideration upon mapping in the ray space.

Note that the viewpoint position/line-of-sight direction detection device 104 is not particularly limited as long as the viewpoint position/line-of-sight direction can be detected. On the other hand, when the image output device 105 uses a stereoscopic display capable of bi-view stereoscopy such as a lenticular scheme, spectacle type, or the like, and images corresponding to the positions of the right and left eyes of the viewer are generated upon sensing multi-viewpoint images, thus implementing a bi-view stereoscopic display apparatus that can cope with viewpoint movement of the viewer.

<First Modification>

In the above embodiment, virtual images of objects in the entire virtual space are progressively generated and rendered. For example, in a system that provides walk-through experiences, a virtual space is divided into a plurality of virtual subspaces, and RS data are generated in units of virtual subspaces. Alternatively, RS data are generated in units of objects in a ray space. In other words, the virtual space is converted into RS data while being divided into predetermined units.

An image processing apparatus of this modification progressively displays hierarchical RS data of a virtual subspace near the user's viewpoint position. Such rendering can be implemented since RS data are hierarchized in units of virtual subspaces (or objects) and hierarchical data are stored in the storage device in this modification.

More specifically, in this modification the user's viewpoint position is detected, and RS data of an object or virtual subspace near that viewpoint position is read out from the storage device.

For this purpose, hierarchical RS data of objects (or virtual subspaces) are rendered and generated in turn from objects (or virtual subspaces) closer to the user's viewpoint position. In this rendering and generation, all objects (or virtual subspaces) are rendered using hierarchical RS data of the lowest resolution, and are then rendered using hierarchical RS data of the second lowest resolution.

When the user moves, rendering is done in turn from hierarchical RS data of an object (or virtual subspace) located in that moving direction.

<Second Modification>

The following modification is further proposed.

That is, a virtual object (or real object) that the user specifically designates in a virtual space (or mixed or augmented reality space) must be the object (or virtual subspace) that the user particularly wants to recognize quickly. Hence, when the user holds, moves, or rotates a virtual object or real object, a virtual image of that virtual object (real object) is progressively rendered.

<Third Modification>

In the above embodiment, both image and map data of RS data are hierarchized. However, the data size of map data is much smaller than that of image data. Therefore, a decrease in downloading time obtained by hierarchizing map data is smaller than that obtained by image data. Hence, even when hierarchization of map data is omitted, an increase in downloading time is often negligible compared to a case wherein map data is hierarchized. For this reason, omission of hierarchization of map data is proposed as a modification of the above embodiment. If hierarchization of map data is omitted, since the host need not restore the map data, a secondary effect is obtained, i.e., the time until rendering is started can be shortened accordingly.

<Fourth Modification>

Furthermore, in the above embodiment, RS data is hierarchized on the database side, and hierarchical data are downloaded to the host side. The host merges hierarchical data every time it downloads the data, and displays merged hierarchical data of a resolution at the time of merging. That is, the embodiment shown in FIG. 9 executes a process for converting RS data into hierarchical data at the time of receiving a request from the host side. Alternatively, this conversion process may be done by a batch process in advance. Hierarchization can be done in advance since it is not influenced by the user's viewpoint position. Although hierarchization executed in advance requires an area for storing hierarchical data on the database 200, since hierarchization need not be done at the time of downloading unlike in the above embodiment, high-speed downloading can be achieved.

<Fifth Modification>

The fifth modification is a modification of the fourth modification. That is, in the fifth modification, merged hierarchical data are prepared on the database 200 side by a batch process. Since the merged hierarchical data have a larger data size than hierarchical data, the time required for downloading is longer than that required for downloading hierarchical data, but another merit can be obtained, i.e., a process for merging need not be done on the host 1000 side.

<Sixth Modification>

In the above embodiment, the RS database 200 is connected to the host via a communication line. Alternatively, the present invention can be applied to a database connected to a parallel bus.

<Seventh Modification>

In the above embodiment, RS data that have been downloaded up to the fourth layer from the database are temporarily stored in the memory 103. However, since space data of an object which falls outside the field of view due to movement of the viewpoint position is not rendered, it is unnecessary. Hence, if a given object falls outside the field of view, RS data of that object is erased from the RAM 103, and its flag $F_{bP}$ is set at "0".

The present invention can be applied to either a system consisting of a plurality of devices or an apparatus consisting of a single device. Also, the present invention can be achieved when the invention is implemented by supplying a program to the system or apparatus. In such case, a storage medium that stores a program according to the present invention constitutes the present invention. By reading out the program from the storage medium to the system or apparatus, that system or apparatus operates by a predetermined method.

Second Embodiment

An image rendering apparatus and method according to embodiments to which the present invention is applied to walk-through experience in a virtual space will be described in detail hereinafter. These embodiments to be described below include a walk-through system (second embodiment) which has a main memory that has a memory size large enough to store all data expressed by RS data, and an embodiment (third embodiment) which has an internal compact main memory device, and repeats assurance of a memory area→release of the memory area since the main memory device has a size which is not large enough to store all space data.

<Hardware Arrangement>

Figure 33:
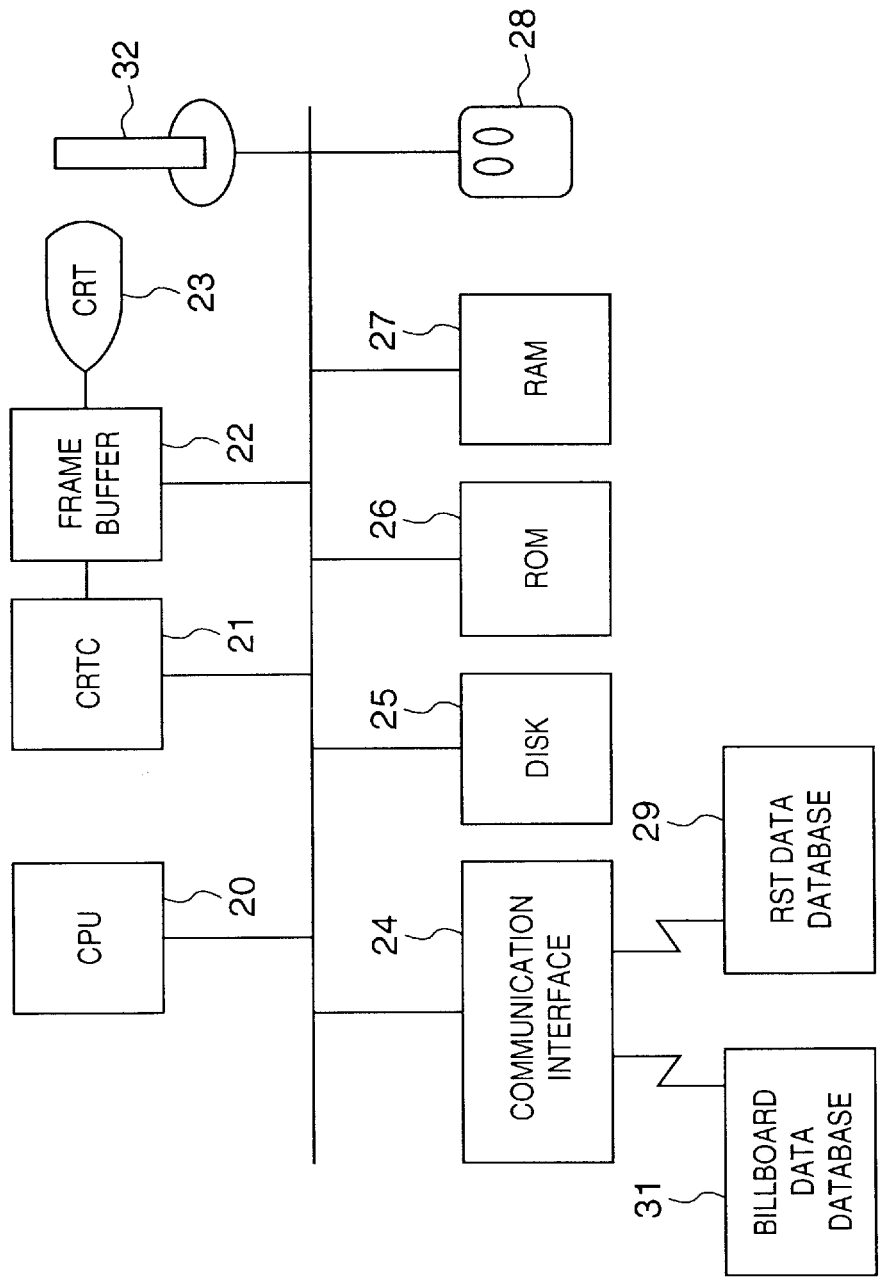
FIG. 33 is a block diagram for explaining the arrangement of a virtual space presentation apparatus (virtual image rendering apparatus) according to the second and third embodiments.

FIG. 33 shows the arrangement of an image processing system according to this embodiment. The hardware arrangement shown in FIG. 33 is that of a normal workstation. That is, the hardware arrangement itself is the same as that of the normal workstation. Also, the system arrangement shown in FIG. 33 is common to the third embodiment to be described later, in addition to this embodiment.

Figure 1:
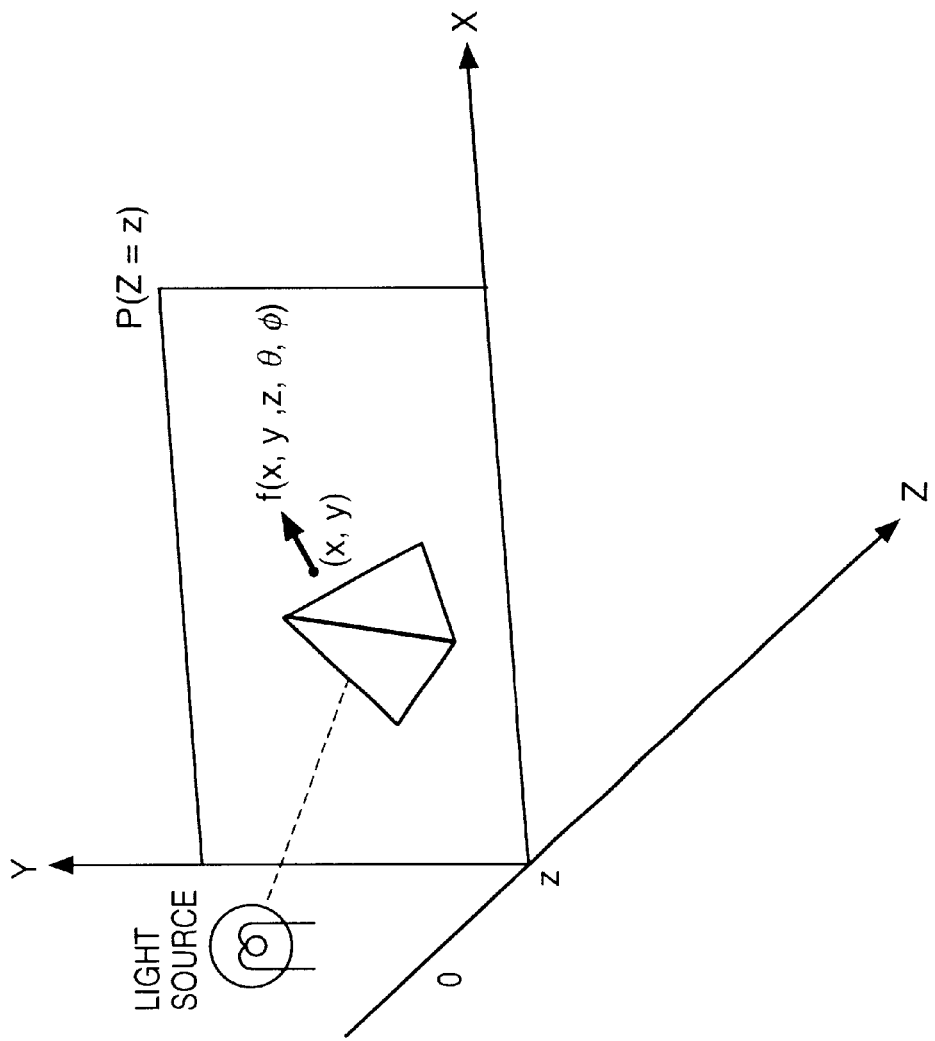
FIG. 1 is a view for explaining the principle for generating RS data.
Figure 2:
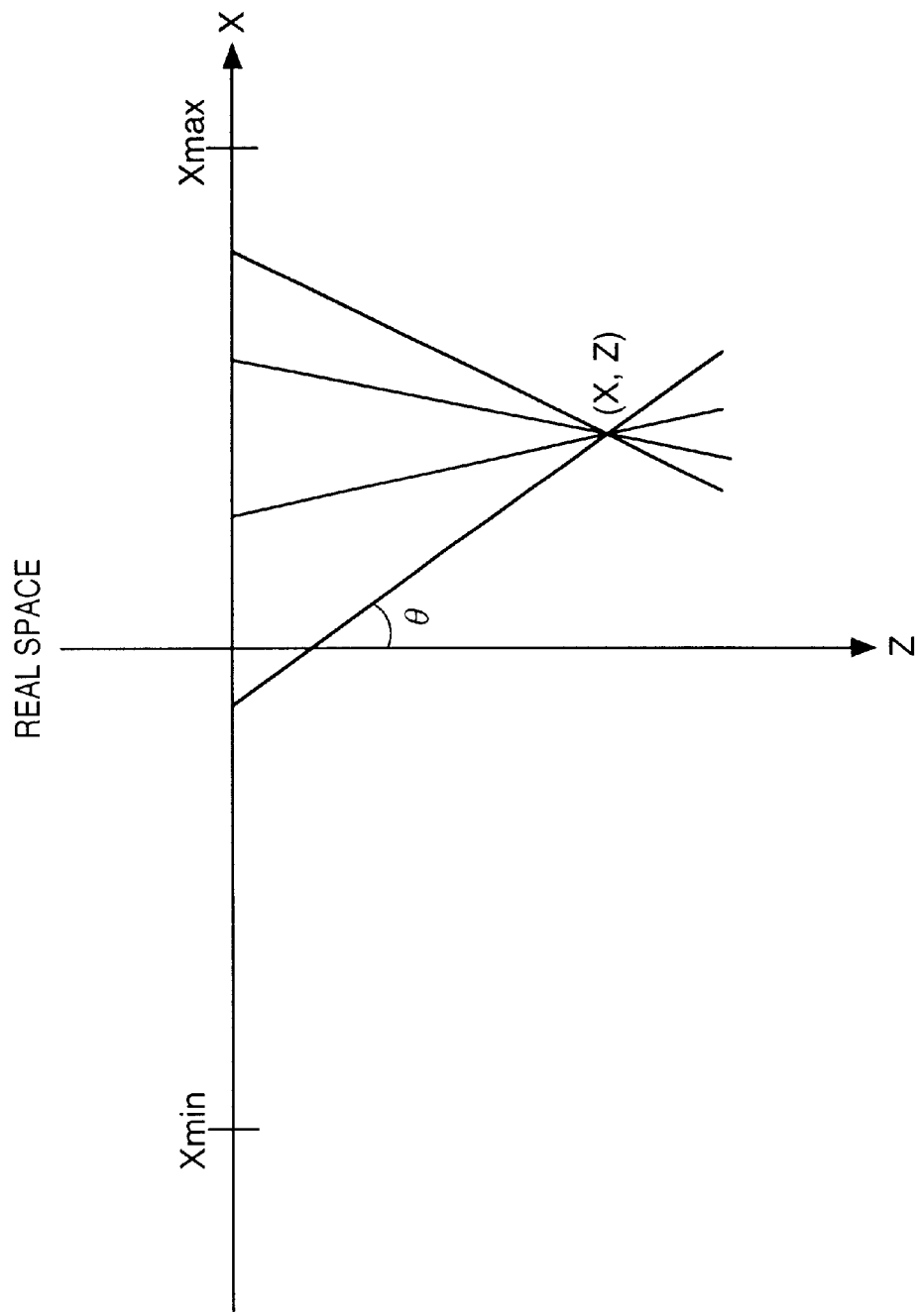
FIG. 2 is a view for explaining data in a real space.
Figure 3:
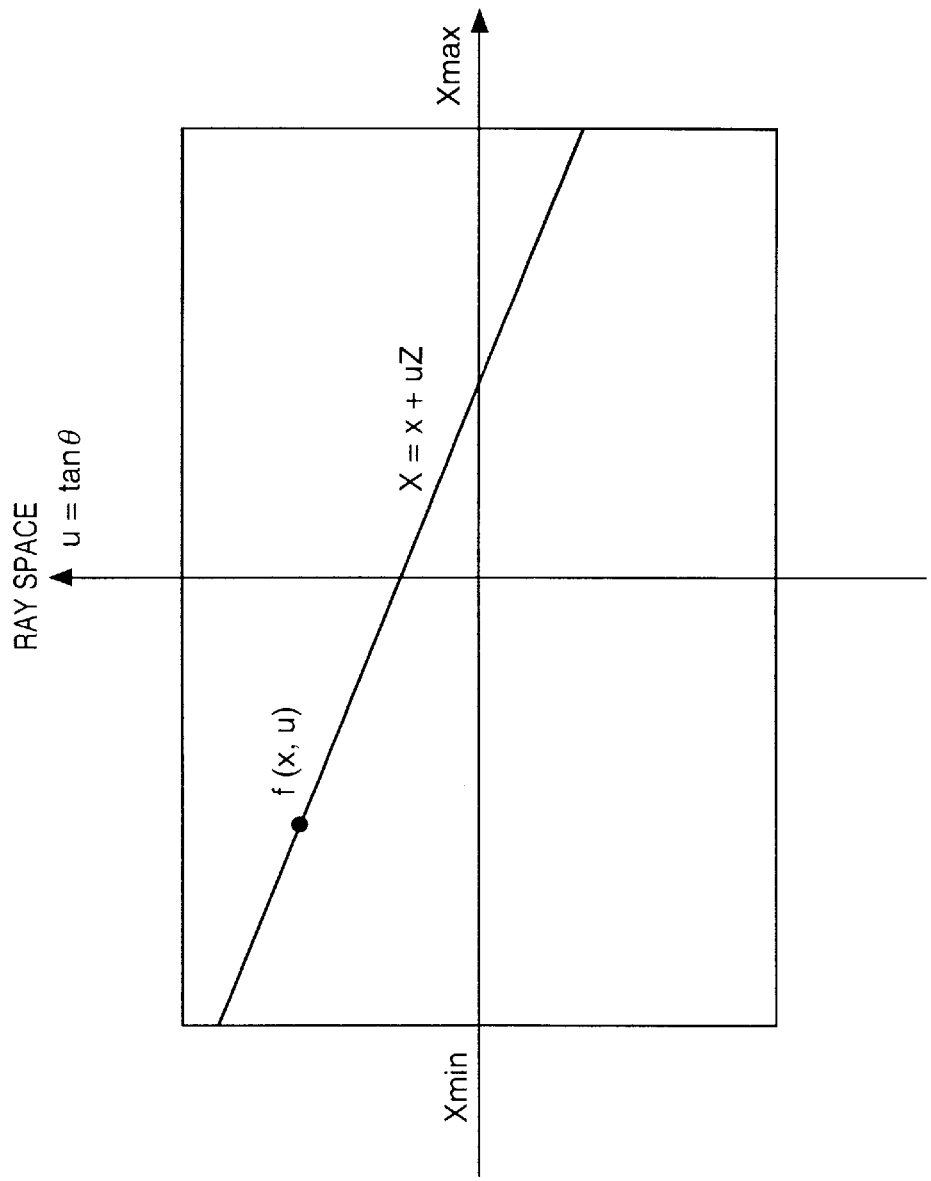
FIG. 3 is a view showing the space shown in FIG. 2, which is expressed by RS data.
Figure 4:
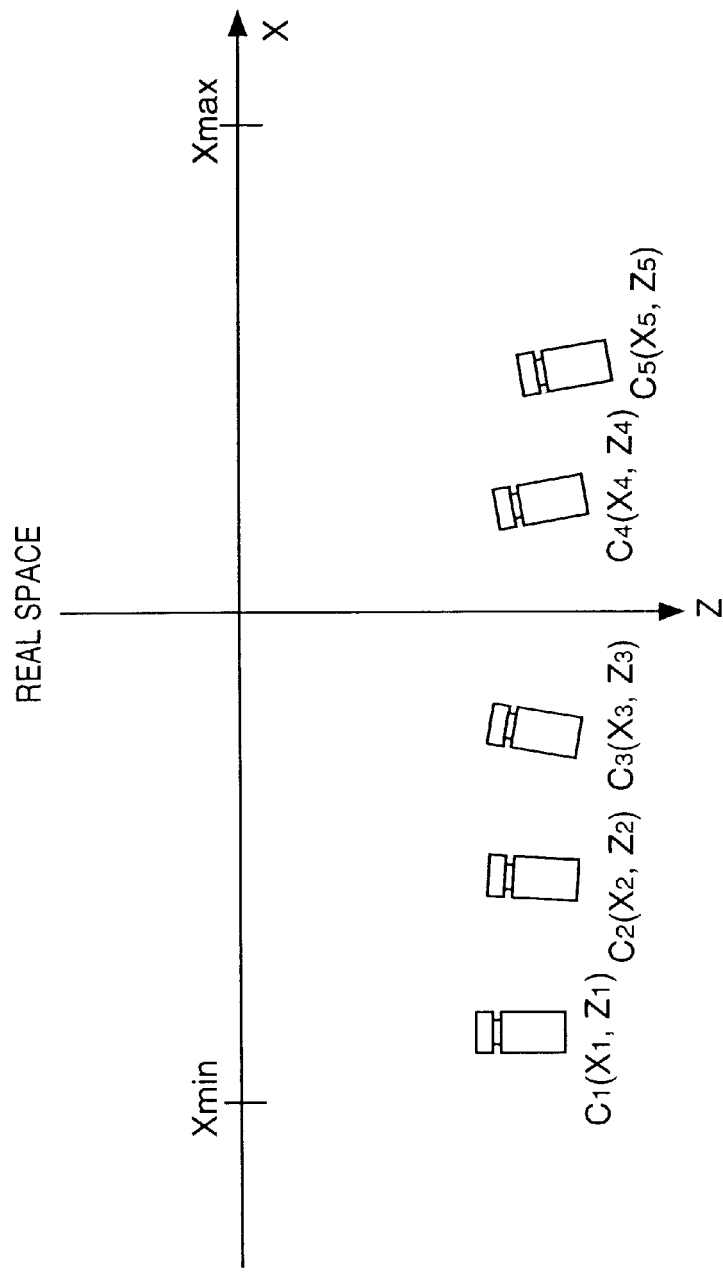
FIG. 4 is a view for explaining the principle of generating real space data when there is a plurality of cameras.
Figure 5:
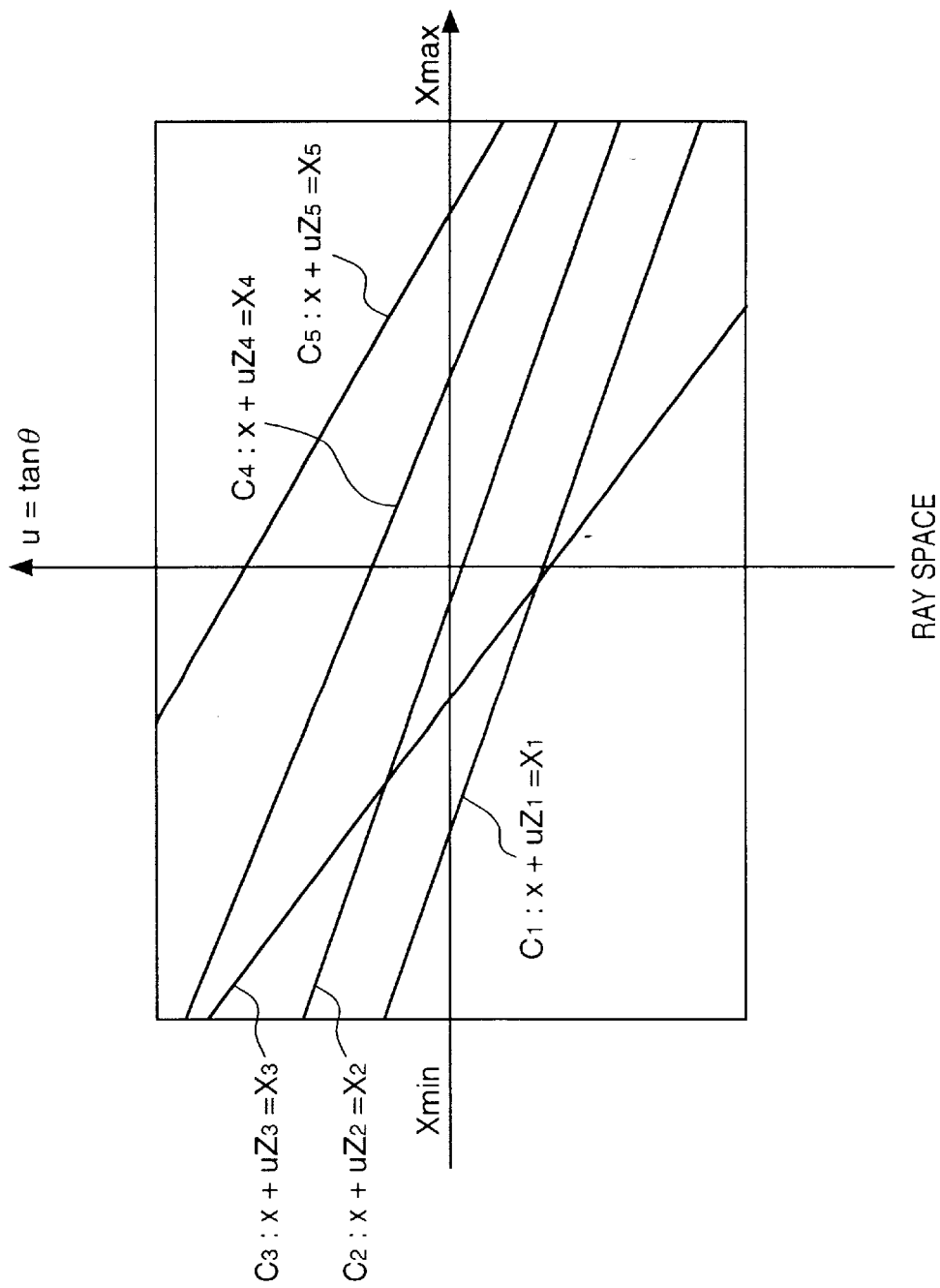
FIG. 5 is a view for explaining the principle of generating RS data when there is a plurality of cameras.
Figure 6:
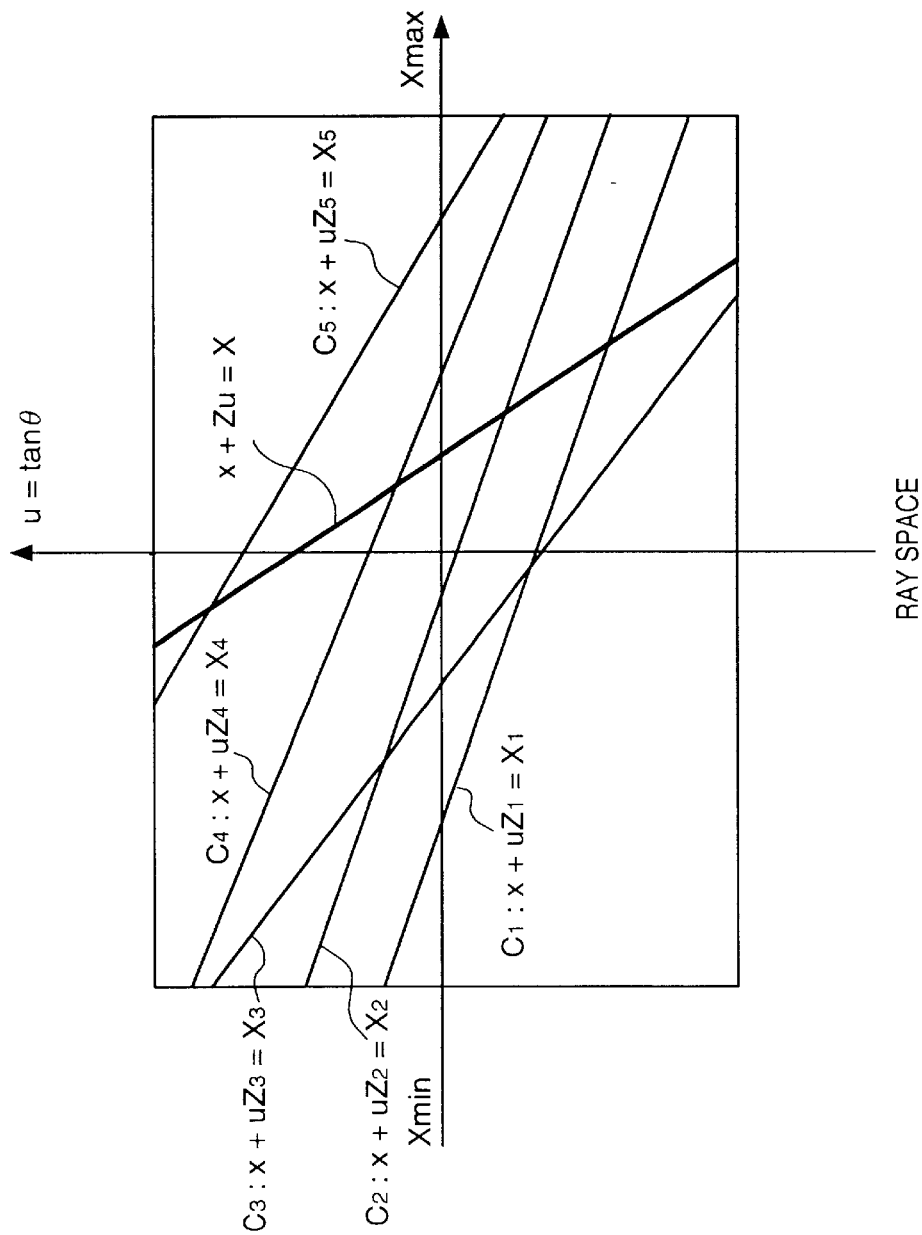
FIG. 6 is a view for explaining the principle of generating RS data (x+Zu=X) at an arbitrary viewpoint position from RS data obtained when there is a plurality of cameras.
Figure 7:
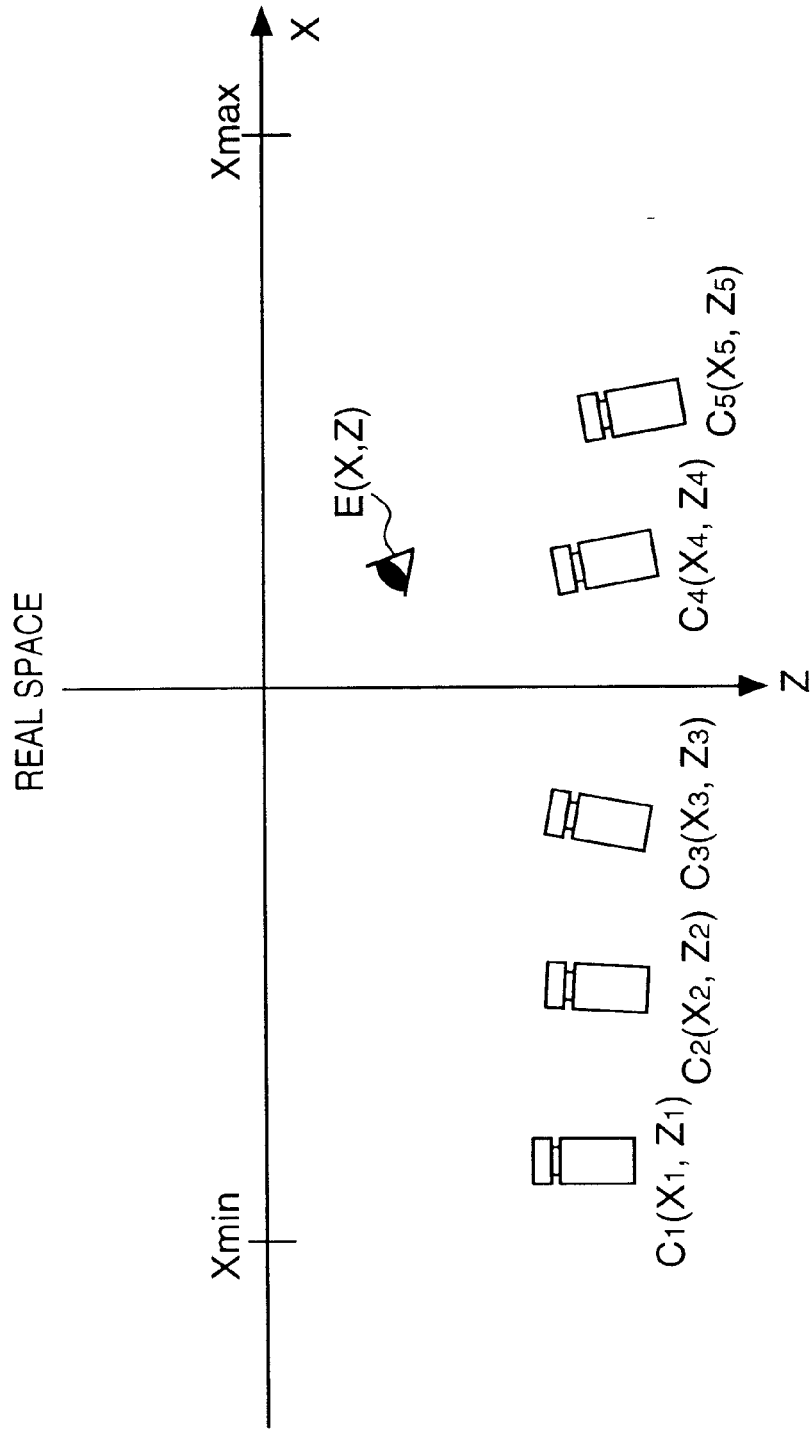
FIG. 7 is a view for explaining the principle of reconstructing a real space from the arbitrary viewpoint shown in FIG. 6.

This system presents a virtual space to the user on a CRT 23. The user can freely walk through that virtual space or can manipulate (move, rotate, enlarge or the like) an object in the virtual space by operating a mouse 28. More specifically, objects in the virtual space are converted into RS data on the basis of actually captured images and are stored in advance in a disk 25. When the viewpoint position moves as the user walks through, an image that can be observed at the moved viewpoint position is generated, as has been explained with reference to FIG. 7, and is merged with an image generated by rendering conventional CG data based on a geometric model, thus displaying the merged image on the CRT 23.

An RS data database 29 has a large-size memory and stores RS data of all spaces. A billboard image database 31 stores a plurality of billboard images. Note that billboard image data is image data of a given object observed from a certain viewpoint position, and its data size is much smaller than that of RS data.

As described above, when RS data cannot be transferred from the database 29 in time, this billboard image is presented to the user instead.

Reference numeral 32 denotes a joystick which instructs to move the user's viewpoint position.

Figure 34:
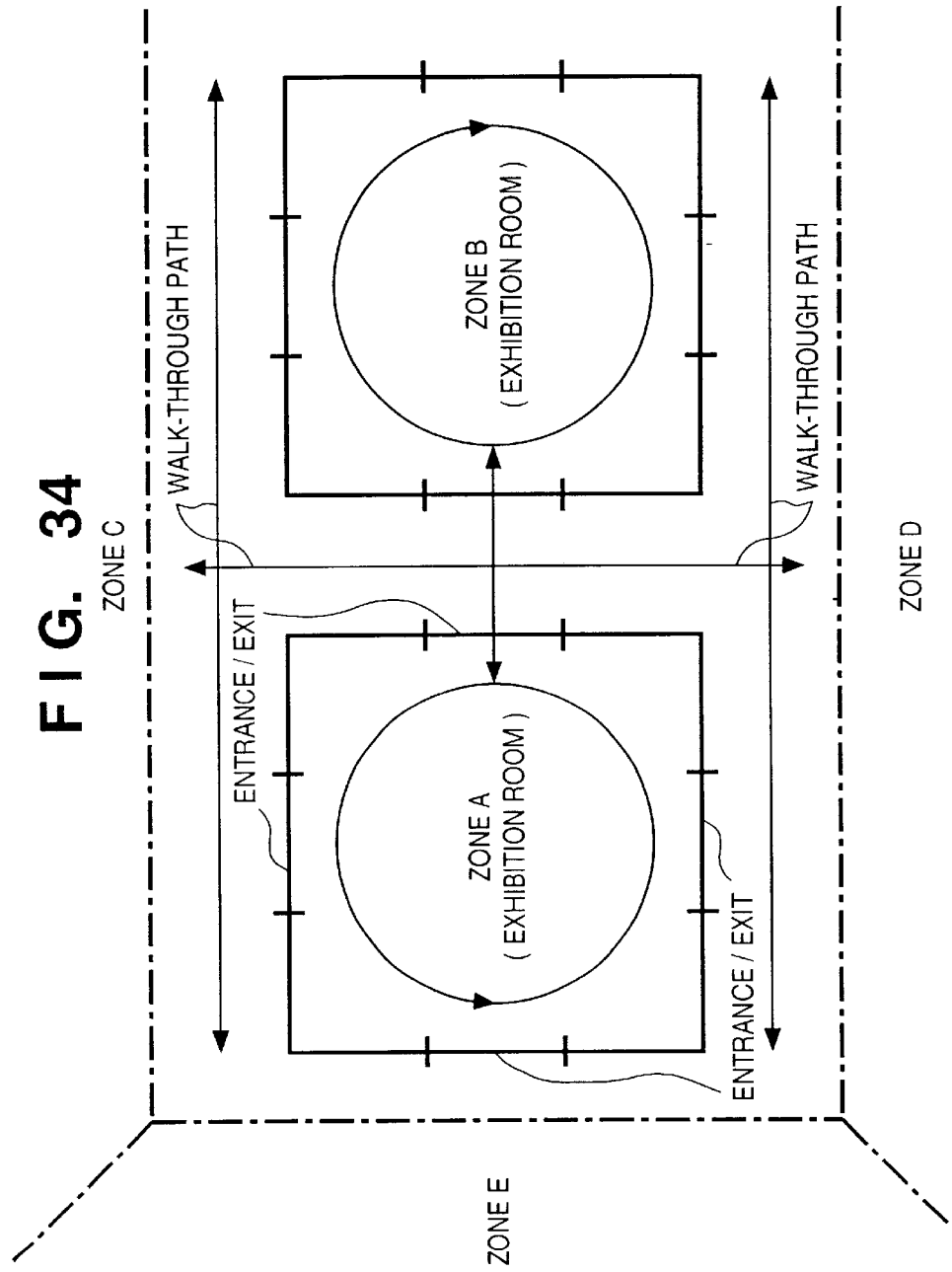
FIG. 34 is a view for explaining the configuration of a virtual space in the second and third embodiments.

FIG. 34 shows a virtual space formed by the second and third embodiments. This virtual space has five zones:

zones A, B, C, D, and E which are respectively virtual subspaces. FIG. 34 illustrates only zones A and B in detail for the sake of simplicity. The boundaries of the zones (virtual subspaces) are presented to the user as one-dashed chain lines. Moving routes (walk-through routes) of the user's viewpoint position are indicated by thin solid lines. In one zone, "walls" of a rectangle that represents a virtual exhibition room are indicated by bold solid lines. Each exhibition room has four entrances/exits, and the user can virtually enter/leave each exhibition room through them.

Figure 35:
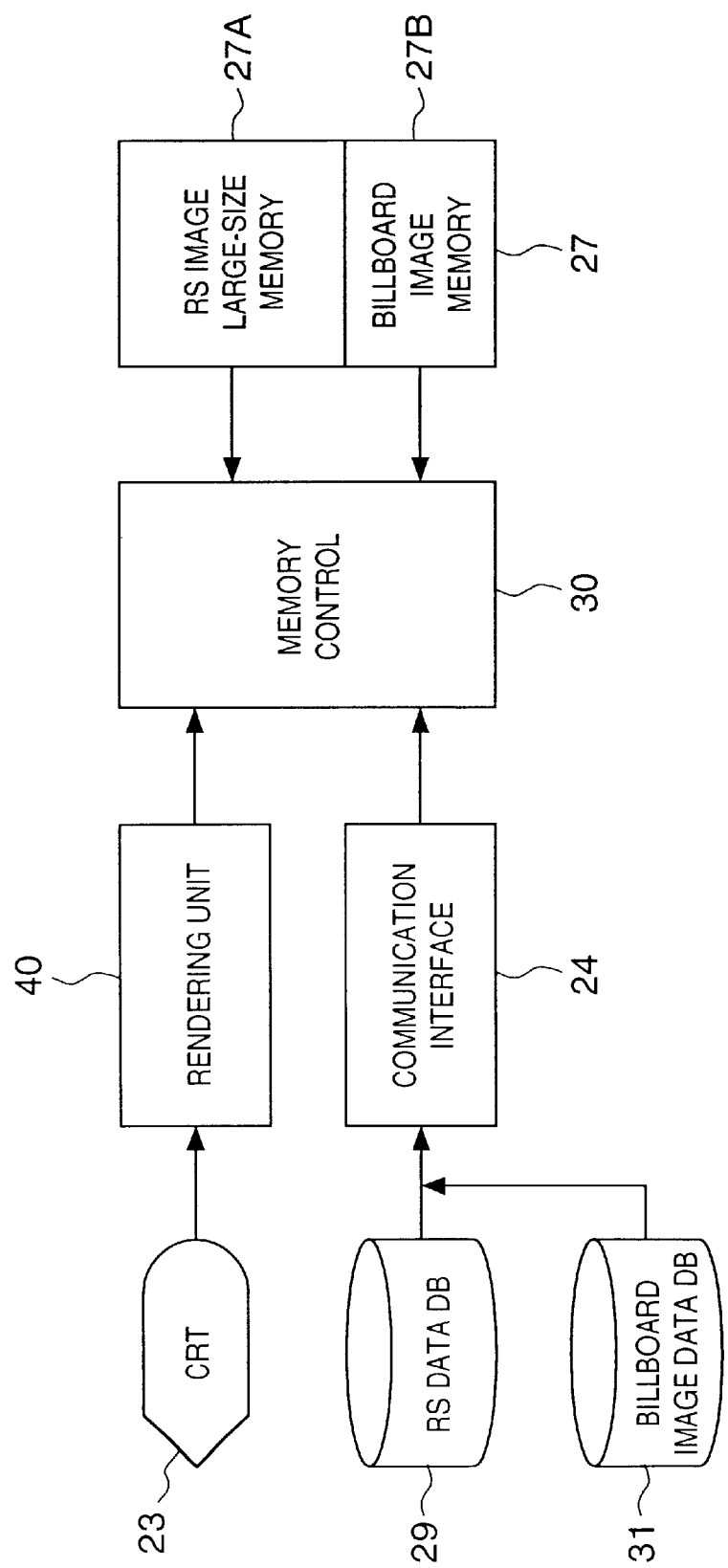
FIG. 35 is a block diagram for explaining the arrangement of principal part of the apparatus in the second embodiment.

FIG. 35 shows the arrangement of an image processing apparatus according to the second embodiment. The characteristic feature of the second embodiment lies in that when RS data is not ready in time, a billboard is set at a position where a RS data object is laid out in the virtual space, and an image (billboard image) is pasted onto the billboard and is presented to the user, thus preventing disturbance due to a transfer delay (download lag) of RS data from the database 29. The billboard image has a data size much smaller than that of RS data and, hence, its transfer time is shorter than that of RS data.

Referring to FIG. 35, RS data and billboard image data are stored in the external databases 29 and 31. These databases are saved in predetermined areas (27A, 27B) in a main memory 27 via a communication interface (e.g., Ethernet). A rendering unit 40 renders RS data and billboard image data stored in the main memory on a virtual space under the control of a CPU 20.

In the second embodiment, the CPU 20 saves RS data read out from the RS data DB (database) 29 on the memory area 27A, and billboard image data on the memory area 27B. Whether or not the data can be saved on the memory is managed in units of zones using a table shown in FIG. 36.

In the second embodiment, RS data is transferred to the main memory 27 in accordance with three transfer orders, and these three examples will be explained below as first, second, and third examples.

<Control Sequence of First Example>

Figure 37:
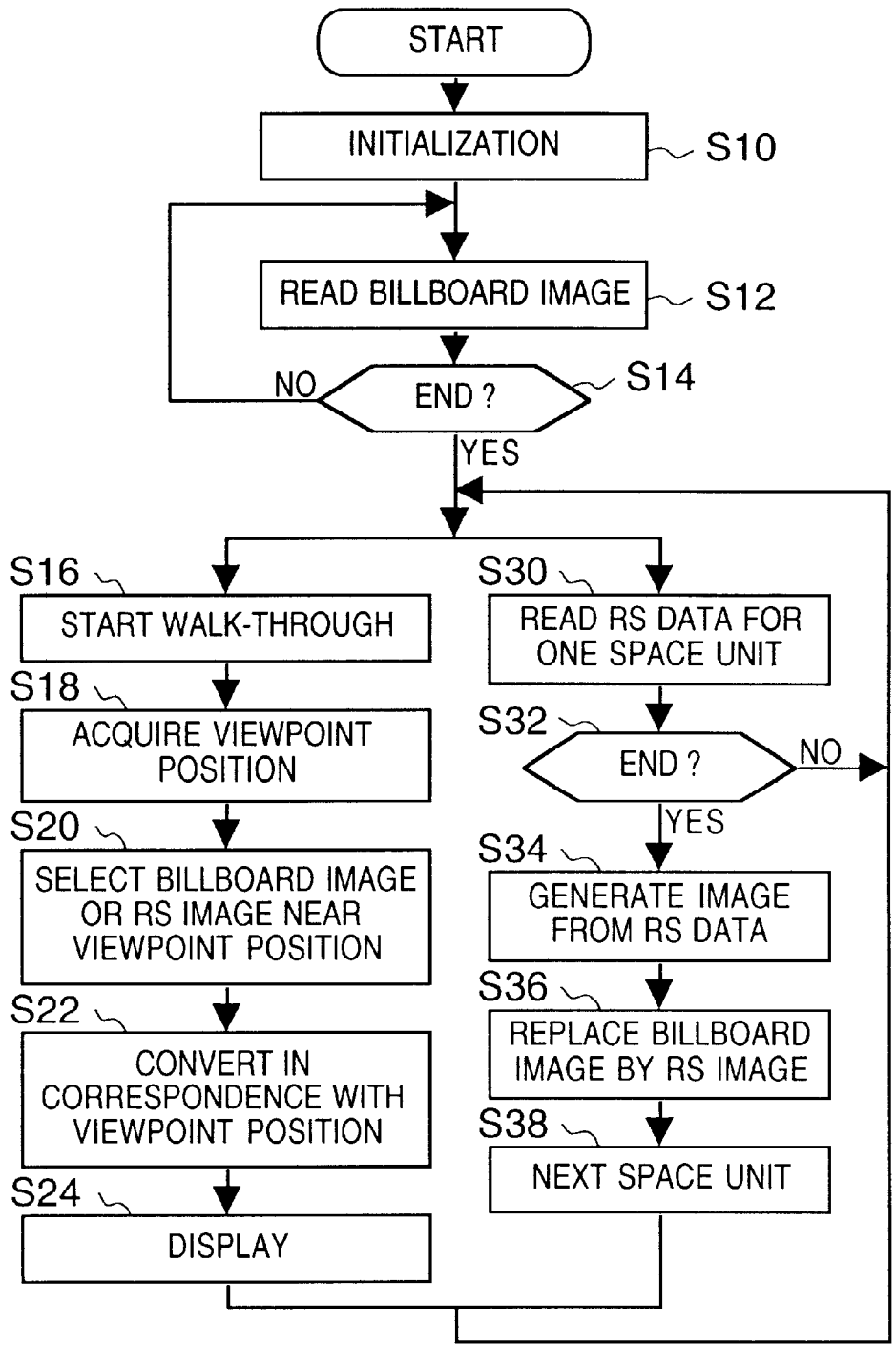
FIG. 37 is a flow chart showing the control sequence according to the first example of the second embodiment.

FIG. 37 is a flow chart showing the control sequence according to the first example. In the first example, all billboard image data are downloaded from the database 31 and are stored in the memory area 27B in steps S10 to S14. After the downloaded image data are decoded, walk-through experience in the virtual space is allowed. The characteristic feature of the first example lies in that presentation of a virtual image to the user to give walk-through experience (steps S16 to S24) and transfer of RS data to the memory area 27A (steps S30 to S38) are executed parallelly (but they may be done serially).

More specifically, upon completion of the transfer process (including a decoding process) of billboard images in steps S10 to S14, the "presence" of billboard images for all the zones is marked in the table shown in FIG. 36.

Upon completion of step S14, walk-through is allowed. That is, the viewpoint position designated by the user using the joystick or the like is detected in step S18, and RS data near the viewpoint position is selected in step S20.

Note that the RS data near the viewpoint position means space data of virtual objects (including a virtual subspace) which fall within a predetermined distance range with respect to the current viewpoint position on a three-dimensional space. Only distance is in question, and the line-of-sight direction of the user is not in question. This is because the user may approach an object in any direction. The distance can be determined in advance based on the relationship with the size of each exhibition room in the first example.

If RS data corresponding to that viewpoint position is not present on the memory 27 yet, billboard image data is used instead. That is, a ray space image has priority over a billboard. This is because RS data can generate a high-resolution virtual image from an arbitrary viewpoint position on the basis of image data from a specific viewpoint position. Therefore, if RS data is present on the main memory 27, a virtual image is generated in correspondence with the current viewpoint position in step S22, and is presented on the CRT in step S24.

Parallel to rendering and presentation of a virtual space as the user walks through, RS data is transferred in steps S30 to S38. That is, RS data for one space unit is transferred in step S30. Note that the space data for one space unit includes a group of space data which pertain to one zone or the like in, e.g., FIG. 34. Upon completion of data transfer for one unit, an image is generated from RS data in step S34, the presence of the corresponding RS data on the main memory is marked in step S36, and a transfer request of RS data for the next one space is sent to the DB 29 in step S38.

Note that only the presence of RS data is marked, but the corresponding billboard image is not deleted in step S36. However, in order to effectively use the memory, billboard image data which is not used may be deleted from the main memory 27 as long as the corresponding RS data is present.

In this manner, in the first example of the second embodiment, billboard images are downloaded first to allow walk-through experience in the virtual space and, after that, rendering of virtual images in the virtual space and transfer of RS data from the database are parallelly done. When RS data at the viewpoint position in real time is not present on the main memory, a virtual image is rendered based on billboard image data; when required RS data is present on the main memory, a virtual image is rendered based on that RS data. As a result, the user can experience walk-through based on at least billboard images early.

<Control Sequence of Second Example>

Figure 38:
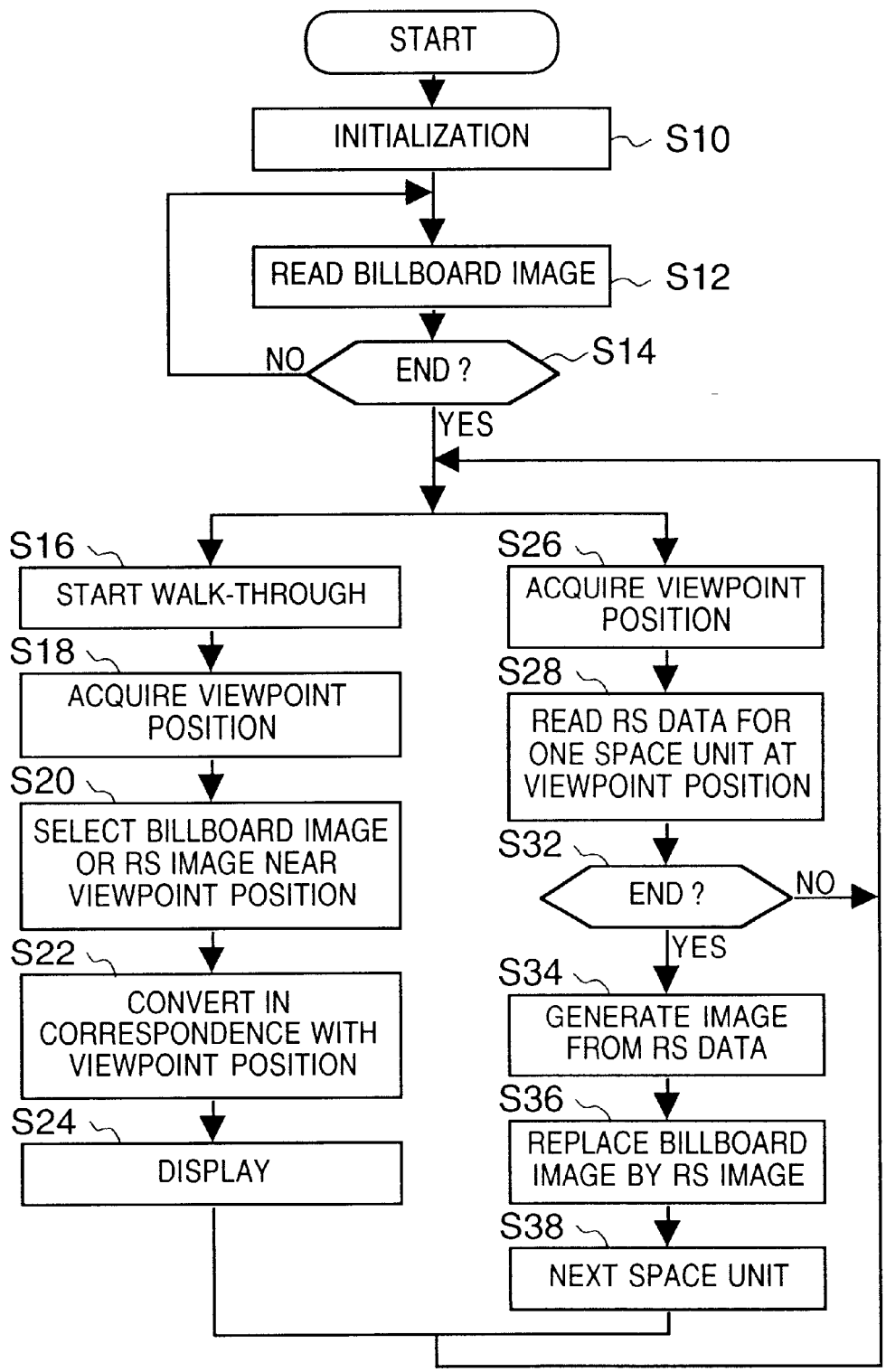
FIG. 38 is a flow chart showing the control sequence according to the second example of the second embodiment.

FIG. 38 shows the control sequence of the second example. In the first example, RS data is transferred from the DB 29 to the main memory 27A in a predetermined order. However, in the second example, RS data in a space close to the current viewpoint position of the user is selectively transferred from the database 29. This is because a rendering request of data closer to the user's viewpoint position is more likely to be generated.

The control sequence of FIG. 38 is substantially the same as that in FIG. 37, except that the sequence in FIG. 38 has steps S26 and S28. That is, the current viewpoint position of the user is acquired in step S26, and RS data for one space unit close to that position is transferred in step S28. Other steps are the same as those in the first example.

In this example, RS data of a space close to the user's viewpoint position is selected and loaded. Alternatively, RS data may be loaded in the order from that of an object closest to the viewpoint position in one space.

<Third Example>

In the second example, RS data is decoded together immediately after that RS data is transferred from the database. That is, RS data for one space unit is decoded together with transfer, and is stored on the main memory. Time-consuming processes are transfer of compressed RS data and decoding of the compressed data, except for rendering of a virtual image. Hence, in the third example, RS data is downloaded onto the main memory simultaneously with that of billboard images, and is stored on the main memory as encoded data. RS data required for rendering at an arbitrary viewpoint position in real time is decoded when its rendering request is generated.

Figure 59:
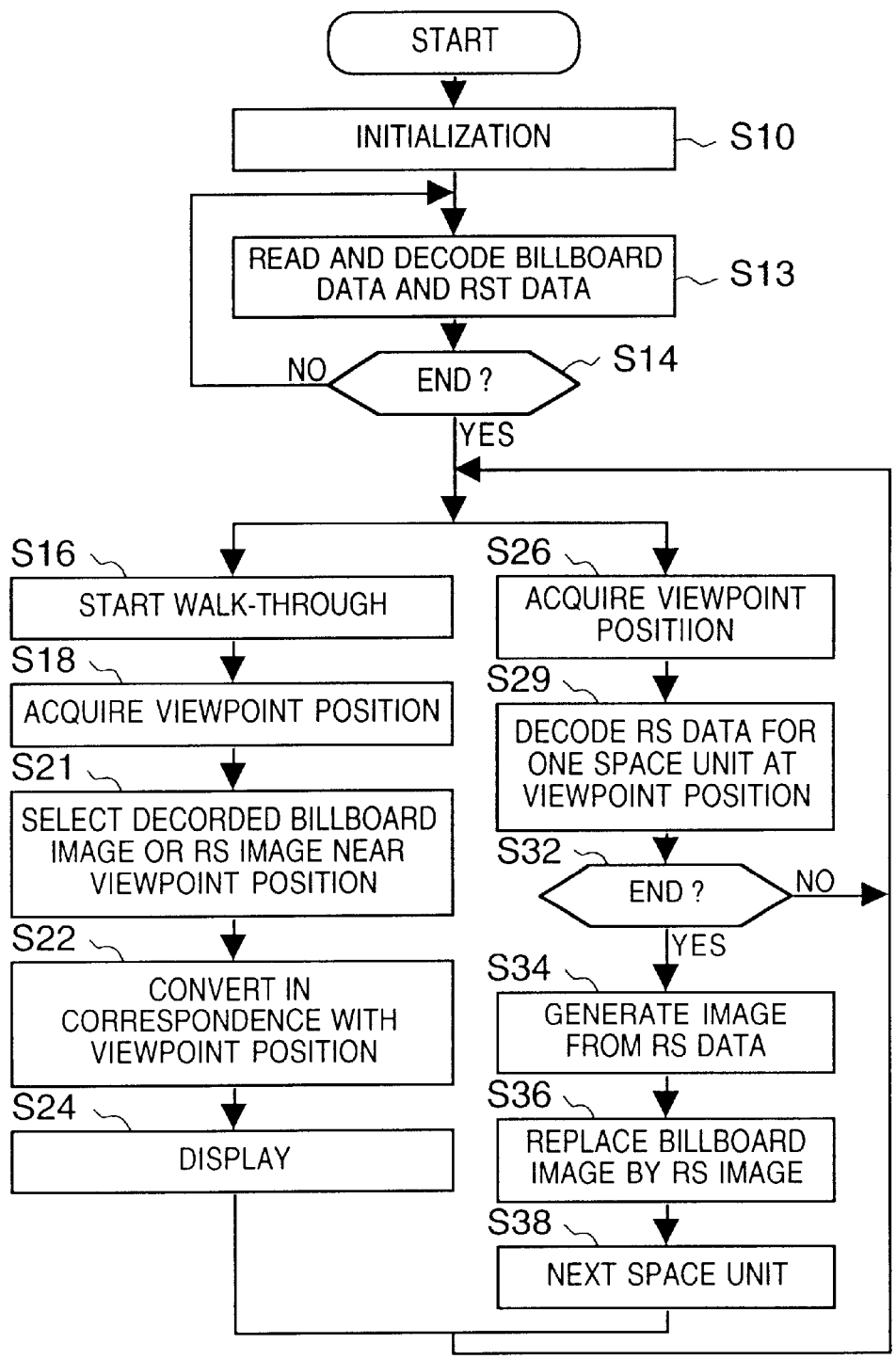
FIG. 59 is a flow chart for partially explaining the control sequence according to the third example of the second embodiment.

FIG. 59 is a flow chart showing the control sequence of the third example. If the same step numbers denote the same processes by comparing the flow chart in FIG. 59 with the flow chart of the second example (FIG. 38), steps S12, S20, and S28 in the second example are respectively changed to steps S13, S21, and S29 in the third example. More specifically, billboard image data for all space units are downloaded and decoded in step S13, and RS data for all space units are also downloaded in this step. Only RS data of a space closest to the current user's viewpoint position is decoded in step S29, and the decoded data is used in virtual image generation in step S34. The generated virtual image is displayed in steps S16→ . . . →S24 via steps S36→S38.

In this manner, according to this third example, although the control must wait until downloading of encoded RS data is completed, the same effect as in the first and second examples can be obtained, i.e., the user can experience walk-through based on billboard images in the virtual reality. Since only RS data close to the current viewpoint position is decoded, the user can experience the virtual space at the viewpoint position in real time with high response. Even when decoding is not done in time, since at least a billboard image is presented, high real-time response can be assured.

In the third example, walk-through is disabled before all encoded RS data are loaded onto the main memory. Alternatively, upon completion of loading of billboard images, walk-through and loading of encoded RS data may be parallelly done.

<Fourth Example>

In this example, only billboard images in the subspace where a user exists are downloaded. Then, corresponding RS data is downloaded. The user's walk through and RS data downloading are parallelly performed. The billboard images are used until the end of downloading RS data while the user walks through in the subspace. When the user enters a newly subspace, billboard images in the newly subspace are started to download.

<Effect of Second Embodiment>

According to the second embodiment described above, the following effects are obtained.

I: Since billboard image data are stored in advance in the main memory, even when no ray space is present in the DB, at least a partial image can be presented to the user, thus eliminating disturbance. Since the user can estimate the characteristics and the like of the virtual space of interest even based on the billboard image, if the user himself or herself determines that the space is unnecessary, he or she can enter the next space.

II: RS data can be transferred in various modes. According to the method of the first example, since RS data is transferred parallel to presentation of a virtual image in a predetermined order, walk-through and RS data can be processed simultaneously.

III: The method of the first example does not always provide RS data that the user currently wants. However, the method of the second example can present a virtual image based on image data in the space that the user currently wants.

IV: According to the third example, early walk-through experience in the virtual space and that with high real-time response can be achieved at the same time.

Third Embodiment

The second embodiment is effective when the main memory size is huge. However, the size of RS data is huge, and a system memory (main memory) does not have an enough margin in many cases. The third embodiment allows rendering of a virtual space based on RS data even when the memory size is small. That is, the system of the third embodiment detects a partial virtual space of user's choice, and prefetches data of that partial virtual space (virtual subspace) before the user enters that subspace. In the third embodiment, since the memory size is limited, when the user leaves one subspace that he or she entered once and enters another subspace, RS data of the previous space is erased. On the other hand, prefetch based on estimation may erroneously erase RS data which has been assured on the memory and result in poor efficiency, if a wrong space is estimated. The third embodiment adopts a special devise (to be described later) to eliminate such shortcoming.

Figure 39:
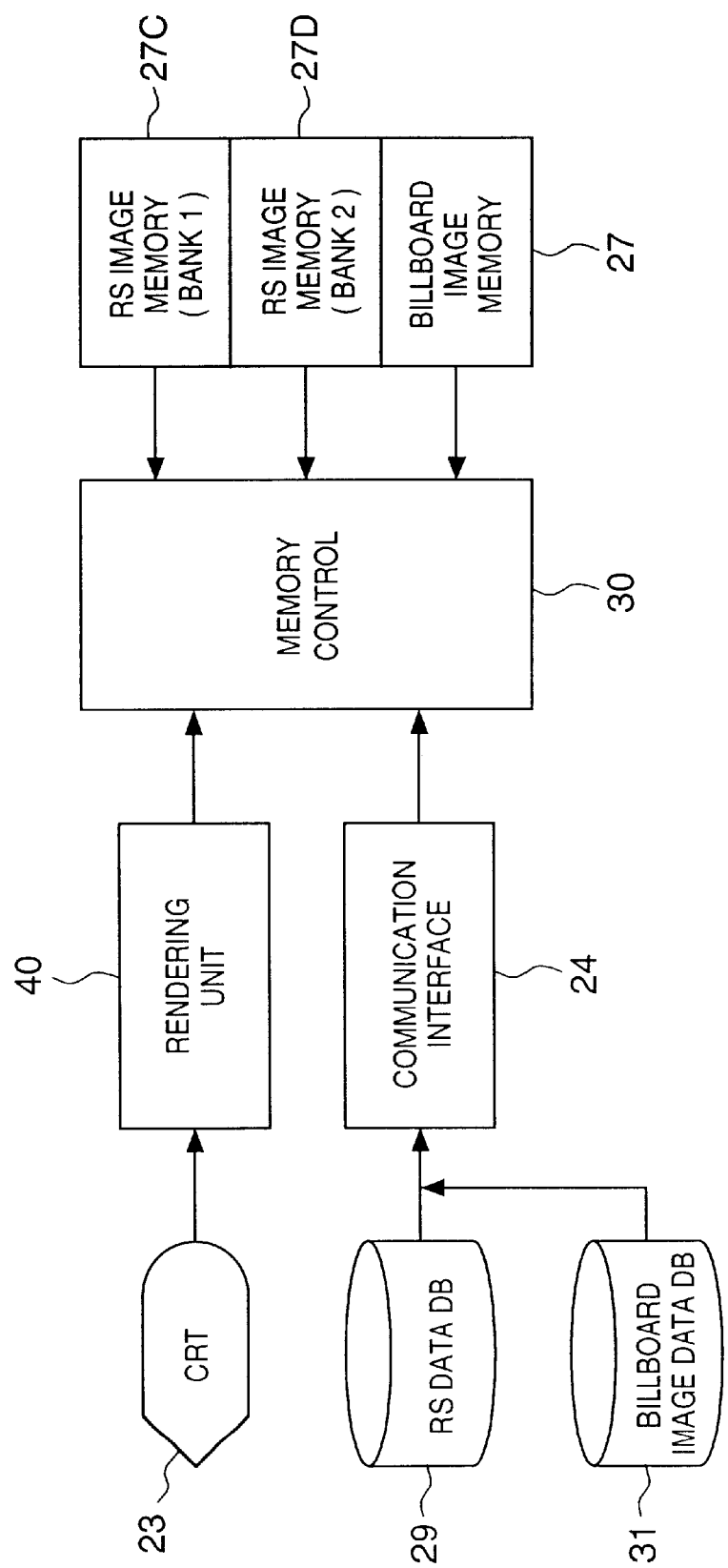
FIG. 39 is a block diagram for explaining the arrangement according to the third embodiment of the present invention.

FIG. 39 shows the hardware arrangement of an image processing apparatus according to the third embodiment. Unlike in the second embodiment, since the main memory 27 has a small size, a memory area for storing RS data is segmented into areas (to be referred to as banks B1 and B2 hereinafter) for two units.

As a characteristic feature of the third embodiment, various kinds of information are embedded in advance in respective zones of the virtual space. That is, the virtual space is segmented into three different zones:

intermediate zone
transition zone
display target zone in the planar direction. The display target zone is a virtual zone which has as its first objective to display a virtual image based on RS data, and is set in correspondence with the size of an exhibition room as a main object, as can be seen from an example shown in FIG. 40. In the example shown in FIG. 40, both zones A and B are "display target zones". The user can freely move inside this display target zone, and the system of this embodiment generates and displays a virtual image in correspondence with the moved viewpoint position of the user.

Outside the display target zone, the "transition zone" and "intermediate zone" indicating a moving route from this display target zone to another display target zone are assured. The "transition zone" is a band-like zone which is formed to have a nearly constant width around the display target zone in which the user stays currently. The intermediate zone is a moving area serving as a "moving path" formed across a plurality of display target zones.

Figure 40:
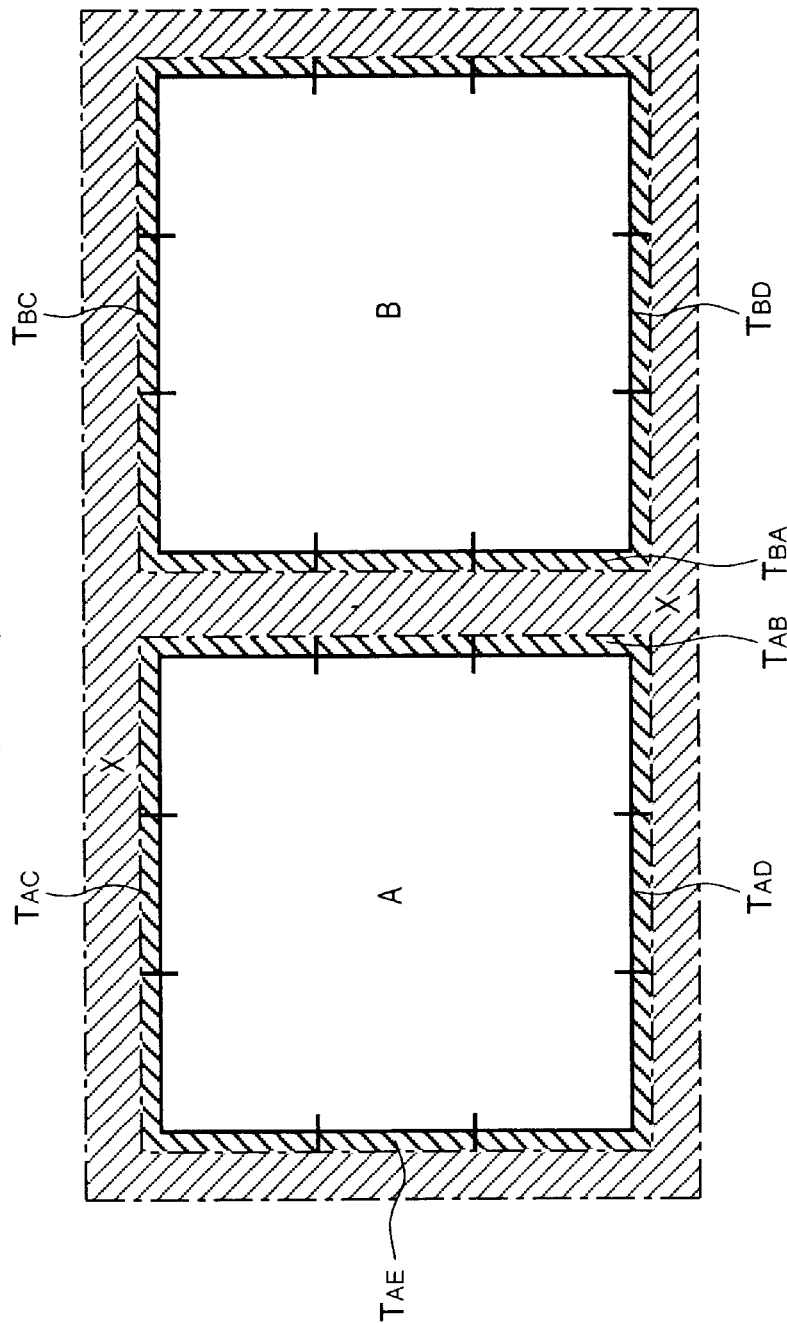
FIG. 40 is a view for explaining an example of the arrangement of a virtual space used in the third embodiment.

In the example in FIG. 40, transition zones $T_{AC}$, $T_{AB}$, $T_{AD}$, and $T_{AE}$ are assured outside display target zone A, and transition zones $T_{BC}$, $T_{BA}$, and $T_{BD}$ are assured outside display target zone B. For example, transition zone $T_{AC}$ is embedded with information for controlling transition between display target zones A and C. Of course, transition is present in two directions: transition in a direction to enter the display target zone, and transition in a direction to go outside (exit) the display target zone.

Each zone has an attribute value indicating its attribute, as shown in FIG. 41. In addition to the attribute value, when the zone of interest is a display target zone (attribute value=0), it has a "required image ID" (to be abbreviated as RQD-ID) field indicating an image required for rendering and display in that zone.

The transition zone handles transition between two display target zones, as described above. For this purpose, when the user's viewpoint position is located within a given transition zone, the change direction of that viewpoint position has one of two directions. In order to make the transition zone of interest indicate transition from the internal display target zone to another display target zone, an "external demand image data ID" (to be abbreviated as EXT-DMND-ID hereinafter) field stores the ID of RS data in the display target zone to which the viewpoint position is about to move, so as to request an image of the display target zone present outside the transition zone of interest (i.e., to issue a prefetch request since movement to the display target zone outside that transition zone is expected). Also, in order to make the transition zone of interest indicate transition from the external display target zone to another display zone, an "internal demand image data ID" (to be abbreviated as INT-DMND-ID hereinafter) field stores the ID of RS data in the display target zone to which the viewpoint position is about to move, so as to request an image of the display target zone present inside the transition zone of interest (i.e., to issue a prefetch request since movement to the display target zone inside that transition zone is expected). Note that the "ID" is an identifier for designating a set of RS data for one unit as in the second embodiment.

More specifically, in the example shown in FIG. 40 since transition zone $T_{AC}$ is present between display target zones A and C, the viewpoint position enters this transition zone $T_{AC}$ for the purpose of entering internal display target zone A, and for the purpose of entering external display target zone C. In the former case, a prefetch request of ray space data A is issued as INT-DMND-ID, and in the latter case, a prefetch request of ray space data C is issued as EXT-DMND-ID.

Outside the transition zone, the "intermediate zone" indicated by X in the example in FIG. 40 is assured. The intermediate zone allows movement without prefetch upon moving from a given display target zone to another.

Figure 32:
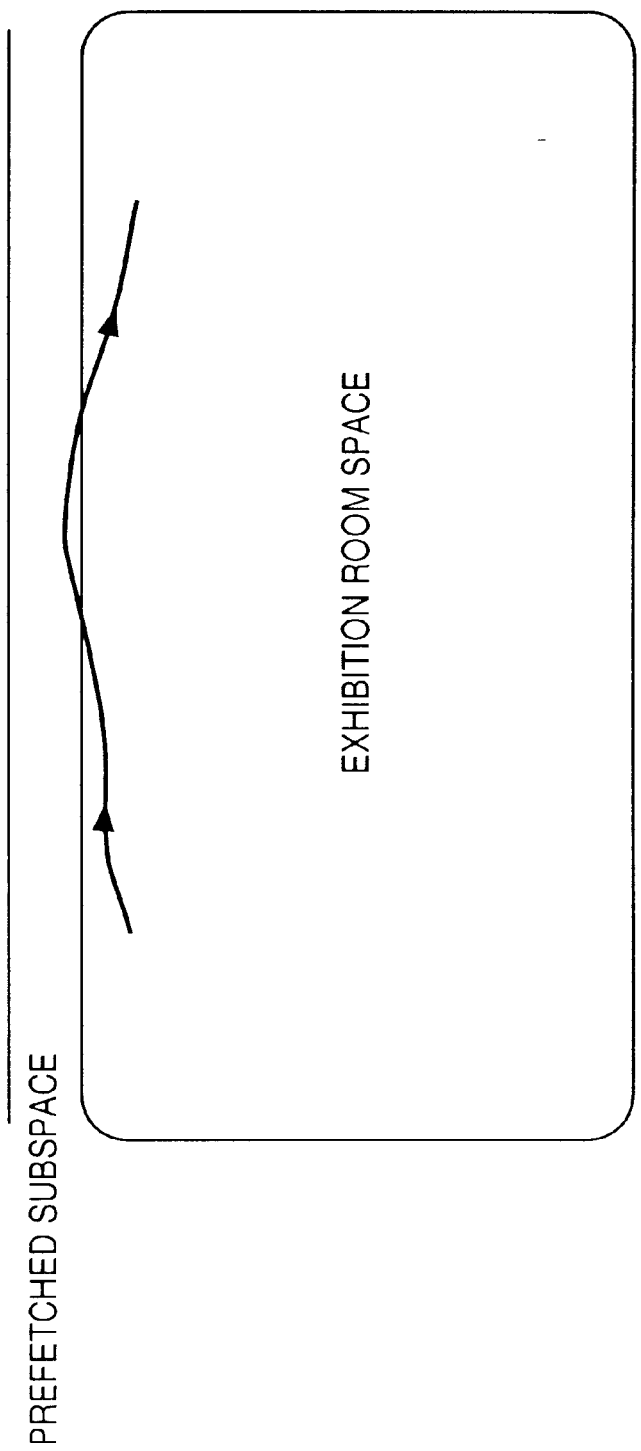
FIG. 32 is a view for explaining problems that may be posed in a walk-through environment proposed by the present inventors.

A major objective of the transition zone is to implement prefetch of RS data, which is required owing to a size reduction of the memory 27. When the memory size is reduced, a buffer that stores RS data which becomes unnecessary must be released earlier ("pre-released"). In such case, the objective of the intermediate zone is to prevent unwanted operations such as downloading of lost RS data from the DB 29 when the buffer has been erroneously pre-released. That is, even when it is erroneously determined due to an operation error of the joystick or the like that the viewpoint position is about to leave the display target zone, the third embodiment does not immediately release the buffer (a memory area of the memory bank), and stores RS data indicated by EXT-DMND-ID in the other free memory bank. In this way, even when the viewpoint position returns to the display target zone again in the example shown in FIG. 32, since RS data of that display target zone is saved in the memory bank, it need not be downloaded.

Figure 42:
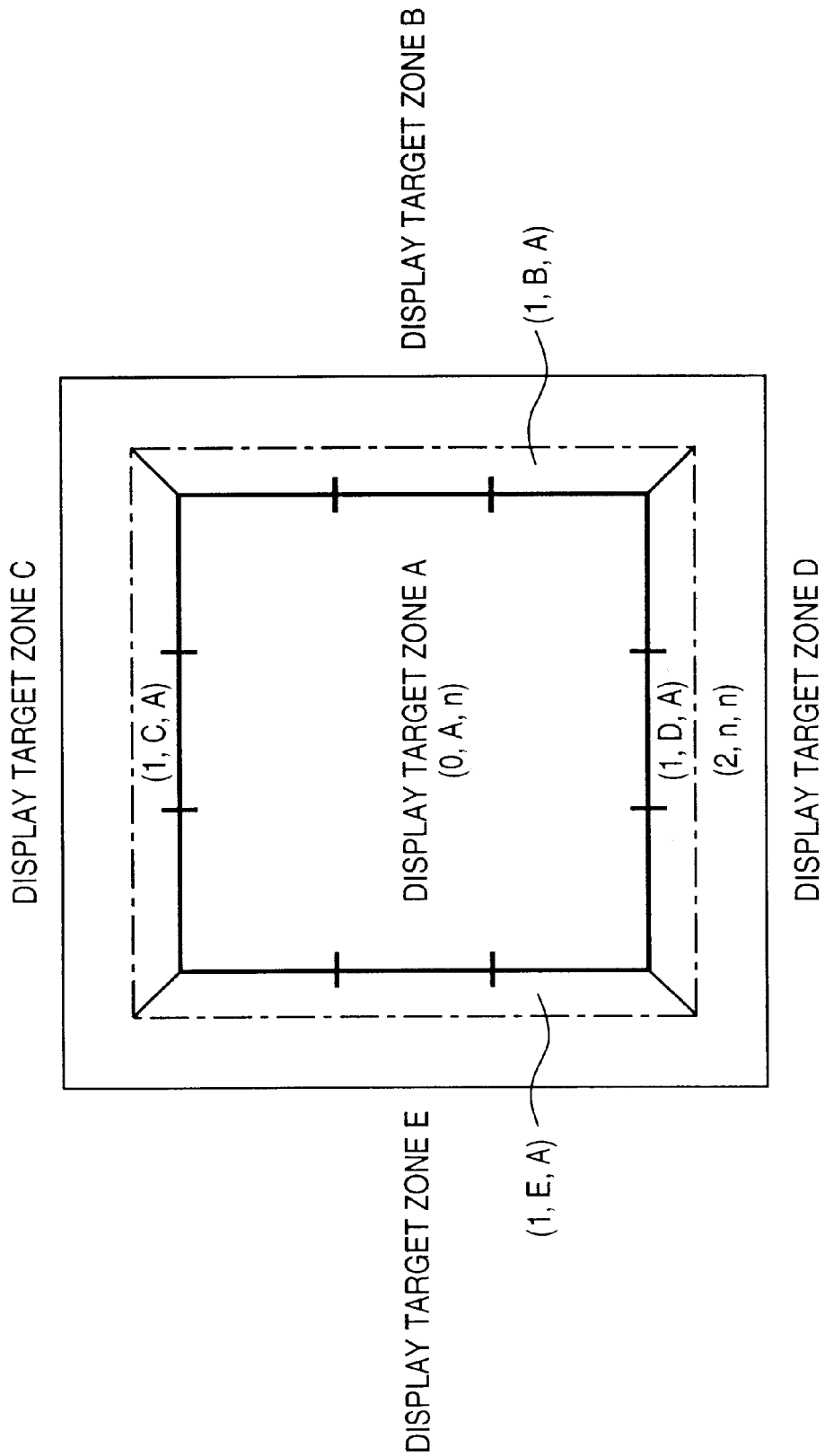
FIG. 42 is a view for explaining attribute values assigned to zone A in FIG. 40 in accordance with the attributes shown in FIG. 41.

FIG. 42 shows an example of zone attribute information embedded in various zones around display target zone A.

Figure 43:
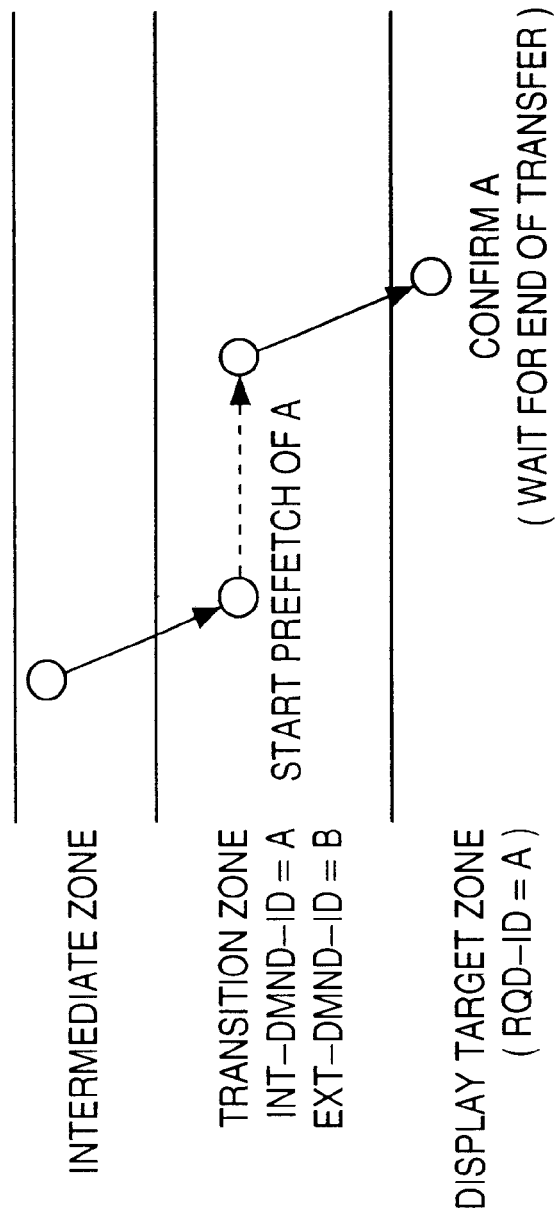
FIG. 43 is a schematic view for explaining principal control operations executed during movement of the user's viewpoint position from an intermediate zone to a display target zone via a transition zone in the third embodiment.

The control as a characteristic feature of the third embodiment while the user's viewpoint position moves to the intermediate zone→transition zone→display target zone will be explained below with reference to FIG. 43. As the image IDs embedded in the transition zone in this example, the ID (=INT-DMND-ID) of space data which is to be prefetched when the viewpoint position has moved from the intermediate zone to the transition zone is A, and the ID (=EXT-DMND-ID) of space data which is to be prefetched when the viewpoint position has moved from the display target zone to the transition zone is B. That is, when the viewpoint position has moved from the intermediate zone to the transition zone, INT-DMND-ID in the zone attribute information is read out to detect that space data of the upcoming display target zone is A, and downloading of that space data from the DB 29 to bank $B_1$ (for example) starts. Since space data A includes RS data of the entire display target zone A, it is effective to prefetch this data since a ray space can be immediately used when the viewpoint position has actually reached display target zone A. When the viewpoint position has moved from the transition zone to the display target zone, since RQD-ID of this display target zone is A, it is confirmed if space data A is stored in the memory area (e.g., bank $B_1$) of the main memory 27 by downloading mentioned above. If downloading is not complete yet, the user waits for completion of downloading within this display target zone.

Figure 44:
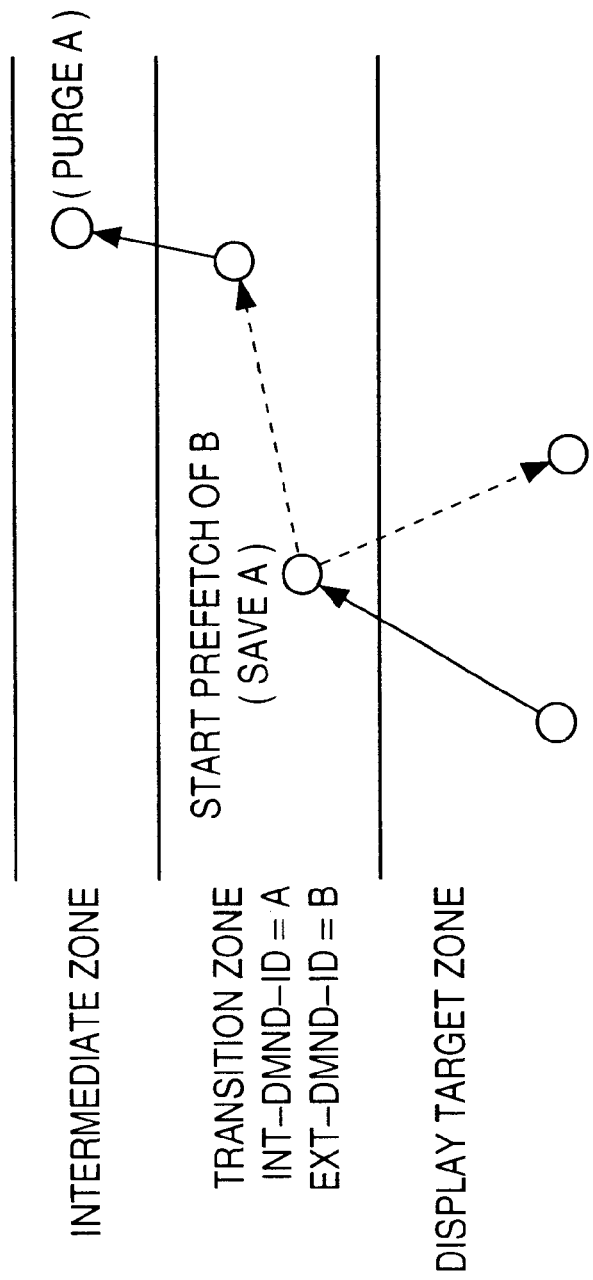
FIG. 44 is a schematic view for explaining principal control operations executed during movement of the user's viewpoint position from the display target zone to the intermediate zone via the transition zone in the third embodiment.

The control as a characteristic feature of the third embodiment while the user's viewpoint position moves to the display target zone→transition zone→intermediate zone, i.e., during a moving process to another display target zone, will be explained below with reference to FIG. 44.

When the viewpoint position has moved from the display target zone to the transition zone, EXT-DMND-ID in the zone attribute information is read out to detect that space data of a display target zone that neighbors display target zone A in which the viewpoint position stayed so far is B. Then, downloading of that space data from the DB 29 starts. Since space data A has already been stored in bank $B_1$, the download destination of space data B is bank $B_2$. That is, space data A in bank $B_1$ remains saved.

In the third embodiment, while the viewpoint position stays in a given transition zone, space data for the lower-order display target zone of that transition zone is held. As a result of holding, even when the user returns to the display target zone again, space data A in bank $B_1$ can be used, thus preventing RS data A from being downloaded again. Also, since prefetch of RS data B for the next display target zone has already started, when the user reaches display target zone B, it is expected that ray space B can be rendered immediately.

In the third embodiment, the holding time of RS data of the previous display target zone while the viewpoint position stays in the transition zone is limited to a predetermined time. This time should be varied or set in advance in correspondence with the size of a ray space for one unit, the user's preference, and the size of the virtual space, but it is set at, e.g., 5 sec in the third embodiment for the sake of simplicity. That is, in an example shown in FIG. 45 after the viewpoint position moves from display target zone A to transition zone, it returns to the display target zone, moves to the transition zone again, returns to the display target zone, and then moves to the transition zone. During these movements, since the staying times in the transition zone are less than 5 sec, RS data A remains held.

Figure 46:
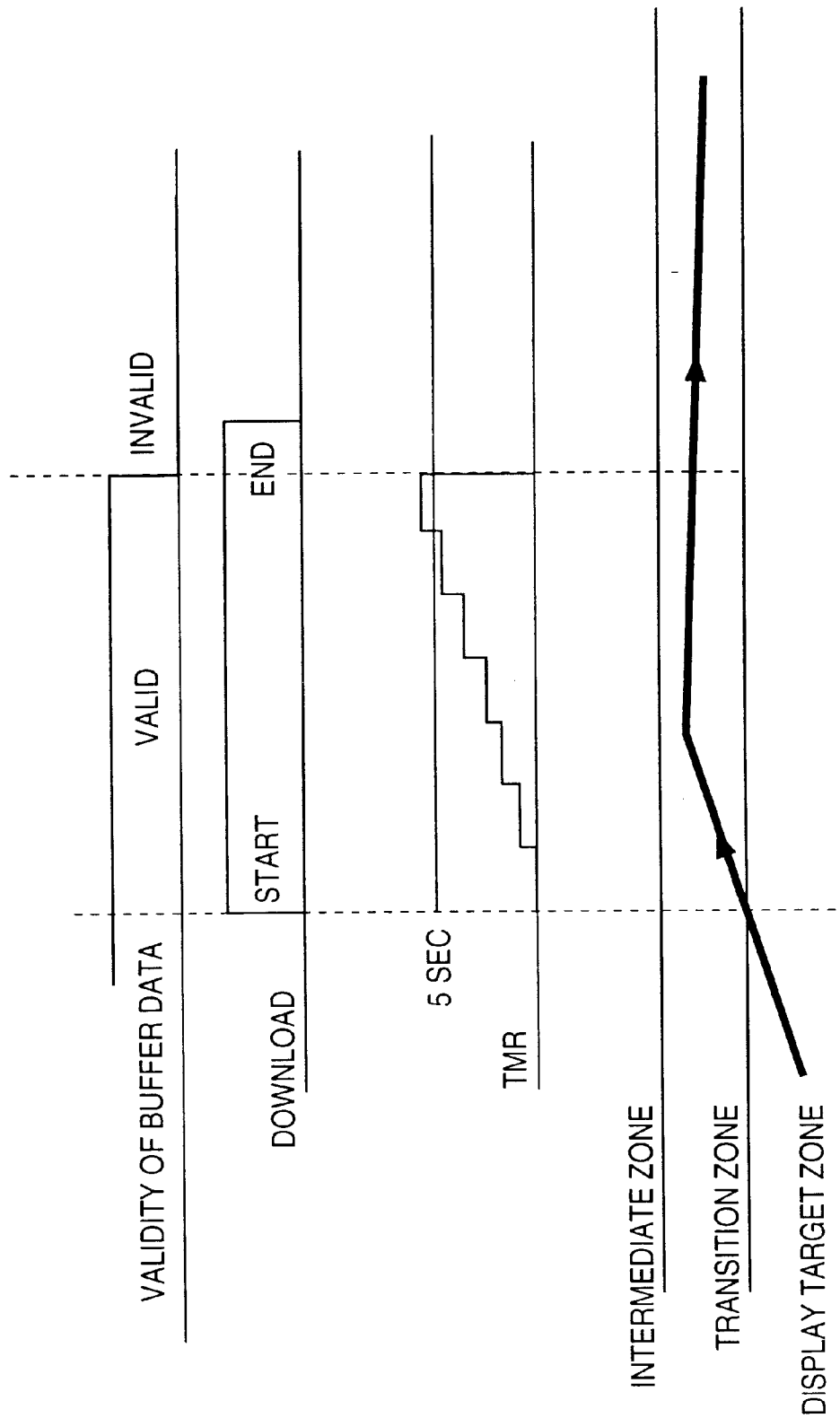
FIG. 46 is a schematic view for explaining control operations executed when the user's viewpoint position stays in the transition zone in the third embodiment.

On the other hand, in an example shown in FIG. 46 since the viewpoint position stays in the transition zone for 5 sec, data A in bank $B_1$ is purged (invalidated) and that buffer is released, although the viewpoint position stays in the transition zone.

Figure 45:
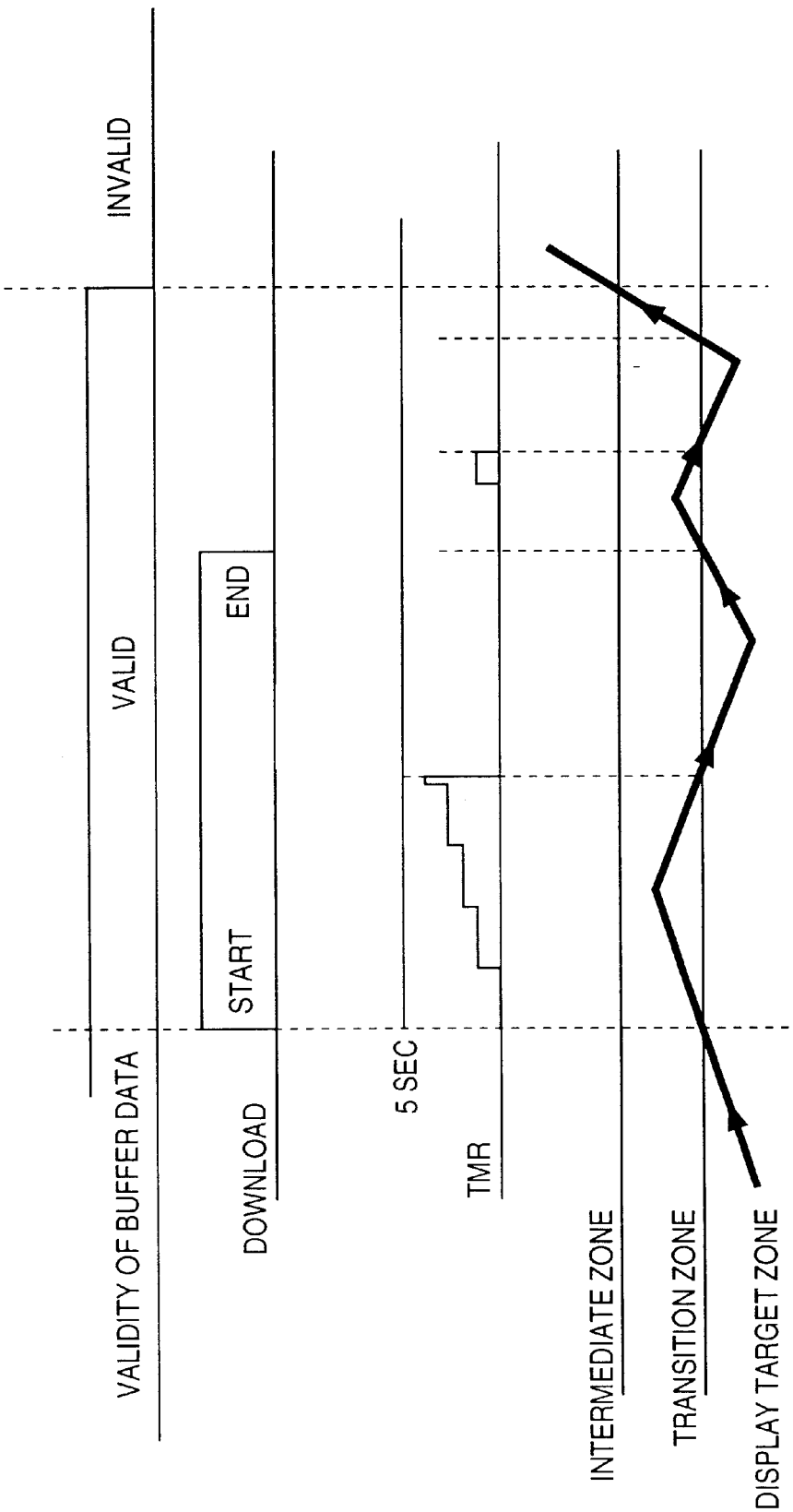
FIG. 45 is a schematic view for explaining control operations executed during reciprocal movements of the user's viewpoint position between the display target zone and transition zone in the third embodiment.

While the user's viewpoint position stays in the transition zone, as shown in FIG. 45, when the user moves his or her viewpoint position around inside but the peripheral portion of the display target zone using the mouse or joystick, the viewpoint position may inadvertently enter the transition zone, and a recognition error for the user may occur. However, when the viewpoint position stays in the transition zone for 5 sec or more, since the user is highly likely to leave the previous display target zone, RS data of that zone saved in the buffer can be discarded.

The control sequence of the third embodiment will be explained below with reference to the flow charts and the like. Note that FIGS. 47 to 50 are tables for explaining various registers used in this control sequence, and the actual control sequence is shown in FIG. 51 and the subsequent figures.

Figure 51:
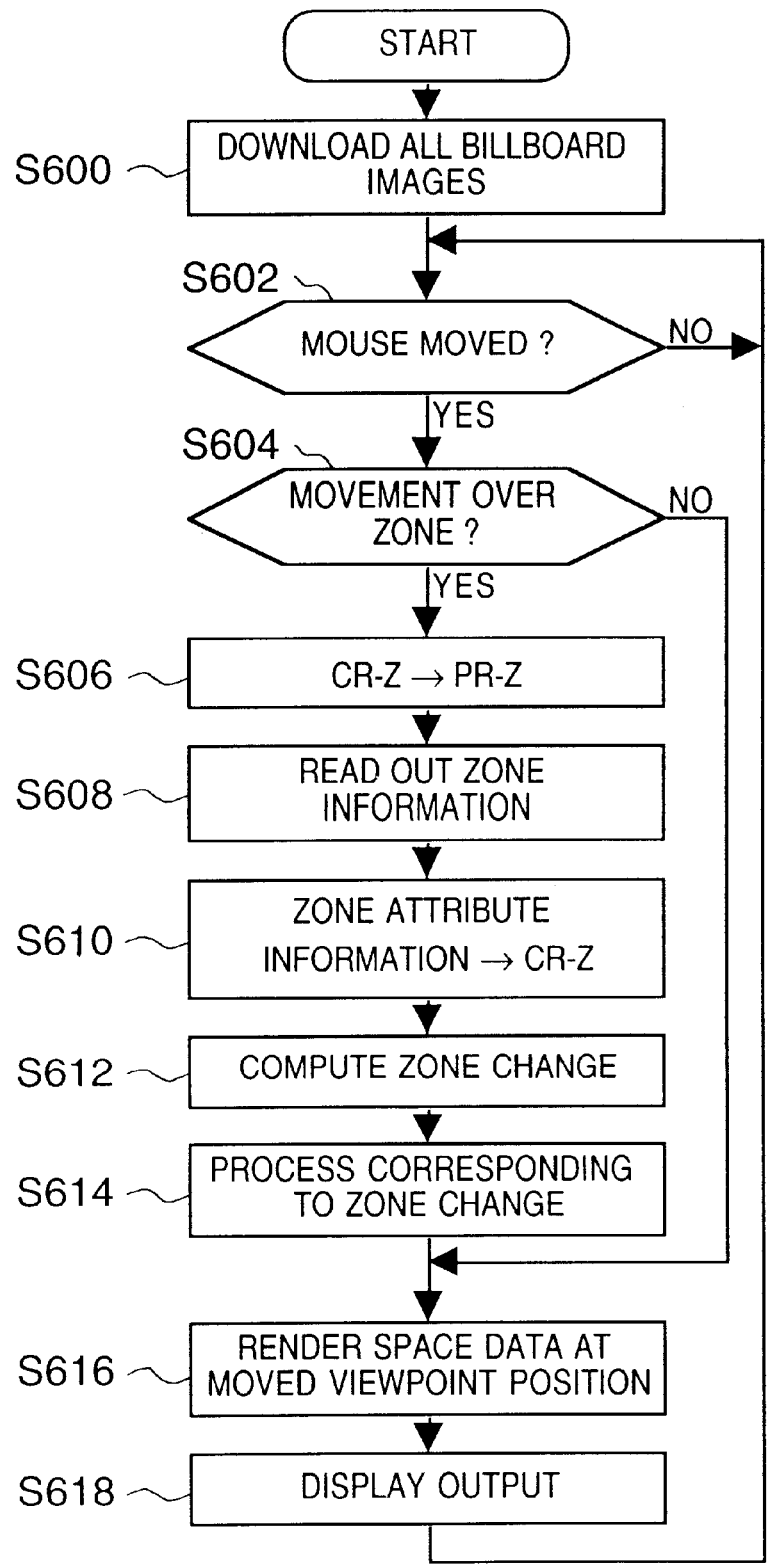
FIG. 51 is a flow chart showing the main routine of the control sequence of the third embodiment.

FIG. 51 shows the main routine of the control sequence of the third embodiment.

More specifically, in step S600 billboard images are downloaded from the billboard image DB 31. In the third embodiment, a virtual image based on RS data is displayed in the display target zone such as an exhibition room in principle. However, as described above, since the bank size for storing RS data in the main memory is small, RS data is prefetched every time the viewpoint position approaches a given display target zone. For this reason, RS data is not ready for display in some cases when the user has entered the display target zone. The billboard image is displayed as a substitute image in such case.

If all billboard images are downloaded onto bank $B_3$ of memory 27 in step S600, the user is given walk-through permission in step S602 and subsequent steps.

Figure 52:
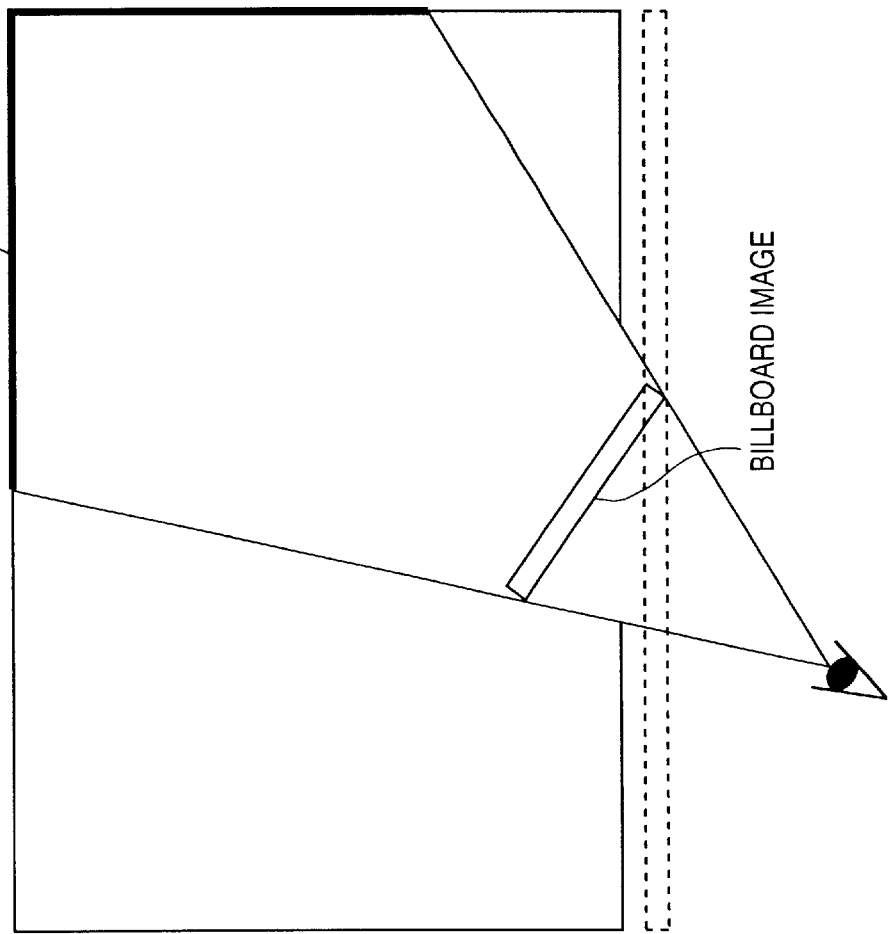
FIG. 52 is a view for explaining the relationship between virtual images based on RS data and billboard image data in the third embodiment (also in the second embodiment)

It is checked in step S602 if the user has moved the virtual viewpoint position by operating the joystick or the like. If YES in step S602, it is checked in step S604 if the movement has been made beyond the zone. If NO in step S604, the flow jumps to step S616 to generate and display a virtual image at that viewpoint position. In this case, if no RS data is present, a billboard image is displayed; if RS data is present, that RS data is converted into a virtual image, and the virtual image is displayed. FIG. 52 shows a case wherein a virtual image based on RS data is displayed, and a case wherein a billboard image is displayed, in correspondence with the viewpoint position. Note that each billboard image is described in VRML (Virtual Reality Modeling Language) in the second embodiment described above and the third embodiment. As a merit of displaying a billboard image, when the user walks through the virtual space, he or she often browses in a target subspace, and in such case, the user's objective is sufficiently achieved by the billboard image rather than a high-resolution image based on RS data.

If the zone has been changed due to the viewpoint position movement by the user, the flow advances to step S606. In step S606, the attribute value of the display target zone stored in register CR-Z (see FIG. 45) is saved in register PR-Z. The zone attribute information (FIG. 41) of the zone of interest is read out in step S608, and its attribute value is held in register CR-Z in step S610. In step S612, a zone change is detected by comparing the attribute value of the previous zone in register PR-Z and that of the current zone in register CR-Z. Note that the zone change can be detected as a change in attribute value, and in the third embodiment, four different changes are available:

2→1 (intermediate zone→transition zone)
1→0 (transition zone→display target zone)
0→1 (display target zone→transition zone)
1→2 (transition zone→intermediate zone)

Hence, in step S614 a process corresponding to such change is done.

<Intermediate Zone→Transition Zone>

Figure 53:
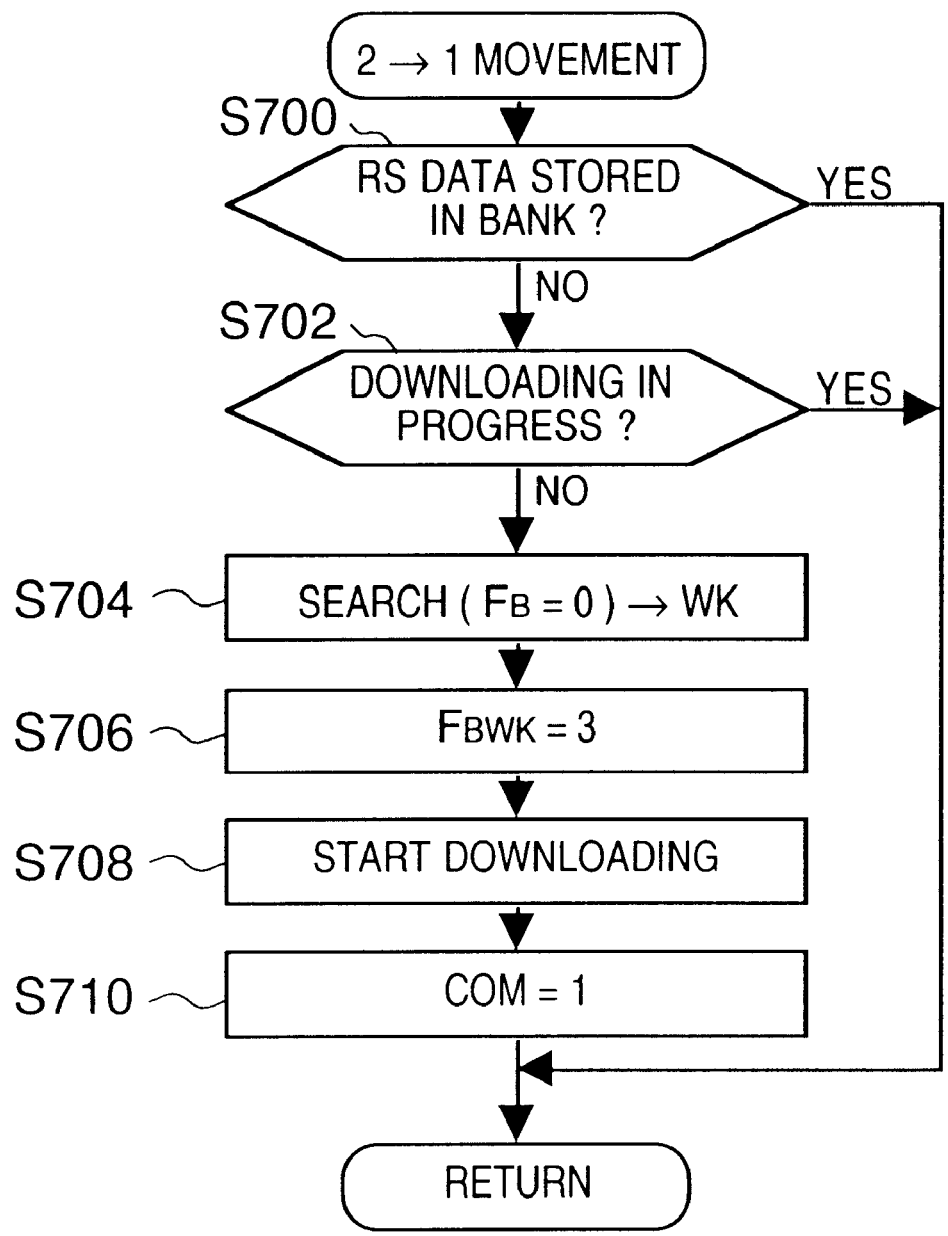
FIG. 53 is a flow chart for partially explaining the control sequence of the third embodiment.

When the viewpoint position has moved from the intermediate zone to the transition zone, the user is highly likely to further move the viewpoint position from this transition zone to another display target zone. On the other hand, in the third embodiment, RS data of the display target zone that the user wants to experience must have been prefetched in the previous transition (0→1 movement in FIG. 55) to the transition zone that follows the display target zone. Hence, which of memory banks $B_1$ and $B_2$ stores RS data having INT-DMND-ID as the attribute information of this transition zone is confirmed in step S700. This confirmation is implemented by selecting one of registers $F_{B1}$ and $F_{B2}$, which has a value "1" (intra-bank data is effective), and determining a memory bank that stores RS data based on the value of register $ID_{BX}$ corresponding to bank $B_x$ with the value "1". If RS data has already been downloaded into the bank, the control exits the control sequence shown in FIG. 53 and returns to the main routine.

If RS data is not downloaded yet, it is checked in step S702 if downloading is underway. This checking is attained by checking the value of register COM (see FIG. 50) that manages the state of a communication interface 24 (see FIG. 39). If COM=1, it is determined that downloading of RS data to either bank is underway, and the control returns to the main routine. In step S702, the control does not wait for completion of downloading. This is because downloading may be completed while the viewpoint position moves from this transition zone to the next display target zone. Whether or not downloading is underway is more preferably confirmed by checking if the value of flag $F_{B1}$ or $F_{B2}$ is 3.

If RS data is not downloaded yet, downloading (prefetch) from the database DB 29 is done in step S704 and subsequent steps. That is, in step S704 a free memory bank is searched for. The free memory bank is the one corresponding to register $F_B$ (FIG. 47)=0. If such bank is found, its bank number is stored in work register WK (=0 or 1). In step S706, the value of flag $F_{Bwk}$ of that bank $B_{WK}$ is set to be a value "3" indicating that downloading is underway. In step S708, a transfer request for downloading is sent to the ray space DB 29. The value of the register of the communication interface 24 is set at COM=1 to indicate that downloading is underway.

In this manner, when the viewpoint position has entered the transition zone from the intermediate zone, the storage state of RS data of the display target zone which the viewpoint position is to enter is checked. If the RS data is not stored yet, it is downloaded to start prefetch of the RS data. If NO in step S700 (the required RS data is not present in the memory bank), it is checked in step S702 if downloading of that data is underway, and the control returns from the control sequence in FIG. 53 to step S616 in FIG. 51 irrespective of the checking result. Since a virtual image is rendered based on space data at that moved viewpoint position in step S616, if RS data is present, rendering based on RS data is done; if downloading is not complete yet, a billboard image is displayed as a substitute.

<Transition Zone→Display Target Zone>

Figure 54:
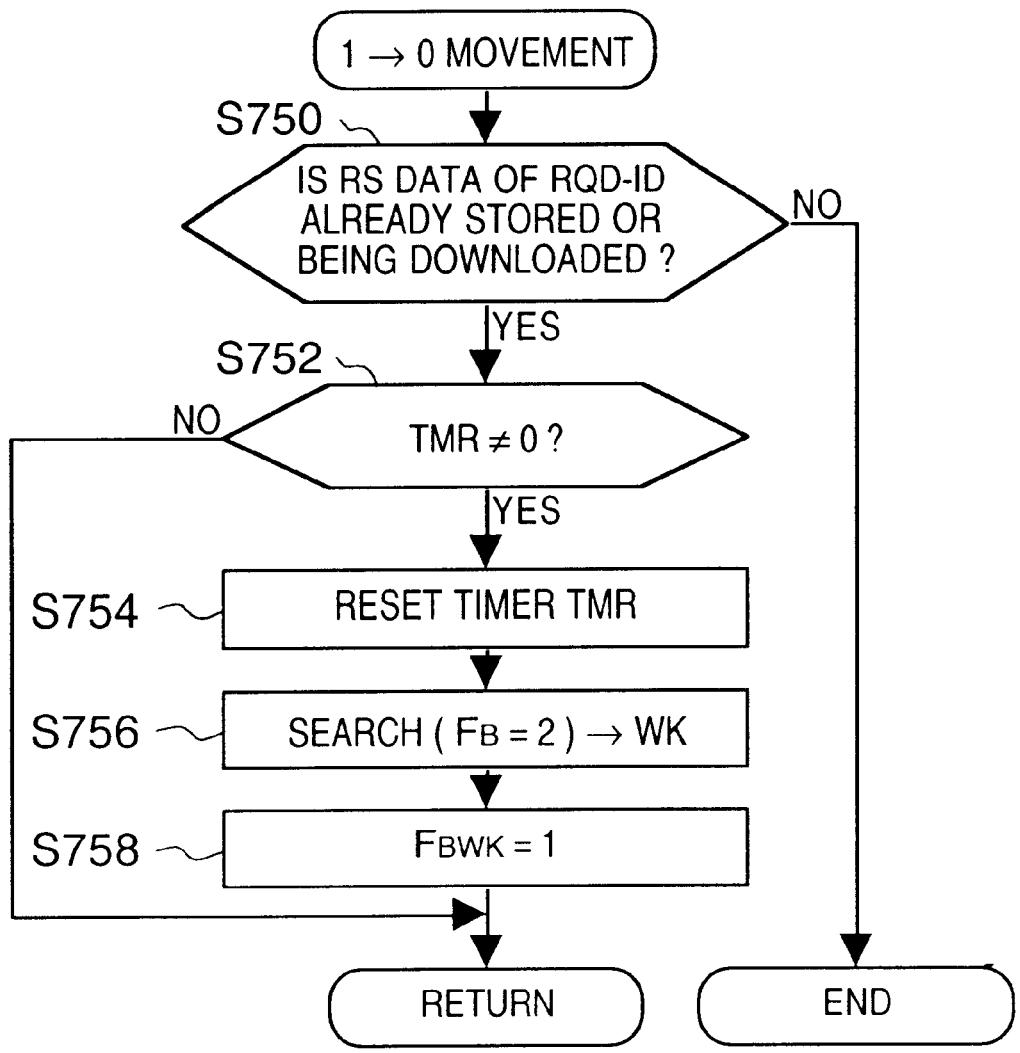
FIG. 54 is a flow chart for partially explaining the control sequence of the third embodiment.

FIG. 54 shows the control sequence executed when the viewpoint position has moved from the transition zone to the display target zone. The movement "transition zone→display target zone" includes a movement in which the viewpoint position moves from the display target zone to the transition zone, and then returns from that transition zone to the display target zone, as shown in FIG. 45, in addition to a normal movement "intermediate zone→transition zone→display target zone". In either case, the required space must already be present in the memory bank or its downloading to that memory bank must be underway. If NO in step S750, since an error has occurred, the control ends. This checking is done by searching the table shown in FIG. 48 with reference to a value corresponding to the required image ID (RQD-ID) of the attribute information (FIG. 41) of the display target zone of interest. That is, when the viewpoint position has entered display target zone A, if $B_A$=1, RS data A is stored in bank $B_1$; if $B_A$=2, RS data A is stored in bank $B_2$.

If YES in step S750, i.e., the required RS data is already present in the memory bank or downloading of that data is in progress, it is checked in step S752 if the value of timer TMR is zero. That is, in movement "display target zone→transition zone", since 5-sec timer TMR has been started, when the viewpoint position returns to the display target zone again, this timer TMR must be reset. Hence, it is checked in step S752 if 5-sec monitor timer TMR has been started. If YES in step S752, timer TMR is reset in step S754.

In steps S756 and S758, RS data temporarily marked "gray" is restored to "valid" data. The processes in steps S756 and S758 will be described later in association with a description of step S790 and subsequent steps in FIG. 55.

In this way, the user can experience the virtual space based on RS data in the display target zone.

<End of Downloading>

When downloading ends, the operating system interrupts this control sequence. When this interrupt is detected, the control sequence shown in FIG. 58 starts.

Figure 58:
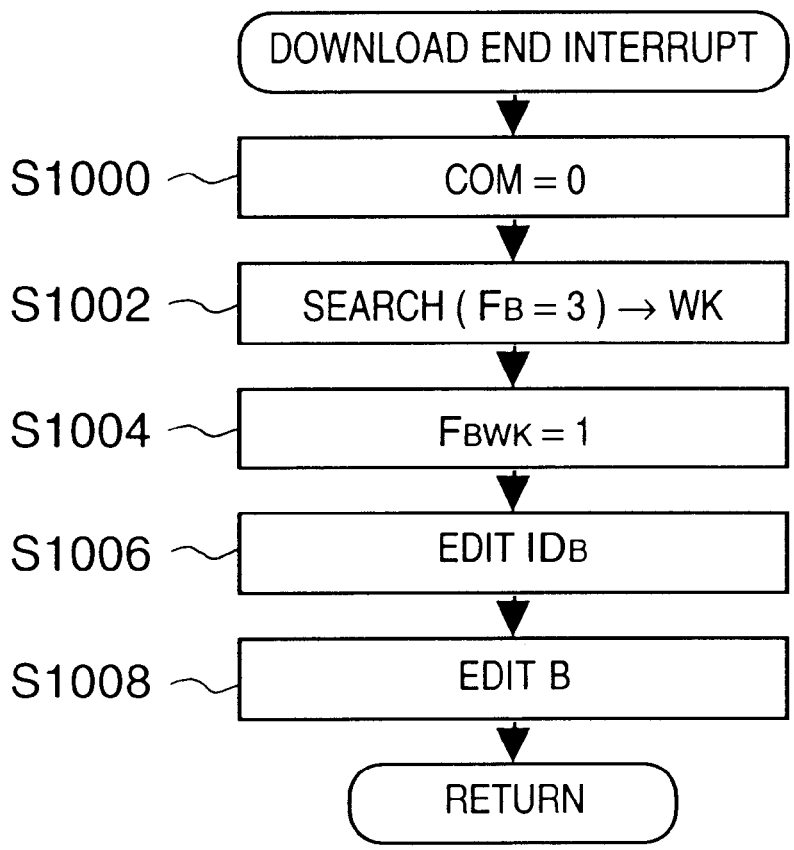
FIG. 58 is a flow chart for partially explaining the control sequence of the third embodiment.

In step S1000 in FIG. 58, the state of the communication interface 24 is set in an idle state (COM=0). In step S1002, a memory bank in which data was stored by downloading is checked. That is, a bank with $F_B$=3 is searched for, and its band number is saved in work register WK. In step S1004, the value of register $F_{Bwk}$ of that bank is set at "1" to indicate that data is valid. Furthermore, in step S1006 the value of $ID_{WK}$ is set to be an identifier (A, B, C, . . . ) of RS data to identify data stored in bank $B_{WK}$. Moreover, in step S1008 the value indicating the identifier of the downloaded RS data is set in register B (FIG. 48) that indicates the storage location of space data.

In this manner, the location of the bank that stores valid RS data can be checked based on registers $F_{B1}$, $F_{B2}$, $ID_{B1}$, $ID_{B2}$, $B_A$, and the like.

<Display Target Zone→Transition Zone>

Figure 55:
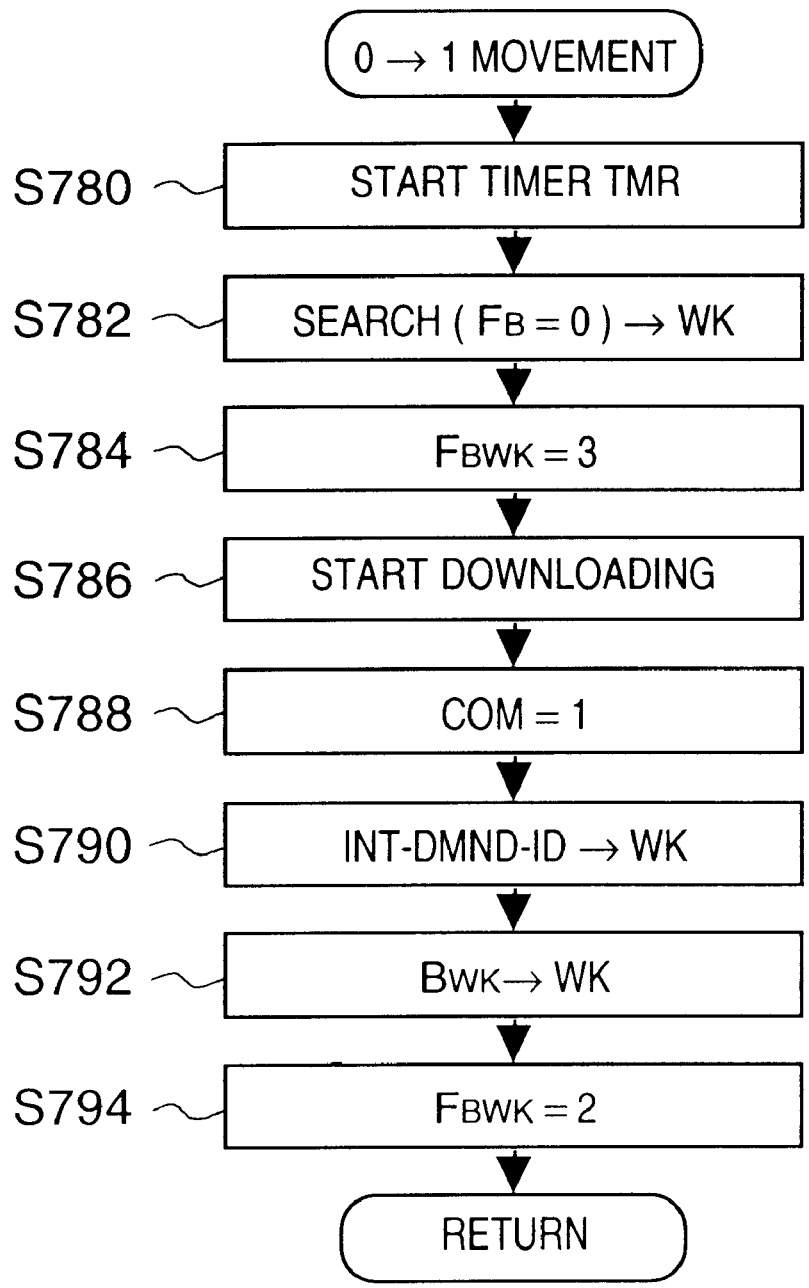
FIG. 55 is a flow chart for partially explaining the control sequence of the third embodiment.

FIG. 55 shows the control sequence when the viewpoint position has moved from the display target zone to the transition zone.

More specifically, timer TMR is started in step S780. Whether or not timer TMR generates time-out (the TMR value reaches a predetermined value) is monitored in the control sequence in FIG. 57.

In step S782 and subsequent steps, preparation for downloading RS data of the next display target zone (neighboring display target zone) is made. That is, a bank corresponding to register $F_B=0$ is searched for to find a free bank memory, and its bank number is stored in work register WK in step S782. In step S784, this memory bank $B_{WK}$ is marked ($F_{Bwk}=3$) to indicate that downloading is underway. In step S786, a download start command is sent to the interface 24. In step S788, the state of the interface 24 is marked (COM=1) to indicate that downloading is underway.

Furthermore, in step S790 and subsequent steps, RS data used for the purpose of rendering in the previous display target zone (the one where the user stayed so far) is marked to indicate "gray". As described above, when the viewpoint position has moved from the display target zone to the transition zone, since it is highly likely to move to another display target zone, the RS data used in the previous display target zone is highly likely to become unnecessary. However, in the third embodiment, this RS data is held in consideration of operation errors of the joystick, as has been explained above with reference to FIGS. 45 and 46. Since the RS data held in the memory bank may be erased, the state of such data is called a "gray" state in this embodiment. Note that RS data in the "gray" state is erased in step S802 in FIG. 56 as the control sequence for 1→2 movement.

In step S790, the identifier of RS data used in the previous display target zone is detected from the value of INT-DMND-ID of the transition zone of interest, and this value is stored in work register WK. In step S792, the number of the memory bank in which the RS data is stored is detected with reference to register B (FIG. 48) that holds the storage location of an image, and that value is stored in work register WK. In step S794, the state of this memory bank is set at $F_{Bwk}=2$ to mark "gray".

In this manner, in the control sequence in FIG. 55, prefetch of RS data for the next display target zone starts, and RS data used so far is set in the "gray" state so that the data can be restored anytime it is required.

If the user operates the joystick to return the viewpoint position to the previous display target zone again, that operation is detected as movement "transition zone→display target zone", and is processed in step S756 in FIG. 54. More specifically, a bank in the gray state is searched for in step S756, and its state value is set at $F_B=1$ in step S758.

Note that as a result of downloading that has started in step S786, RS data for the next display target zone is soon marked on the bank to indicate that the data is valid ($F_B=1$), i.e., valid image data are stored in both of the two memory banks (B1 and B2). In the third embodiment, since an image is rendered in accordance with the value of register B in FIG. 48, the two valid RS data are never confused.

<Transition Zone→Intermediate Zone>

Figure 56:
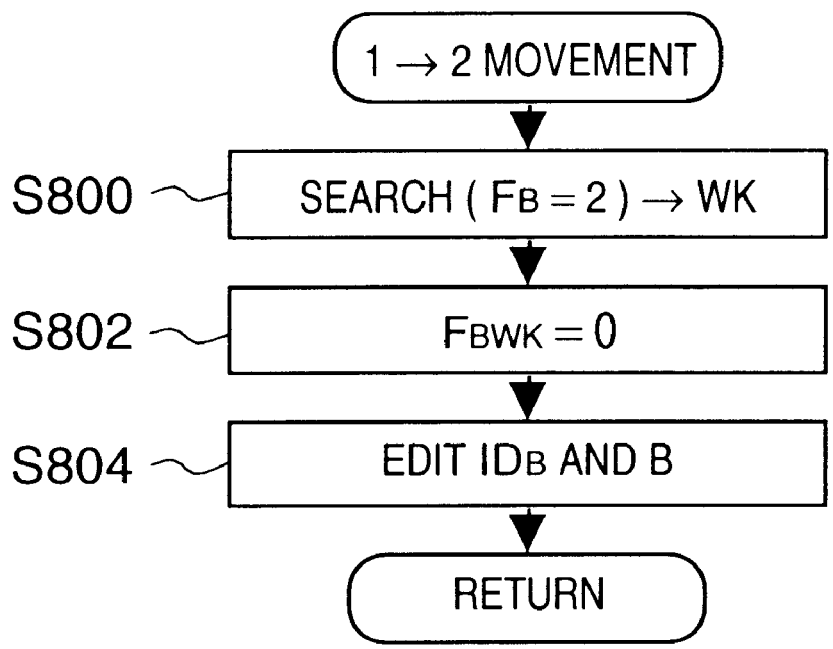
FIG. 56 is a flow chart for partially explaining the control sequence of the third embodiment.

When the viewpoint position has moved from the transition zone to the intermediate zone, the control sequence shown in FIG. 56 is executed.

More specifically, in step S800 in order to purge the RS data in the gray state, a bank that stores the RS data of interest is searched for. That is, in step S800 bank with $F_B=2$ is checked, in step S802 its bank number is stored in work register WK, and the state value of register $F_{Bwk}$ of that bank is set at 0 to indicate data is invalid. Furthermore, the values of the corresponding register $ID_B$ (FIG. 47) and register B (FIG. 48) are re-set to reflect invalidation of the data in step S804.

<Generation of Time-out>

Figure 57:
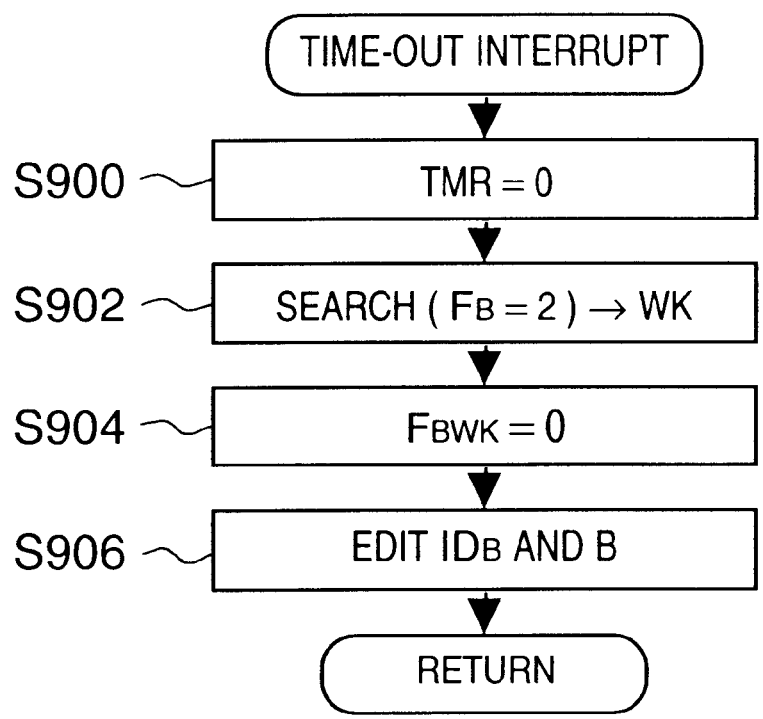
FIG. 57 is a flow chart for partially explaining the control sequence of the third embodiment.

The control sequence executed when 5-sec timer TMR generates time-out will be explained below with reference to FIG. 57. This timer TMR is effective only when the user's viewpoint position falls within the transition zone.

In step S900, timer TMR is reset. In step S902, a bank that stores RS data in the "gray" state is searched for, and its bank number is stored in work register WK. In step S904, the value of state register $F_{Bwk}$ of the bank with that number is set at "0" (data invalid). In step S906, the values of associated registers $ID_B$ (FIG. 47) and register B (FIG. 48) are re-set to reflect invalidation of the data.

In this manner, when the viewpoint position stays in the transition zone for a predetermined time or more, it is estimated that the user intends to leave the previous display target zone, and the RS data in the gray state is invalidated. In other words, the buffer is automatically released in place of the user.

Modification . . . Third Embodiment

Various modifications of the third embodiment may be made.

I: For example, in the third embodiment, two zones, i.e., the transition zone and intermediate zone, bound a single display target zone. However, the number of these zones is not limited to two. For example, two transition zones, i.e., an upper-layer transition zone and lower-layer transition zone may be provided. That is, in the third embodiment, RS data is prefetched when the viewpoint position moves toward the next display target zone (movement "display target zone→transition zone"). Note that data is also prefetched when the viewpoint position moves from the intermediate zone to the display target zone. However, this prefetch starts in the transition zone as the layer next to the display target zone, and the viewpoint position immediately moves from the transition zone to the display target zone, resulting in poor practical effect. Hence, as described above, two layers of transition zones are provided, so that prefetch is done in the upper-layer transition zone when the viewpoint position enters the display target zone of interest, and prefetch is done in the lower-layer transition zone when the viewpoint position moves from the display target zone of interest to another display target zone. In this case, the need for the intermediate zone is obviated.

II: In the third embodiment, when movement "display target zone A→transition zone from A to B→intermediate zone→transition zone for C→display target zone C" is made, RS data for display target zone B is prefetched in the transition zone from A to B. However, since the viewpoint position has consequently moved to display target zone C, that prefetch is not efficient one.

To cope with such situation, since all intermediate zones are segmented in correspondence with display target zones, inefficient prefetch can be prevented.

III: In the above embodiment, RS data is taken as an example. However, the present invention is not limited to such specific data, and can be applied to space data that requires a certain time for data transfer, i.e., every other space data that require a long data transfer time which bottlenecks a real-time process.

Therefore, the present invention is not limited to application to a system in which a main memory and DB are connected via a communication line, but whether or not the process of the present invention is required should be determined depending on the degree of demand for real-time response of that application. Therefore, in some cases, the present invention can be applied to a system in which a main memory and database DB are connected via a parallel bus.

IV: In the third embodiment, RS data marked in the gray state is erased when the viewpoint position stays in the transition zone for a predetermined time. Furthermore, erasure of such RS data may be started in response to predetermined keyboard operation by the user (or operation for a predetermined icon (button) 61 shown in, e.g., FIG. 60).

V: In the third embodiment, encoded RS data is stored in the database 29, and is decoded every time it is downloaded from that database. However, as has been explained in association with the third example of the second embodiment, a decoding process of encoded space data requires much time, while encoded space data does not require a large memory space. More specifically, the main memory equipped in the system may have a memory size large enough to store all encoded RS data. Hence, when the main memory 27 has an enough margin, the third embodiment is modified as in the third example, i.e., a modification in which all RS data are downloaded onto the memory 27, and only RS data at the moved user's viewpoint position is decoded in real time is proposed.

In this modification, a dedicated decoding processor or task is added to the third embodiment, and downloading of the third embodiment is modified to correspond to a decoding process. That is, the flag (COM) indicating whether or not downloading is underway is changed to that indicating decoding is underway, and the flag ($F_B$ in FIG. 47) indicating whether or not intra-bank data is valid is changed to that indicating whether or not data is decoded. Also, in this modification, RS data of all the display target zones are downloaded together with billboard image data in step S600 (FIG. 51). After these modifications, prefetch of RS data from the database when the viewpoint position enters a new display target zone is changed to an operation for pre-decoding encoded data.

With such modification, the real-time process of the third embodiment can be further improved.

As described above, according to the present invention, when a virtual image is generated based on space data which are generated based on actually captured images, since a hierarchized virtual image, especially, a virtual image of low resolution, is generated and rendered early, the user can recognize the structure of the virtual space early.

To recapitulate, according to the present invention, at least one of two different types of space data is separately stored in an external memory and is downloaded as needed, in consideration of the size of the space data. During downloading, since a virtual image is rendered on the basis of space data present in an internal memory, the user can experience the virtual space. That is, optimization of the memory size and all-time presentation of a virtual image can be achieved at the same time.

Furthermore, the present invention can be applied to the system comprising either a plurality of units or a single unit.

It is needless to say that the present invention can be applied to the case which can be attained by supplying programs which execute the process defined by the present system or invention.

What is claimed is:

1. An image storage method for storing space data, including real image data of an actually captured image, in association with a predetermined space different from a real image space, comprising:

the first layer dividing step of hierarchically dividing the real image data into layers in accordance with resolutions;

the second layer dividing step of hierarchically dividing a map that represents correspondence between the real image space and the predetermined space different from the real image space into layers in accordance with resolutions, the resolutions of the divided layers corresponding to resolutions of the layers divided in the first layer dividing step; and the step of storing obtained hierarchical image data and hierarchical map data in a storage device.

2. The method according to claim 1, wherein the space data is ray space data.

3. The method according to claim 1, wherein the layers and resolutions are set in ascending or descending order.

4. The method according to claim 1, wherein each of the first and second layer dividing steps includes the step of performing a data decimation process.

5. The method according to claim 1, wherein the second layer dividing step includes the block segmentation step of segmenting the map data into a plurality of blocks in correspondence with a block having a size set in correspondence with the number of divided layers.

6. The method according to claim 1, wherein the second layer dividing step uses converted address n given by:

$$n_i = [n_j - 1/2^{p-i}]$$

where p is the number of divided layers, i is a layer to be processed, and $n_j$ is the storage address of map data of the i-th layer.

7. The method according to claim 1, wherein if the block size is N×N, the block segmentation step sets:
$$N = 2^{P-1}$$
where p is the number of divided layers.

8. An image rendering method for rendering hierarchical space data stored by a method cited in claim 1 in a virtual space, comprising:

the step of reading hierarchical space data of respective layers in ascending order of resolution; and the rendering step of rendering a virtual image in the order the hierarchical space data is read.

9. The method according to claim 8, further comprising the detection step of detecting a user's viewpoint position, and wherein the rendering step includes the step of rendering a virtual image on the basis of the detected viewpoint position.

10. The method according to claim 9, wherein the reading step includes the step of reading hierarchical space data of a space near the detected viewpoint position.

11. A storage medium that stores a program for implementing a method cited in claim 1 on a computer.

12. A computer that mounts a storage medium cited in claim 11.

13. An image storage apparatus for storing space data, including real image data of an actually captured image, in association with a predetermined space different from a real image space, comprising:

first layer dividing means for hierarchically dividing the real image data into layers in accordance with resolutions;

second layer dividing means for hierarchically dividing a map that represents correspondence between the real image space and the predetermined space different from the real image space into layers in accordance with resolutions, the resolutions of the divided layers corresponding to resolutions of the layers divided by said first layer dividing means; and storage means for storing obtained hierarchical image data and hierarchical map data.

14. The apparatus according to claim 13, wherein the space data is ray space data.

15. The apparatus according to claim 13, wherein the layers and resolutions are set in ascending or descending order.

16. The apparatus according to claim 13, wherein each of said first and second layer dividing means performs a data decimation process.

17. The apparatus according to claim 13, wherein said second layer dividing means includes block segmentation means for segmenting the map data into a plurality of blocks in correspondence with a block having a size set in correspondence with the number of divided layers.

18. The apparatus according to claim 13, wherein said second layer dividing means uses converted address $n_i$ given by:

$$n_i = [n_j - 1/2^{p-i}]$$

where p is the number of divided layers, i is a layer to be processed, and nj is the storage address of map data of the i-th layer.

19. The apparatus according to claim 13, wherein if the block size is N×N, said block segmentation means sets:
$N=2^{P-1}$
where p is the number of divided layers.

20. An image processing apparatus for rendering hierarchical space data stored by an image storage apparatus cited in claim 13 in a virtual space, comprising:

means for reading hierarchical space data of respective layers in ascending order of resolution; and rendering means for rendering a virtual image in the order the hierarchical space data is read.

21. The apparatus according to claim 20, further comprising detection means for detecting a user's viewpoint position, and wherein said rendering means includes the means for rendering a virtual image on the basis of the detected viewpoint position.

22. An image downloading method for downloading space data which is formed based on image data of an actually captured image in association with a predetermined space different from a real image space, comprising:

the first layer dividing step of hierarchically dividing real image data in the space data into layers in accordance with resolutions;

the second layer dividing step of hierarchically dividing a map that represents correspondence between the real image space and the predetermined space into layers in accordance with resolutions; and the downloading step of downloading obtained hierarchical image data, and a map that represents correspondence between the real image space and the predetermined space to an external apparatus, wherein the downloading step includes the step of downloading the obtained hierarchical image data and hierarchical map data.

23. The method according to claim 22, wherein the resolutions of the respective layers of the map are set in correspondence with resolutions of the respective layers divided in the first layer dividing step.

24. The method according to claim 22, wherein the resolutions increase in an order the data are downloaded.

25. The method according to claim 22, wherein the first layer dividing step includes the step of dividing the image data to make hierarchical image data of a first layer include real image data at a pixel position common to the respective layers, and hierarchical data of a second layer as a layer higher than the first layer not include the real image data at the common pixel position.

26. The method according to claim 25, wherein the external apparatus merges the hierarchical image data of the first and second layers.

27. The method according to claim 25, wherein the actually captured image data and space data are stored in an image database, which executes the first layer dividing step in response to a downloading request from the external apparatus.

28. A storage medium that stores a program for implementing a method cited in claim 22 on a computer.

29. An image processing method comprising:

the step of converting input image data into space data that pertains to a predetermined space coordinate system different from an image space coordinate system of the input image data;

the first layer dividing step of hierarchically dividing the space data into layers in accordance with resolutions;

the step of generating a map that represents correspondence between image data in the image space coordinate system and space data in the predetermined space;

the second layer dividing step of hierarchically dividing the map into layers in accordance with resolutions;

the step of storing obtained hierarchical space data and hierarchical map data in a storage device; and the image generation step of generating an image on the basis of the hierarchical space data and hierarchical map data.

30. The method according to claim 29, wherein the resolutions of the respective layers divided by the second layer dividing step are set to correspond to the resolutions of the respective layers divided in the first layer dividing step.

31. The method according to claim 29, wherein the layers and resolutions are set in ascending or descending order.

32. The method according to claim 29, wherein each of the first and second layer dividing steps includes the step of performing a data decimation process.

33. The method according to claim 29, wherein the second layer dividing step includes the block segmentation step of segmenting the map data into a plurality of blocks in correspondence with a block having a size set in correspondence with the number of divided layers.

34. The method according to claim 29, wherein the second layer dividing step uses converted address n given by:

$$n_i = [n_j - 1/2^{p-i}]$$

where p is the number of divided layers, i is a layer to be processed, and nj is the storage address of map data of the i-th layer.

35. The method according to claim 29, wherein if the block size is N×N, the block segmentation step sets:
$N=2^{P-1}$
where p is the number of divided layers.

36. The method according to claim 29, further comprising:

the step of reading hierarchical space data of respective layers in ascending order of resolution; and the rendering step of rendering a virtual image in the order the hierarchical space data is read.

37. The method according to claim 36, further comprising the detection step of detecting a user's viewpoint position, and wherein the rendering step includes the step of rendering a virtual image on the basis of the detected viewpoint position.

38. The method according to claim 37, wherein the reading step includes the step of reading hierarchical space data of a space near the detected viewpoint position.

39. A storage medium that stores a program for implementing a method cited in claim 29 on a computer.

40. An image processing apparatus comprising:

means for converting input image data into space data that pertains to a predetermined space coordinate system different from an image space coordinate system of the input image data;

first layer dividing means for hierarchically dividing the space data into layers in accordance with resolutions;

means for generating a map that represents correspondence between image data in the image space coordinate system and space data in the predetermined space;

second layer dividing means for hierarchically dividing the map into layers in accordance with resolutions;

means for storing obtained hierarchical space data and hierarchical map data in a storage device; and image generation means for generating an image on the basis of the hierarchical space data and hierarchical map data.

41. The apparatus according to claim 40, wherein the resolutions of the respective layers divided by said second layer dividing means are set to correspond to the resolutions of the respective layers divided by said first layer dividing means.

42. The apparatus according to claim 40, wherein the layers and resolutions are set in ascending or descending order.

43. The apparatus according to claim 40, wherein each of said first and second layer dividing means performs a data decimation process.

44. The apparatus according to claim 40, wherein said second layer dividing means includes block segmentation means for segmenting the map data into a plurality of blocks in correspondence with a block having a size set in correspondence with the number of divided layers.

45. The apparatus according to claim 40, wherein said second layer dividing means uses converted address n given by:

$$n_i = [n_j - 1/2^{p-i}]$$

where p is the number of divided layers, i is a layer to be processed, and nj is the storage address of map data of the i-th layer.

46. The apparatus according to claim 40, wherein if the block size is N×N, said block segmentation means sets:

$$N = 2^{P-1}$$

where p is the number of divided layers.

47. The apparatus according to claim 40, further comprising:

means for reading hierarchical space data of respective layers in ascending order of resolution; and rendering means for rendering a virtual image in the order the hierarchical space data is read.

48. The apparatus according to claim 47, further comprising detection means for detecting a user's viewpoint position, and wherein said rendering means renders a virtual image on the basis of the detected viewpoint position.

49. The apparatus according to claim 48, wherein said reading means reads hierarchical space data of a space near the detected viewpoint position.

50. A storage medium that stores a program for implementing a method cited in claim 40 on a computer.

51. A rendering method for rendering a virtual image viewed from an arbitrary viewpoint position in a virtual space, comprising the steps of:

storing first space data in a first format at a first viewpoint position in an internal memory;

storing second space data in a second format at the first viewpoint position in an external memory;

downloading the second space data from the external memory to generate a virtual image at an arbitrary viewpoint position; and rendering the virtual image at the arbitrary viewpoint position on the basis of the first space data in the internal memory before downloading is completed, and on the basis of the second space data downloaded into the internal memory after downloading is completed.

52. The method according to claim 51, wherein the first space data is space data which is optimal to form a billboard image.

53. The method according to claim 51, wherein the first space data is VRML space data, and the second space data is ray space data.

54. The method according to claim 51, wherein a virtual walk-through environment is provided to a user in the virtual space.

55. The method according to claim 51, wherein the first space data is stored in the external memory, and downloading of the first space data to the internal memory is completed before downloading of the second space data.

56. The method according to claim 51, further comprising the steps of: storing space data of a plurality of images captured in advance from a plurality of different viewpoint positions in the external memory as the second space data;

detecting a user's viewpoint position which moves; and executing a rendering process of an image at a viewpoint position after movement, and a download process of the second space data as parallel processes.

57. The method according to claim 51, further comprising the steps of:

storing space data of a plurality of images captured in advance from a plurality of different viewpoint positions in the external memory as the second space data;

detecting a user's viewpoint position which moves;

downloading space data corresponding to a viewpoint position after movement from the external memory; and rendering a virtual image on the basis of the first space data in the internal memory before downloading is completed, and on the basis of the second space data which has been downloaded into the internal memory and corresponds to the viewpoint position after movement after downloading is completed.

58. The method according to claim 51, wherein the internal memory has a capacity for storing at least the first and second space data.

59. A rendering apparatus for rendering a virtual image at an arbitrary viewpoint position in a virtual space, comprising:

an internal memory for storing first space data in a first format at a first viewpoint position;

an external memory for storing second space data in a second format at the first viewpoint position, said external memory being different from said internal memory;

download means for downloading the second space data from said (external memory to generate a virtual image at an arbitrary viewpoint position; and rendering means for rendering the virtual image at the arbitrary viewpoint position on the basis of the first space data in said internal memory before downloading is completed, and on the basis of the second space data downloaded into said internal memory after downloading is completed.

60. The apparatus according to claim 59, wherein the first space data is space data which is optimal to form a billboard image.

61. The apparatus according to claim 51, wherein the first space data is VRML space data, and the second space data is ray space data.

62. The apparatus according to claim 58, wherein a virtual walk-through environment is provided to a user in the virtual space.

63. The apparatus according to claim 59, wherein when the first space data is stored in said external memory, said download means completes downloading of the first space data to said internal memory before downloading of the second space data.

64. The apparatus according to claim 59, wherein said external memory stores space data of a plurality of images captured in advance from a plurality of different viewpoint positions as the second space data, said apparatus further comprises means for detecting a user's viewpoint position which moves, and said download means and rendering means execute a rendering process of an image at a viewpoint position after movement, and a download process of the second space data as parallel processes.

65. The apparatus according to claim 59, wherein said external memory stores space data of a plurality of images captured in advance from a plurality of different viewpoint positions as the second space data, said apparatus further comprises means for detecting a user's viewpoint position which moves, said download means downloads space data corresponding to a viewpoint position after movement from said external memory, and said rendering means renders a virtual image on the basis of the first space data in said internal memory before downloading is completed, and on the basis of the second space data which has been downloaded into said internal memory and corresponds to the viewpoint position after movement after downloading is completed.

66. The apparatus according to claim 59, wherein said internal memory has a capacity for storing at least the first and second space data.

67. A program storage medium that stores a computer program for implementing an image rendering method cited in claim 51 via a computer.

68. A rendering method for rendering a virtual image at an arbitrary viewpoint position in a virtual space, comprising the steps of:

rendering first space data in a first data format and second space data in a second data format at an arbitrary viewpoint position as virtual images; and mapping the virtual image based on the first space data in the virtual space when rendering of the virtual image based on the second space data does not end in time before mapping in the virtual space.

* * * * *

UNITED STATES PATENT AND TRADEMARK OFFICE
CERTIFICATE OF CORRECTION

PATENT NO. : 6,774,898 B1
DATED : August 10, 2004
INVENTOR(S) : Akihiro Katayama et al.

It is certified that error appears in the above-identified patent and that said Letters Patent is hereby corrected as shown below:

Title page,
Item [56], References Cited, OTHER PUBLICATIONS, "Transformation of Hologram and Ray Space for Integrated 3D Visual Communication," should read -- "Transformation of Hologram and Ray Space for Integrated 3D Visual Communication", --.

Column 7,
Line 48, "an rendering" should read -- a rendering --.

Column 13,
Line 9, "a represents" should read -- α represents --.

Column 16,
Line 54, "]" should read -- ]     (6) --.

Column 25,
Line 9, "walk through" should read -- walk-through --.
Line 42, "have an" should read -- have --.

Column 33,
Line 29, "has an" should read -- has --.

Column 34,
Line 34, "address n" should read -- address $n_i$ --.

Column 35,
Line 26, "address $n_1$" should read -- address $n_i$ --.
Line 31, "nj" should read -- $n_j$ --.

Column 36,
Line 57, "address n" should read -- address $n_i$ --.
Line 61, "nj" should read -- $n_j$ --.

Column 37,
Line 52, "address n" should read -- address $n_i$ --.
Line 57, "nj" should read -- $n_j$ --.

Column 38,
Line 41, "storing space" should begin a new paragraph.

UNITED STATES PATENT AND TRADEMARK OFFICE
CERTIFICATE OF CORRECTION

PATENT NO. : 6,774,898 B1
DATED : August 10, 2004
INVENTOR(S) : Akihiro Katayama et al.

It is certified that error appears in the above-identified patent and that said Letters Patent is hereby corrected as shown below:

Column 39,
Line 11, "(external" should read -- external --.

Signed and Sealed this

Fifth Day of April, 2005

JON W. DUDAS
*Director of the United States Patent and Trademark Office*